United States Patent
Steven et al.

(10) Patent No.: US 9,772,643 B2
(45) Date of Patent: *Sep. 26, 2017

(54) METHODS, APPARATUS AND SYSTEMS FOR MANAGING ENERGY ASSETS

(71) Applicant: Viridity Energy Solutions, Inc., Reno, NV (US)

(72) Inventors: Alain P. Steven, Lansdale, PA (US); Audrey A. Zibelman, Phoenixville, PA (US); Duncan K. DeVore, Perkiomenville, PA (US); Craig Stewart, Penllyn, PA (US)

(73) Assignee: Viridity Energy Solutions, Inc., Reno, NV (US)

( * ) Notice: Subject to any disclaimer, the term of this patent is extended or adjusted under 35 U.S.C. 154(b) by 263 days.

This patent is subject to a terminal disclaimer.

(21) Appl. No.: 14/532,913

(22) Filed: Nov. 4, 2014

(65) Prior Publication Data

US 2015/0326015 A1 Nov. 12, 2015

Related U.S. Application Data

(63) Continuation of application No. 13/451,497, filed on Apr. 19, 2012, now Pat. No. 8,892,264, which is a (Continued)

(51) Int. Cl.
*G06F 19/00* (2011.01)
*G05F 1/66* (2006.01)
(Continued)

(52) U.S. Cl.
CPC ............... *G05F 1/66* (2013.01); *G05B 13/02* (2013.01); *G05B 13/04* (2013.01); *G06F 17/10* (2013.01); *G06Q 10/00* (2013.01); *G06Q 10/06* (2013.01); *G06Q 40/04* (2013.01); *G06Q 50/06* (2013.01); *H02J 3/008* (2013.01); *H02J 3/28* (2013.01); *H02J 13/0006* (2013.01); *G05B 15/02* (2013.01); *G05B 2219/2642* (2013.01); *G06F 2217/78* (2013.01); *H02J 13/0062* (2013.01);
(Continued)

(58) Field of Classification Search
CPC ........ G06Q 40/04; G06Q 50/06; G05B 13/02; G05B 15/02; G05B 2219/2642
USPC ......................................... 700/286, 291, 292
See application file for complete search history.

(56) References Cited

U.S. PATENT DOCUMENTS

| | | | |
|---|---|---|---|
| 7,274,975 B2 * | 9/2007 | Miller | 700/295 |
| 7,379,997 B2 * | 5/2008 | Ehlers et al. | 709/224 |

(Continued)

*Primary Examiner* — Michael D Masinick
(74) *Attorney, Agent, or Firm* — The H.T. Than Law Group

(57) ABSTRACT

The apparatuses and methods herein facilitate generation of energy-related revenue for an energy customer of an electricity supplier, for a system that includes an energy storage asset. The apparatuses and methods herein can be used to generate operating schedules for a controller of the energy storage asset. When implemented, the generated operating schedules facilitates derivation of the energy-related revenue, over a time period T, associated with operation of the at least one energy storage asset according to the generated operating schedule. The energy-related revenue available to the energy customer over the time period T is based at least in part on a wholesale electricity market.

28 Claims, 20 Drawing Sheets

Related U.S. Application Data continuation-in-part of application No. 12/850,918, filed on Aug. 5, 2010, now Pat. No. 8,457,802.

(60) Provisional application No. 61/477,067, filed on Apr. 19, 2011, provisional application No. 61/552,982, filed on Oct. 28, 2011, provisional application No. 61/279,589, filed on Oct. 23, 2009, provisional application No. 61/554,390, filed on Nov. 1, 2011.

(51) Int. Cl.

| | |
|---|---|
| *G05B 13/02* | (2006.01) |
| *G06Q 40/04* | (2012.01) |
| *G05B 13/04* | (2006.01) |
| *G06F 17/10* | (2006.01) |
| *G06Q 10/06* | (2012.01) |
| *H02J 3/00* | (2006.01) |
| *H02J 3/28* | (2006.01) |
| *H02J 13/00* | (2006.01) |
| *G06Q 50/06* | (2012.01) |
| *G06Q 10/00* | (2012.01) |
| *G05B 15/02* | (2006.01) |

(52) U.S. Cl.
CPC ....... *H02J 13/0075* (2013.01); *H02J 13/0079* (2013.01); *H02J 2003/007* (2013.01); *Y02B 70/3216* (2013.01); *Y02B 90/2638* (2013.01); *Y02B 90/2653* (2013.01); *Y02E 60/722* (2013.01); *Y02E 60/76* (2013.01); *Y02E 60/7838* (2013.01); *Y02E 60/7853* (2013.01); *Y04S 10/14* (2013.01); *Y04S 10/54* (2013.01); *Y04S 20/221* (2013.01); *Y04S 20/224* (2013.01); *Y04S 40/124* (2013.01); *Y04S 40/126* (2013.01); *Y04S 40/22* (2013.01); *Y04S 50/10* (2013.01)

(56) References Cited

U.S. PATENT DOCUMENTS

| | | | |
|---|---|---|---|
| 7,580,817 B2 * | 8/2009 | Bing | 703/6 |
| 7,663,502 B2 * | 2/2010 | Breed | 340/12.25 |
| 7,783,390 B2 * | 8/2010 | Miller | 700/291 |
| 7,949,615 B2 * | 5/2011 | Ehlers et al. | 705/412 |
| 8,019,697 B2 * | 9/2011 | Ozog | 705/412 |
| 8,024,073 B2 * | 9/2011 | Imes et al. | 700/276 |
| 8,295,990 B2 * | 10/2012 | Venkatakrishnan et al. | |
| 8,367,984 B2 * | 2/2013 | Besore et al. | 219/490 |
| 8,396,602 B2 * | 3/2013 | Imes et al. | 700/276 |
| 8,396,604 B2 * | 3/2013 | Imes et al. | 700/286 |
| 8,412,382 B2 * | 4/2013 | Imes et al. | 700/277 |
| 8,621,097 B2 * | 12/2013 | Venkatakrishnan et al. | 709/230 |
| 2004/0133314 A1 * | 7/2004 | Ehlers et al. | 700/276 |
| 2005/0234600 A1 * | 10/2005 | Boucher et al. | 700/286 |
| 2006/0276938 A1 * | 12/2006 | Miller | 700/295 |
| 2009/0299537 A1 * | 12/2009 | Rea et al. | 700/286 |
| 2010/0217651 A1 * | 8/2010 | Crabtree et al. | 705/10 |
| 2010/0332373 A1 * | 12/2010 | Crabtree et al. | 705/37 |
| 2012/0296482 A1 * | 11/2012 | Steven et al. | 700/291 |

* cited by examiner

METHODS, APPARATUS AND SYSTEMS FOR MANAGING ENERGY ASSETS

CROSS-REFERENCES TO RELATED APPLICATIONS

This application is a continuation of U.S. Non-Provisional application Ser. No. 13/451,497, filed on Apr. 19, 2012, which claims priority to and benefit of U.S. Provisional Application No. 61/477,067, filed on Apr. 19, 2011, U.S. Provisional Application No. 61/552,982, filed on Oct. 28, 2011, and U.S. Provisional Application No. 61/554,390, filed on Nov. 1, 2011. U.S. Non-Provisional application Ser. No. 13/451,497 is also a continuation-in-part of and claims priority to and benefit of U.S. Non-provisional application Ser. No. 12/850,918, filed on Aug. 5, 2010, which claims priority to U.S. Provisional Application No. 61/279,589, filed on Oct. 23, 2009. The entire disclosure of each of these applications is incorporated herein by reference in its entirety, including drawings.

BACKGROUND

In various regions across the United States, "regional transmission operators" (RTOs) or "independent system operators" (ISOs) generally are responsible for obtaining electricity from electricity generators (e.g., operators of coal-fired plants, gas plants, nuclear plants, hydroelectric plants, renewable resources, etc.), and then transmitting the electricity provided by generators over particular geographic regions (e.g., New England, the greater New York area, the mid-Atlantic states) via an electricity transmission infrastructure (also commonly referred to as the electricity "grid"). RTOs/ISOs also are responsible for maintenance of the grid, and RTOs generally are responsible for regional planning of grid expansion and/or deployment of new electricity transmission infrastructure.

The Federal Energy Regulation Commission (FERC) presently requires that, in addition to generally managing the operation of the electricity grid in a given geographic area, RTOs/ISOs need to manage the price of electricity generated and consumed on the grid via "wholesale electricity markets." To this end, RTOs/ISOs establish pricing auctions to provide and support wholesale electricity markets. These pricing auctions, in addition to setting wholesale prices as a function of time, also foster sufficient electricity production for the grid at various locations to ensure that the grid is capable of delivering adequate electricity to respective locations of demand for electricity on the grid. Thus, some of the key objectives of the RTOs/ISOs in overseeing wholesale electricity markets include providing for efficient, economic and reliable operation of the grid.

In general, a given RTO/ISO supports a wholesale electricity market by allowing competing electricity generators to offer their electricity production output to the RTO/ISO. Retail electricity suppliers, also commonly referred to as "utilities," in turn supply electricity to end-users/consumers, or "energy customers" of the retail electricity suppliers, and are billed by the RTO/ISO for their purchases. With respect to the wholesale electricity market, the retail electricity suppliers make bids for the electricity production output offered by the electricity generators that, once accepted, establish market prices. The retail electricity suppliers in turn typically re-price the electricity they purchase from electricity generators on the wholesale market to sell to their retail electricity customers.

One significant issue facing RTOs/ISOs relates to various limitations that exist in connection with the grid that may impede a sufficient flow of electricity on the grid under certain circumstances. In particular, there may be time-dependent and/or geographically-dependent limitations on the grid's ability to support transmission of electricity, based on one or more of: 1) an available overall supply of electricity from electricity generators; 2) overall demand from retail electricity suppliers; 3) general conditions on the grid itself (e.g., aging, failing or dated equipment); and 4) "location-specific" or "congestion" issues, e.g., respective geographic locations on the grid of electricity generators, electricity consumers, particular demand conditions, and/or particular grid-related conditions that in some manner impede the transmission of available electricity to one or more portions of the grid). In some circumstances, a grid limitation may be caused by a particular branch of the grid reaching a thermal limit, or a failure of a generator or transformer on a branch of the grid; these limitations generally are referred to as "security constraints" (i.e., particular grid infrastructure cannot be overloaded without jeopardizing the grid). As such, the electricity grid is sometimes referred to as a "security constrained system."

In view of the foregoing, RTOs/ISOs may employ a process known as "security constrained economic dispatch" for establishing wholesale electricity prices on a wholesale electricity market. Pursuant to this process, an RTO/ISO managing a particular geographic region of an electricity grid determines particular locations on the grid, or "nodes," at which there is a possibility for security constraints to limit electricity transmission. Wholesale electricity prices as a function of time are then established independently for each node (i.e., on a geographically-dependent, or "locational" basis) by accepting bids from energy generators in sequence from the lowest priced offer to the highest priced offer, up to an amount of electricity needed to satisfy electricity demand conditions (e.g., bids from retail electricity suppliers) at the node, so as to develop a supply and demand equilibrium price. In this manner, the wholesale electricity price at a particular node reflects the highest-priced accepted generation offer needed to provide an adequate amount of electricity to that node, taking into consideration various security constraints that may be present at the node. This location-based approach to wholesale electricity prices, which takes into consideration security constraints on the grid, commonly is referred to as "locational marginal pricing," and the wholesale electricity price at a given node is commonly referred to a Locational Marginal Price (LMP). Thus, the wholesale electricity price generally varies at different locations on the grid, based at least in part on security constraints.

While electricity generators and retail electricity suppliers make up a significant constituency of the participants in wholesale electricity markets, applicable market rules in some wholesale electricity markets also permit electricity consumers/end-users (e.g., energy customers of retail electricity suppliers) and others to participate in wholesale electricity markets so as to earn energy-related revenue and offset their energy-related expenditures. In particular, market rules now permit energy users (or their market representatives) to make offers to curtail or otherwise alter their electricity use, or to sell self-generated or stored electricity, to the wholesale market. If such an offer by an energy customer to provide an "electricity-related product or service" is accepted on the applicable wholesale market, the customer endeavors to appropriately control its various energy assets so as to make available to the grid the offered product/service, in return for payment pursuant to the terms of the offer. The concept of an energy customer providing an electricity-related product or service (e.g., electricity use curtailment) on a wholesale electricity market in exchange for payment to the energy customer by the RTO/ISO, commonly is referred to as "demand response" (DR).

Some of the currently more active wholesale electricity sub-markets in which energy customers of retail service providers may readily participate include the "energy markets" (e.g., "day-ahead" energy market, "real-time dispatched" energy market). While various pricing models exist for participation in these markets and other economic demand response wholesale electricity markets (as well as various penalty models for customer non-performance pursuant to an offer to reduce/curtail energy use), often any revenue generated by the energy customer from participation in these markets is based on the locational marginal price (LMP). The LMP may be calculated periodically at specified nodes (e.g., every 5 minutes, every half-hour, every hour) depending on the particular market in which the energy customer is participating. More generally, revenue generation relating to participation in an economic demand response wholesale electricity market is based on a prevailing "wholesale electricity price" for the particular market in question, which in turn generally is based on the LMP (calculated at various intervals), as discussed above.

To determine revenue earned by participating energy customers in a particular economic demand response wholesale electricity market such as an "energy market," the amount of electricity use reduction by the participating customer typically has to be measured; subsequently, this measured amount of electricity use reduction typically is multiplied by a price relating to the prevailing wholesale electricity price for the market in question (e.g., LMP). Electricity use reduction by the energy customer conventionally is measured against a reference electricity usage commonly referred to as a "customer baseline" (CBL). The CBL is intended to represent what the participating energy customer's electricity use normally would have been, over a particular time period and typical ("business-as-usual" or BAU) operating conditions for the customer's energy assets, absent the customer's voluntary electricity use reduction based on the incentive provided by the economic demand response wholesale electricity market.

Conventionally, a customer baseline (CBL) electricity use profile for an energy customer is derived by an RTO/ISO from an historical sample of actual electricity use by the customer over a particular time period and BAU operating conditions. In some cases, the particular time period for which an historical sample of the customer's actual electricity use is selected as a CBL may be based, at least in part, on similar conditions prevailing at the customer's site at the time of the historical sampling and participation in the economic demand response program (e.g., similar weather conditions, similar seasons/time of year, similar occupancy conditions at the customer's site, etc.). In other instances, the time period for selecting an historical sample of actual electricity usage as a CBL is based on relatively recent actual electricity use by the energy customer just prior to the customer's participation in the economic demand response program. For example, the ISO PJM Interconnect calculates a market-participating customer's CBL for a given weekday as "the average of the highest four out of the five most recent highest load (electricity use) weekdays in the 45 calendar day period preceding the relevant load reduction event." In sum, revenue generation from the economic demand response wholesale electricity "energy markets" conventionally is based on an historical actual electricity usage of a participating customer, which historical actual electricity usage serves as a customer baseline (CBL) against which electricity use reduction is measured for purposes of paying the energy customer for the use reduction.

SUMMARY

The Inventors have recognized and appreciated that new opportunities for participation in wholesale electricity markets by electricity consumers/end-users (e.g., energy customers of retail electricity suppliers) have created a need for energy management tools to facilitate energy-related revenue generation from such markets. In view of the foregoing, various embodiments are directed generally to methods, apparatus and systems for determining operating schedules for energy assets so as to facilitate revenue generation from wholesale electricity markets. These energy assets include energy storage assets, energy consuming assets and energy generating assets.

Wholesale electricity markets in which the energy customer may participate to earn energy-related revenue, and to which the various methods, apparatus and systems according to the concepts disclosed herein may apply, include various economic demand response wholesale electricity markets, examples of which include, but are not limited to, a "real-time energy market," a "day-ahead energy market," a "day-ahead scheduling reserve market," a "synchronized reserve" market, a "regulation" market, a "capacity" market, and an "emissions" market. In some examples, the inventive methods, apparatus and systems described herein may be implemented in whole or in part by a curtailment service provider (CSP) or other entity acting as a "broker" between energy customers and an RTO/ISO to facilitate participation in various demand response programs supported by wholesale electricity markets.

Suggested Operating Schedules for Energy Assets

In exemplary implementations discussed in greater detail below, the inventive methods, apparatus and systems described herein determine a suggested operating schedule for one or more energy assets (including energy-consuming assets for which energy usage may be curtailed), over a given time period T, that are operated by an energy customer of a retail electricity supplier. The energy assets operated by the energy customer may include electricity-consuming assets as well as electricity-generating assets (e.g., fossil-fuel-based generators, renewable energy sources) and/or electricity storage assets (e.g., batteries). The time period T over which a suggested operating schedule for the energy asset(s) may be determined according to the inventive concepts disclosed herein may be a portion of an hour, an hour, a period of multiple hours, a day, or a period of multiple days, for example (which in some instances may be based, at least in part, on time-varying wholesale electricity prices on a particular wholesale electricity market from which revenue may be generated). Similarly, the suggested operating schedule(s) for the energy assets(s) may be determined based at least in part on wholesale prices of various wholesale electricity "products" offered on the wholesale electricity markets in which the energy customer may participate (e.g., based on a geographic region in which the energy customer is located) to earn energy-related revenue.

In one exemplary implementation, as discussed in greater detail below, the suggested operating schedule for one or more energy assets is determined via a mathematical optimization process that reduces a net energy-related cost to the energy customer over the time period T by increasing projected energy-related revenue from one or more wholesale electricity markets in which the energy customer may participate.

Energy Asset Modeling

To facilitate the mathematical optimization process for generating a suggested operating schedule for one or more energy assets, a mathematical model representing the customer's energy asset(s) is formulated and employed in the mathematical optimization process. The energy asset model is specified by one or more mathematical functions for calculating an energy profile (i.e., electricity use and/or electricity generation as a function of time over the time period T) for the asset(s), based on a proposed operating schedule for the asset(s) applied as an input to the model. In one aspect, the mathematical function(s) defining the asset model at least in part represent physical attributes of the energy asset(s) themselves that relate to electricity use and/or electricity generation. Depending on the energy asset(s) operated by the energy customer, a given model may represent a single energy asset or an aggregation of multiple energy assets operated by the customer.

Also, depending on the type of energy asset(s) being modeled, the asset model may be formulated to accept additional inputs to facilitate calculation of an energy profile based on a proposed operating schedule. Herein, in various examples, energy storage assets, energy consuming assets and/or energy generating assets are being modeled. For example, in the case of energy consuming assets such as building assets including heating, ventilation and air conditioning (HVAC) systems for temperature control in one or more buildings, and/or other assets for which thermodynamic considerations are relevant (including weather- or temperature-dependent energy generating assets including photovoltaic cells and wind turbines), the mathematical model for the asset(s) may be configured to consider as an input to the model actual or forecast ambient environmental conditions (e.g., temperature, humidity, ambient light/cloud cover, etc.) as a function of time, as well as other variables that may impact thermodynamics or the energy profile in general (e.g., building occupancy, a presence of equipment such as computers and other instrumentation that may affect heating or cooling in an environment, etc.).

Customer Baseline (CBL) Energy Profiles for Business-as-Usual (BAU) Operating Schedules In some examples, the mathematical model for the energy asset(s) first is used to generate a simulated (or "predictive") customer baseline (CBL) energy profile corresponding to a typical operating schedule (also referred to herein as a "business-as-usual" (BAU) operating schedule, or "BAU conditions"). In particular, an energy customer's BAU operating schedule for its energy asset(s) is applied to the mathematical model, which in turn provides as an output a simulated CBL energy profile representing a typical electricity consumption or generation as a function of time, over a given time period T, for the modeled energy asset(s). In one aspect, the energy customer's BAU operating schedule represents the customer's typical behavior with respect to operating its energy asset(s), absent any incentive to reduce energy costs and/or earn energy-related revenue from the wholesale electricity market.

As discussed in greater detail below, a simulated and predictive CBL energy profile based on a mathematical model according to the concepts disclosed herein provides a significant improvement over conventional approaches to determine a frame of reference for typical energy profiles of energy customers (absent an incentive to generate revenue via wholesale electricity markets); as noted above, conventional approaches are limited to considering only historical actual energy use information. In particular, the Inventors have recognized and appreciated that conventional backward-looking assessment of CBL is not necessarily representative of what an energy customer's electricity usage actually would have been on a given day for which economic demand response revenue is being calculated—at best, such backward-looking historical actual-use-based assessments of CBL provide inconclusive estimates.

Additionally, it has been observed empirically that an historical actual-use CBL provides incentives for some energy customers to artificially inflate energy usage (i.e., by not operating energy assets pursuant to "business-as-usual" or BAU conditions, but instead purposefully adopting higher-consumption operating conditions) prior to a period in which the customer anticipates participation in economic demand response wholesale electricity markets; an artificially higher historic actual-use-based CBL, against which energy use reduction will be measured, provides a potentially higher economic demand response revenue. In this manner, the general goal of economic demand response programs to incentivize reduced electricity usage is undermined (by an artificially-increased electricity usage to establish a higher CBL).

Furthermore, the Inventors have recognized and appreciated that an historical actual-use-based CBL provides a long-term disincentive to participate in economic demand response wholesale electricity markets. In particular, as a given energy customer participates in economic demand response wholesale electricity markets over time, their average actual electricity use from retail suppliers is expected to decrease. If revenue from such markets continues to be calculated with reference to an historical actual-use-based CBL, the potential for economic demand response revenue will decrease over time, as an economic settlement approach based on historical actual-use CBL eventually will begin to treat incentivized electricity use reduction as "business-as-usual" operating conditions for the energy customer. This type of treatment arguably will ultimately discourage participation in wholesale electricity markets. At very least, continued reliance on historical actual-use-based CBL likely will compel an extension of a "look-back" period serving as a basis for determining CBL for energy customers who actively participate in economic demand response wholesale electricity markets for significant periods of time. If/as longer look-back periods are adopted, the accuracy and relevance of historic actual-use-based CBLs from more distant time periods arguably will significantly decrease.

Accordingly, for at least the foregoing reasons, a simulated and predictive CBL energy profile, based on a mathematical model of an energy customer's energy asset(s) according to the concepts disclosed herein (rather than an historical actual-use-based CBL as conventionally employed), provides a significant improvement for more accurately determining revenue earned from economic demand response wholesale electricity markets. In some examples, the mathematical model for the energy asset(s) may not be predicated on any significantly historical actual electricity use information for the energy asset(s), and instead may be based primarily on physical attributes of the energy asset(s) themselves that relate to electricity use and/or electricity generation, as noted above. In this manner, simulated and predictive CBL energy profiles based on such mathematical models are not substantively influenced by significantly historical actual electricity use information.

In other examples, the mathematical model for energy asset(s) may be predicated on some degree of essentially real-time or near real-time feedback (e.g., from one or more control systems actually controlling the modeled energy asset(s)), which feedback may represent actual electricity use. This feedback may be used, according to some examples of the methods, apparatus and systems disclosed herein, to refine some aspects of the mathematical model; however, even when real-time or near real-time feedback representing actual electricity use is employed, in some examples the mathematical model is still based primarily on physical attributes of the energy asset(s) themselves relating to electricity use and/or electricity generation.

Objective Cost Functions

In some examples, the mathematical model for the energy asset(s) is employed to determine a suggested operating schedule over a given time period T for the energy asset(s) (different than the BAU operating schedule) based on a mathematical optimization of an "objective cost function" representing the net energy-related cost to the energy customer for operating the asset(s). In exemplary implementations, the objective cost function incorporates the mathematical model for the energy asset(s) and specifies energy-related revenues from one or more wholesale energy markets (e.g., based on forecasted wholesale energy prices over the time period T for the one or more wholesale markets of interest), from which possible revenue may be available to the energy customer. In some examples, the energy-related revenues specified in the objective cost function may take into consideration a simulated customer baseline (CBL) energy profile (discussed above) as a basis for determining such revenue.

The objective cost function employed in the mathematical optimization to determine a suggested operating schedule for the energy asset(s) also may specify energy-related costs which are offset by the energy-related revenues. In particular, in some examples, the energy-related costs included in the objective cost function may include "actual" energy-related costs (e.g., retail electricity costs, wholesale electricity costs representing revenue earned by the energy customer, fuel costs to run one or more electricity generation assets, operation and/or maintenance costs that may be associated with electricity generation and/or energy storage assets, lifetime and/or replacement costs for electricity generation and/or energy storage assets, emissions-related costs, etc.). The energy-related costs included in the objective cost function additionally or alternatively may include "indirect" energy-related costs, such as convenience/comfort costs associated with the energy customer's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets).

Optimization of Objective Cost Function for Generating Energy Asset Operating Schedules In one example, the objective cost function (which incorporates the mathematical model of the energy asset(s)) may be provided to an optimizer (a particularly-programmed processor, also referred to as a "solver") that implements a mathematical optimization process to determine a suggested operating schedule for the energy asset(s) over a given time period T. In one conceptual illustration of the mathematical optimization process, some number N of candidate operating schedules are successively applied to the mathematical model to generate simulated energy profiles corresponding to the candidate operating schedules. A net energy-related cost represented by the objective cost function is calculated for each simulated energy profile, and the candidate operating schedule that minimizes the objective cost function (i.e., minimizes the net energy-related cost) is selected as the suggested operating schedule. In some implementations, the amount of revenue available from the relevant wholesale electricity markets over the given time period T is a significant factor dictating the candidate operating schedule that is provided as an output of the optimizer.

Adopting Operating Schedules, Market Bids and Settlement

The suggested operating schedule in turn may be transmitted to the energy customer (e.g., to an energy management system and/or building management system of the energy customer), and the customer may choose to adopt or not adopt the suggested operating schedule to actually operate its energy asset(s) over the particular time period T for which the optimization is performed. In some implementations, a given operating schedule is transmitted to the energy customer in the form of one or more bias signals representing a change in an operating set point of one or more assets, as a function of time over the time period T, from the typical or "business-as-usual" (BAU) operating set point for the asset(s). In some examples, the energy customer makes a choice to adopt a given suggested operating schedule in tandem with making an offer (a "bid") to provide one or more wholesale electricity market products to the appropriate market pursuant to the adopted operating schedule.

If the energy customer adopts the suggested operating schedule to actually operate its energy asset(s) so as to provide a particular wholesale electricity market product pursuant to an accepted bid (e.g., reduce its energy consumption), various information ultimately is obtained from the energy customer to facilitate a "settlement" process pursuant to which the customer is paid by the wholesale market operator (i.e., the RTO/ISO overseeing the wholesale electricity market(s) in which the customer is participating). For example, in one example relating to energy markets (wherein the "product" is energy use curtailment), the energy customer's "metered load" (i.e., actual energy use during the time period T in which the suggested operating schedule is adopted) is measured, and compared to a simulated CBL based on the mathematical model for the customer's energy asset(s). The energy customer may then be paid for its economic demand response electricity use reduction based on a difference between the simulated CBL and the actual metered load, multiplied by the actual wholesale energy price during the time period T for the market in question (e.g., LMP).

Apparatuses, methods and computer-readable media are described for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on a first operation characteristic of the at least one energy storage asset, a second operation characteristic of at least one energy consuming asset in communication with the at least one energy storage asset, and a forecast wholesale electricity price associated with the wholesale electricity market. The at least one processing unit is communicatively coupled to the at least one communication interface and the at least one memory. Upon execution of the processor-executable instructions, the at least one processing unit determines the operating schedule for the controller of the at least one energy storage asset using the mathematical model, and controls the at least one communication interface to transmit to the energy customer the determined operating schedule for the controller of the at least one energy storage asset, and/or controls the at least one memory so as to store the determined operating schedule for the controller.

In an aspect, upon execution of the processor-executable instructions, the at least one processing unit determines the operating schedule for the controller of the at least one energy storage asset using the mathematical model by minimizing a net energy-related cost over the time period T. The net-energy related cost is based at least in part on electricity generation by the at least one energy storage asset, first electricity consumption by the at least one energy storage asset, and second electricity consumption by the at least one energy consuming asset. The energy-related revenue available to the energy customer is based at least in part on the minimized net energy-related cost.

Apparatuses, methods and computer-readable media are also described for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on a first operation characteristic of the at least one energy storage asset, a second operation characteristic of at least one energy consuming asset in communication with the at least one energy storage asset, and a forecast wholesale electricity price associated with the wholesale electricity market. Upon execution of the processor-executable instructions, the at least one processing unit determines the operating schedule for the controller of the at least one energy storage asset using the mathematical model, where the operating schedule for the controller of the at least one energy storage asset specifies, during a time interval less than time period T, a proportion of an available state of charge (SOC) of the energy storage asset for use in an energy market and a remaining proportion of the available SOC of the energy storage asset for use in a regulation market, and controls the at least one communication interface to transmit to the energy customer the determined operating schedule for the controller of the at least one energy storage asset, and/or controls the at least one memory so as to store the determined operating schedule for the controller.

In an aspect, upon execution of the processor-executable instructions, the at least one processing unit determines the operating schedule for the controller of the at least one energy storage asset using the mathematical model by minimizing a net energy-related cost over the time period T, where the net-energy related cost is based at least in part on electricity generation by the at least one energy storage asset, first electricity consumption by the at least one energy storage asset, and second electricity consumption by the at least one energy consuming asset. The energy-related revenue available to the energy customer is based at least in part on the minimized net energy-related cost.

Apparatuses, methods and computer-readable media described herein may be used to implement the virtual partitioning and dynamic virtualization described herein. In this aspect, the at least one memory is configured to store processor-executable instructions and a mathematical model for the at least one energy storage asset, where the mathematical model determines the operating schedule for the controller based on data associated with parameters, including but not limited to, an operation characteristic of the energy storage asset, an operation characteristic of the energy consuming asset in communication with the at least one energy storage asset, and a forecast wholesale electricity price associated with the wholesale electricity market.

In aspect of virtual partitioning, the at least one processing unit executes the processor-executable instructions stored in the memory at least to determine the operating schedule for the controller of the energy storage asset using the mathematical model, where the operating schedule specifies, during a time interval less than time period T, a proportion of an available state of charge (SOC) of the energy storage asset for use in the energy market and a remaining proportion of the available SOC of the energy storage asset for use in the regulation market. The at least one processing unit also executes processor-executable instructions 14 to control the communication interface to transmit to the energy customer the operating schedule that has been determined for the controller and/or controls the memory to store the determined operating schedule for the controller. In a non-limiting example, the processing unit may execute processor-executable instructions to control the communication interface to transmit to the operating schedule directly to the controller.

Apparatuses, methods and computer-readable media described herein can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market, and wherein the wholesale electricity market includes an energy market and a regulation market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on an operation characteristic of the at least one energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the duration of energy storage asset participation in the regulation market, electricity generation by the at least one energy storage asset, and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller Apparatuses, methods and computer-readable media described herein can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market. In this example, the apparatus includes at least one communication interface, at least one memory to store processor-executable instructions and a mathematical model for the at least one energy storage asset, and at least one processing unit. The mathematical model facilitates determination of the operating schedule for the controller based at least in part on an operation characteristic of the at least one energy storage asset, an expected energy-generating schedule of the energy generating asset in communication with the energy storage asset, and a forecast wholesale electricity price associated with the wholesale electricity market. The at least one processing unit can be configured to determine the operating schedule for the controller of the at least one energy storage asset using the mathematical model, and control the at least one communication interface to transmit to the energy customer the operating schedule for the controller of the at least one energy storage asset and/or controls the at least one memory so as to store the determined operating schedule for the controller.

In an aspect, the at least one processing unit is configured to determine the operating schedule for the controller of the at least one energy storage asset using the mathematical model by minimizing a net energy-related cost over the time period T. The net-energy related cost is based at least in part on the amount of energy generation by the at least one energy generating asset, electricity generation by the at least one energy storage asset; and electricity consumption by the at least one energy storage asset. The energy-related revenue available to the energy customer is based at least in part on the minimized net energy-related cost. The net energy-related cost may be specified as a difference between an electricity supply cost and an economic demand response revenue over the time period T. The energy generating asset may be a photovoltaic cell, a fuel cell, a gas turbine, a diesel generator, a flywheel, an electric vehicle, or a wind turbine. The operation characteristic of the at least one energy storage asset may be a state of charge, a charge rate, a degree of non-linearity of charge rate a discharge rate, a degree of non-linearity of discharge rate, a round trip efficiency, or a degree of life reduction.

Apparatuses, methods and computer-readable media described herein can be used for determining an operating schedule of a controller of at least one energy storage asset so as to generate energy-related revenue, over a time period T, associated with operation of the at least one energy storage asset according to the operating schedule. The energy-related revenue available to the energy customer over the time period T is based at least in part on a wholesale electricity market, and the wholesale electricity market includes an energy market and a regulation market. In this example, the apparatus includes at least one communication interface, at least one memory to store processor-executable instructions and a mathematical model for the at least one energy storage asset, and at least one processing unit. The mathematical model facilitates a determination of the operating schedule for the controller based at least in part on an operation characteristic of the at least one energy storage asset, an expected energy-generating schedule of an energy generating asset in communication with the energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the amount of energy generation by the at least one energy generating asset, duration of energy storage asset participation in the regulation market, electricity generation by the at least one energy storage asset and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller.

Apparatuses, methods and computer-readable media described herein can be used for determining an operating schedule of at least one controller of at least one energy asset as to generate energy-related revenue, over a time period T, associated with operation of the at least one energy asset according to the operating schedule. The energy-related revenue available to the energy customer over the time period T is based at least in part on at least one wholesale electricity market. The apparatus includes at least one communication interface, at least one memory to store processor-executable instructions and a mathematical model for the at least one energy asset, and at least one processing unit. The mathematical model facilitates a determination of the operating schedule for the controllers based at least in part on an operation characteristic of the at least one energy asset and forecast wholesale electricity prices associated with the at least one wholesale electricity market. The at least one processing unit is configured to determine the operating schedule for the at least one controller of the at least one energy storage asset using the mathematical model by minimizing a net energy-related cost over the time period T. The net-energy related cost is based at least in part on at least one energy supply cost and at least one demand response revenue. The operating schedule specifies, during a time interval within the time period T, conditions for use of the at least one energy asset in respective ones of the at least one energy market. The at least one processing unit is also configured to control the at least one communication interface to transmit to the energy customer the operating schedule for the at least one controller of the at least one energy asset, control the at least one memory so as to store the determined operating schedule for the at least one controller, and/or control the at least one communication interface to transmit to the at least one controller of at least one energy asset the operating schedule. The energy asset can be at least one of an energy storage asset, an energy generating asset, an energy consuming asset, or any combination thereof. The at least one wholesale electricity market can be at least one of an energy market, a regulation market, a spinning reserve market, or any combination thereof. The forecast wholesale electricity prices associated with the energy market can be a wholesale price. The forecast wholesale electricity prices associated with the regulation market can be a regulation price. The forecast wholesale electricity prices associated with the spinning reserve market can be a spinning reserve market price.

The following patent applications are hereby incorporated herein by reference in their entirety:

U.S. Provisional Application No. 61/477,067, filed on Apr. 19, 2011;

U.S. Provisional Application No. 61/552,982, filed on Oct. 28, 2011;

U.S. Non-provisional application Ser. No. 12/850,918, filed on Aug. 5, 2010; and U.S. Provisional Application No. 61/279,589, filed on Oct. 23, 2009.

The entire disclosure of these applications is incorporated herein by reference in its entirety, including drawings, It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive methods, apparatus, and systems for determining a suggested operating schedule for energy assets to facilitate revenue generation from wholesale electricity markets. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but not limited to, the term "including" means including but not limited to. The term "based on" means based at least in part on.

Figure 1:
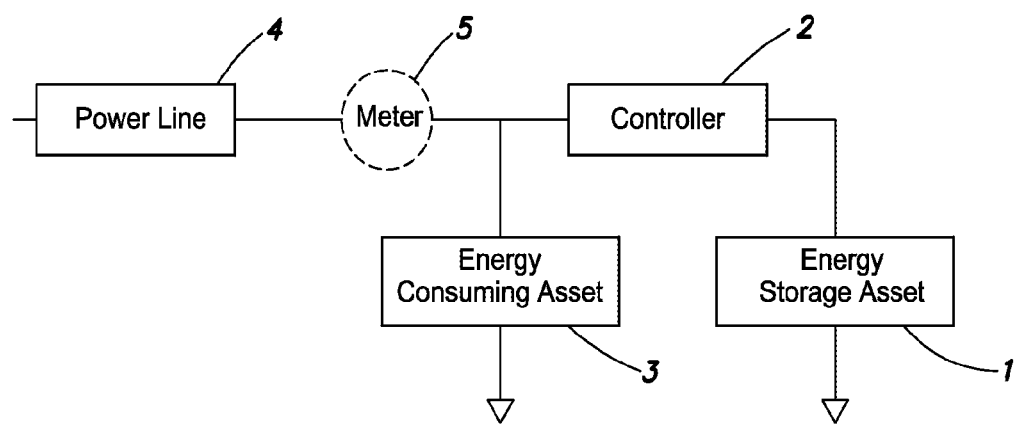
FIG. 1 shows an example system that includes an energy storage asset, a controller, and an energy consuming asset, according to a principle described herein.

The apparatuses and methods described herein are applicable to a system that includes an energy storage asset 1, a controller 2 in communication with the energy storage asset 1, and an energy consuming asset 3 in communication with a power line 4 (as depicted in the example of FIG. 1). The controller 2 facilitates charging of the energy storage asset 31 using the electricity supplied by power line 4 or feeding power generated by a discharge of the energy storage asset 31 to the power line 4. As depicted in the non-limiting example of FIG. 1, the controller 2, the energy storage asset 1 and the energy consuming asset 3 may be located behind a power meter 5. For example, all of the controller 2, the energy storage asset 1 and the energy consuming asset 3 may be located at one or more facilities of the energy consumer.

Non-limiting examples of energy storage assets include batteries, ice units, and compressed air. Non-limiting examples of batteries include lithium ion batteries, lead-acid batteries, flow batteries, or dry cell technology batteries.

In the non-limiting example of FIG. 1, the controller 2 facilitates the communication between the energy consuming asset and the energy storage asset. In another example, the energy consuming asset may communicate with the energy storage asset via one or more other components including the controller 2.

The apparatuses and methods herein facilitate generation of energy-related revenue for an energy customer of an electricity supplier, where the energy customer commits an amount of energy from the at least one energy storage asset to an energy market. In an example, the electricity supplier may be a retail electricity supplier that supplies the electricity to the energy customer at a retail price. In another example, the electricity supplier may supply the electricity to the energy customer at a contracted for or negotiated price. In various examples herein, the energy customer may allow an amount of capacity of the energy storage asset to be committed to the energy market. When implemented, the apparatuses and methods described herein may allow the energy customer to generate an amount of energy-related revenue over a time period that an amount of capacity of the energy storage asset is committed to the energy market.

In a non-limiting example, an apparatus or a method described herein can be used to generate an operating schedule for a controller that communicates with the energy storage asset. The controller is capable of exercising an amount of control over the rate of charging or energy generation of the energy storage asset. As a result, the controller can be used to maintain the state of charge of the energy storage asset, or change its state of charge controllably. Operation of the controller, and hence the energy storage asset, according to the operating schedule generated by an apparatus or a method herein over the time period may make available to the energy customer an amount of energy-related revenue based at least in part on a wholesale electricity market.

Figure 2:
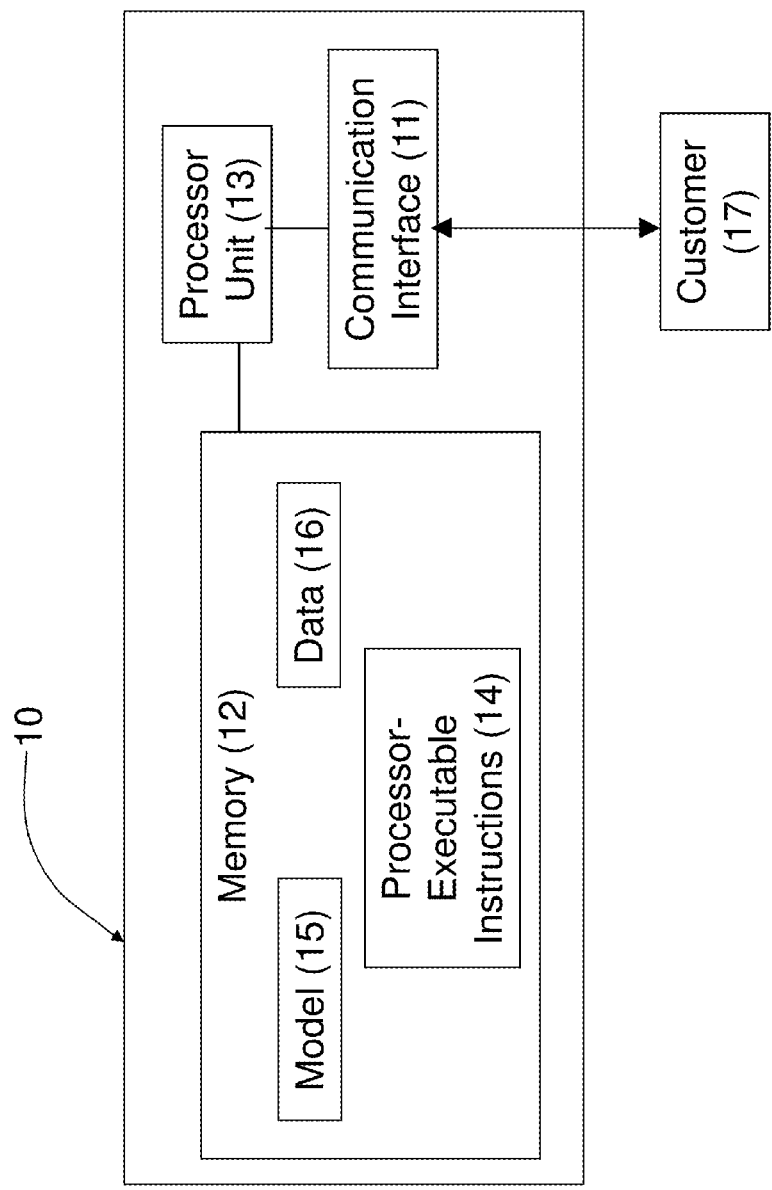
FIG. 2 shows an example apparatus according to a principle described herein.

A non-limiting example of the apparatus 10 according to the principles described herein is illustrated in FIG. 2. The apparatus 10 includes at least one communication interface 11, at least one memory 12, and at least one processing unit 13. The at least one processing unit 13 is communicatively coupled to the at least one communication interface 11 and the at least one memory 12.

The at least one memory 12 is configured to store processor-executable instructions 14 and a mathematical model 15 for the at least one energy storage asset. As described in greater detail below, the mathematical model determines the operating schedule for the controller based on data 16 associated with parameters, including but not limited to, an operation characteristic of the energy storage asset, an operation characteristic of an energy consuming asset in communication with the energy storage asset and a forecast wholesale electricity price associated with the wholesale electricity market.

In a non-limiting example, the at least one processing unit 13 executes the processor-executable instructions 14 stored in the memory 12 at least to determine the operating schedule for the controller of the energy storage asset using the mathematical model 15. The at least one processing unit 13 also executes processor-executable instructions 14 to control the communication interface 11 to transmit to the energy customer 17 the operating schedule that has been determined for the controller and/or controls the memory 12 to store the determined operating schedule for the controller. In a non-limiting example, the processing unit 13 may execute processor-executable instructions 14 to control the communication interface 11 to transmit to the operating schedule directly to the controller.

The operation characteristic of the energy storage asset may be its state of charge, charge rate, the degree of non-linearity of the charge rate, discharge rate, degree of non-linearity of the discharge rate, round trip efficiency, and degree of life reduction. In an example where the operation characteristic of the energy storage asset is its charge rate and/or discharge rate, the operating schedule for the controller may include suggested different time intervals for charging the energy storage asset or discharging the energy storage asset during the time period T that the system is in operation. As a non-limiting example, the operating schedule for the controller may indicate a time interval for charging the energy storage asset that coincides with a corresponding time interval during which the forecast wholesale electricity price falls below a predetermined threshold value. As another non-limiting example, the operating schedule for the controller may indicate a time interval of discharging the energy storage asset that coincides with a corresponding time interval during which the forecast wholesale electricity price exceeds a predetermined threshold value.

The operation characteristic of the energy consuming asset may be its load use schedule. For example, the operation characteristic of the energy consuming asset can be its energy consumption profile as a function of time. The energy consuming asset may be a controllable asset or a fixed-load asset. A fixed-load asset is an energy consuming asset whose energy consumption characteristics may not be readily modified, even if it varies over time. The energy consumption characteristics of a controllable energy consuming asset may be modified by changing parameters of operation of the system. A non-limiting example of an operation characteristic for a controllable energy consuming asset is its set point. The set point may be a controllable set point, e.g., it may be controllable as a function of time or temperature. For example, where the controllable energy consuming asset is a building with a variable internal temperature controlled by a heating, ventilation and air conditioning (HVAC) system, the operation characteristic may be a temperature set point for the HVAC system.

As described herein, in an example, an amount of energy of the energy storage asset may be generated and supplied to the power line at a discharge rate to generate energy-related revenue for the energy customer in an energy market. The energy-related revenue can depend on a forecast wholesale electricity price associated with the wholesale electricity market, and may be determined based on computation of a net-energy related cost. The net energy related cost may be computed based on the supply costs for supplying electricity to the customer and a demand response revenue. An apparatus and method herein can be implemented to generate an operating schedule for the controller of the energy storage asset that provides recommendations for the timing of charging and discharging of the energy storage asset.

In an example, the processing unit can be configured to determine the operating schedule for the controller of the at least one energy storage asset using the mathematical model by minimizing a net energy-related cost over the relevant time period (T). The net energy-related cost can be associated with electricity generation by the energy storage asset, electricity consumption by the energy storage asset, and electricity consumption by the energy consuming asset. Here, the energy-related revenue available to the energy customer may be computed based at least in part on the minimized net energy-related cost.

The net energy-related cost may be specified as a difference between the electricity supply cost and the economic demand response revenue over the pertinent time period.

In an example, the processing unit can be configured to determine the operating schedule for the controller using the mathematical model and a representative customer baseline (CBL) energy profile for the energy consuming asset over the time period (T). As used herein, the term "representative customer baseline energy profile" or "representative CBL energy profile" encompasses representations of the energy customer's energy usage in the absence of change of behavior according to the principles described herein. As non-limiting examples, the "representative customer baseline energy profile" or "representative CBL energy profile" includes an estimation based on the energy customer's business-as-usual (BAU) operations, including any form of averaged or weighted measure based on measures of historical BAU operations. Herein, the representative CBL energy profile represents a typical operation of the at least one energy consuming asset by the energy customer. For example, where the energy consuming asset is a fixed-load asset, the representative CBL may be determined as the energy consumption profile for the energy consuming asset.

Where the operating schedule for the controller is generated based on using the mathematical model and a representative customer baseline (CBL) energy profile, the economic demand response revenue may be computed based on the forecast wholesale electricity price, the electricity generation by the energy storage asset, the electricity consumption by the energy storage asset, and the representative CBL energy profile for the energy consuming asset.

In an example herein, a portion of the energy of the energy storage asset may be committed to the regulation market. That is, the wholesale electricity market for the energy customer would include an energy market and a regulation market. In an example where the forecast wholesale electricity price is for the energy market, the operating schedule for the controller may specify optimal time intervals for use of the energy storage asset in the regulation market. For example, if the forecast wholesale electricity price for the energy market is projected to fall below a predetermined threshold value during a time interval, the operating schedule for the controller may recommend of the energy storage asset in the regulation market during that time interval. Where the forecast wholesale electricity price for the energy market is projected to fall below a predetermined threshold value during a time interval, the operating schedule for the controller may recommend use of the energy storage asset in the regulation market during that time interval.

According to an example of the principles herein, the wholesale electricity market may include both the energy market and the regulation market, and the operating schedule generated may facilitate implementation of the energy storage asset in both the energy market and the regulation market. According to a principle of virtual partitioning described herein, the operating schedule for the controller may be configured so that the energy customer may participate in both the energy market and the regulation market concurrently the energy storage asset. In a non-limiting example, the operating schedule for the controller of the energy storage asset may specify that, during a given time interval, a first portion of an available state of charge (SOC) of the energy storage asset may be used in the energy market and a second portion of the available SOC of the energy storage asset may be committed to the regulation market. The operating schedule generate for the controller may be used to energy-related revenue for the energy consumer based on both the energy market and the regulation market. The principles and implementations described above in connection to FIG. 1 are also applicable to a system operating according to the principles of virtual partitioning.

The apparatus 10 illustrated in FIG. 2 may be used to implement the virtual partitioning described herein. In this non-limiting example, the at least one memory 12 is configured to store processor-executable instructions 14 and a mathematical model 15 for the at least one energy storage asset, where the mathematical model determines the operating schedule for the controller based on data 16 associated with parameters, including but not limited to, an operation characteristic of the energy storage asset, an operation characteristic of the energy consuming asset in communication with the at least one energy storage asset, and a forecast wholesale electricity price associated with the wholesale electricity market.

In this non-limiting example of virtual partitioning, the at least one processing unit 13 executes the processor-executable instructions 14 stored in the memory 12 at least to determine the operating schedule for the controller of the energy storage asset using the mathematical model 15, where the operating schedule specifies, during a time interval less than time period T, a proportion of an available state of charge (SOC) of the energy storage asset for use in the energy market and a remaining proportion of the available SOC of the energy storage asset for use in the regulation market. The at least one processing unit 13 also executes processor-executable instructions 14 to control the communication interface 11 to transmit to the energy customer 17 the operating schedule that has been determined for the controller and/or controls the memory 12 to store the determined operating schedule for the controller. In a non-limiting example, the processing unit 13 may execute processor-executable instructions 14 to control the communication interface 11 to transmit to the operating schedule directly to the controller.

In a non-limiting example, the operation characteristic of the at least one energy storage asset can be at least one of a state of charge, a charge rate, a degree of non-linearity of charge rate a discharge rate, a degree of non-linearity of discharge rate, a round trip efficiency, and a degree of life reduction. The proportion of the available SOC of the energy storage asset for use in the energy market may be supplied as a direct-current (DC) signal, while the remaining proportion of the available SOC of the energy storage asset for use in the regulation market may be delivered at a variable charge rate or variable discharge rate.

In an example where the energy storage asset is used in both the energy market and the regulation market, constraints may be placed on the total amount of energy used. For example, the total SOC of the energy storage asset over the time that it is used in both markets can be constrained to be depleted to no less than a minimum allowed SOC value or charged to no more than a maximal allowed SOC value. In an example, the sum of the proportion of the available SOC of the at least one energy storage asset for use in the energy market and the remaining proportion of the available SOC of the at least one energy storage asset for use in the regulation market can be constrained to be no less than a minimal allowed SOC and no more than a maximal allowed SOC. As a non-limiting example, the maximal allowed SOC of the energy storage asset may be set at 80%, and the minimal allowed SOC may be set at 20%.

Figure 3:
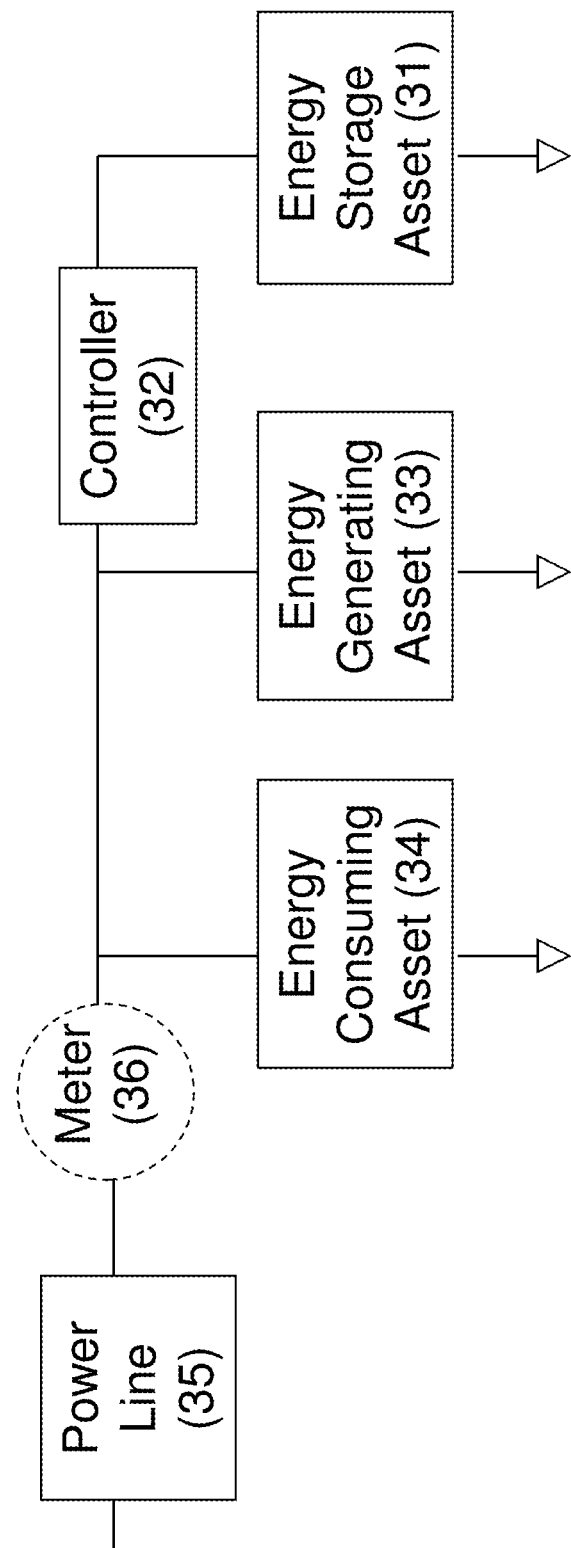
FIG. 3 shows an example system that includes an energy storage asset, a controller, an energy generating asset, and an energy consuming asset, according to a principle described herein.

The apparatuses and methods described herein are also applicable to a system as depicted in the example of FIG. 3. In this example, the apparatus includes an energy storage asset 31, a controller 32 in communication with the energy storage asset 31, an energy generating asset 33 and an energy consuming asset 34 in communication with a power line 35. The controller 32 in communication with the energy storage asset 31 facilitates charging of the energy storage asset 31 using the electricity supplied by power line 35. The controller 32 also facilitates feeding power generated by a discharge of the energy storage asset 31 to the power line 35. Non-limiting examples of energy generating assets include photovoltaic cells, fuel cells, gas turbines, diesel generators, flywheels, electric vehicles, and wind turbines. As depicted in the non-limiting example of FIG. 1, the controller 32, the energy storage asset 31, the energy generating asset 33, and the energy consuming asset 34 may be located behind a power meter 35. For example, all of the controller 32, the energy storage asset 31, the energy generating asset 33, and the energy consuming asset 34 may be located at one or more facilities of the energy consumer.

In the non-limiting example of FIG. 3, the controller 32 facilitates the communication between the energy consuming asset, the energy storage asset, and the energy generating asset. In other examples, the energy consuming asset may communicate with the energy storage asset via one or more other components including the controller 32.

An apparatus according to the principles of FIG. 2 may be implemented relative to the system of FIG. 3 to generate an operating schedule for the controller 32. In this example, the mathematical model facilitates determination of the operating schedule for the controller of the at least one energy storage asset further based at least in part on an expected energy-generating schedule of the energy generating asset in communication with the energy storage asset and the energy consuming asset. Any principles and/or implementations described herein, including above, in connection with FIG. 1 are also applicable to the system of FIG. 3.

Figure 4:
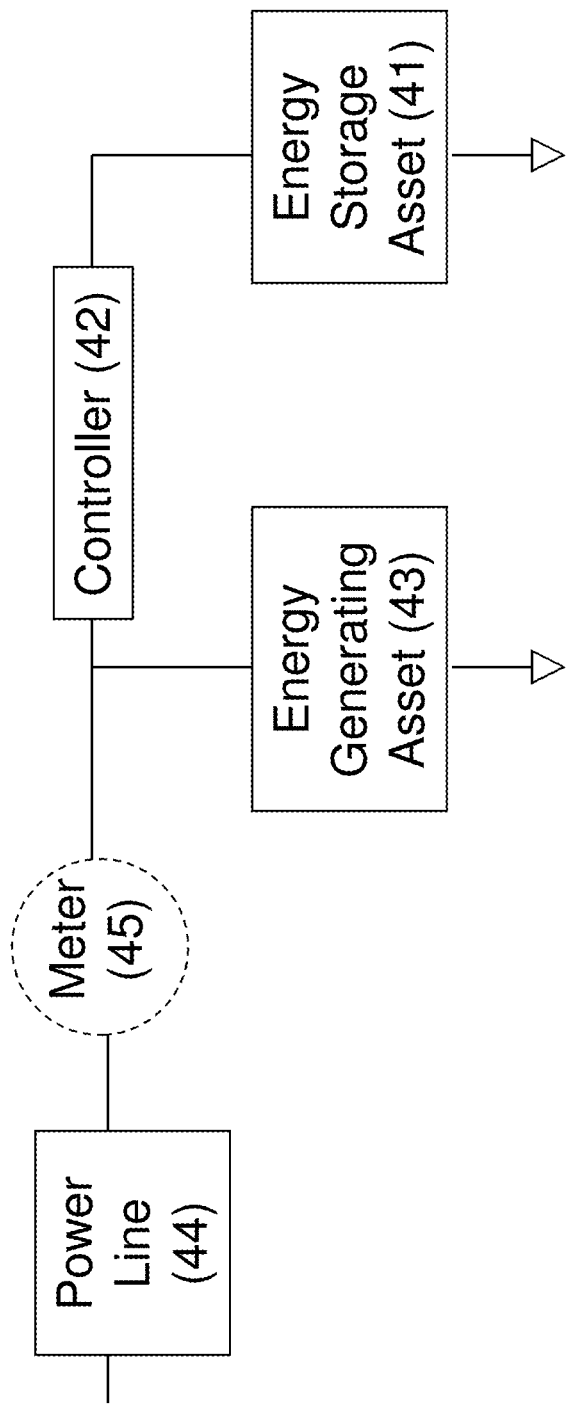
FIG. 4 shows an example system that includes an energy storage asset, a controller, and an energy generating asset, according to a principle described herein.

The apparatuses and methods described herein are also applicable to a system as depicted in the example of FIG. 4. In this example, the apparatus includes an energy storage asset 41, a controller 42 in communication with the energy storage asset 41, and an energy generating asset 43 in communication with a power line 44. The controller 42 facilitates charging of the energy storage asset 31 using the electricity supplied by power line 44. The controller 42 also facilitates feeding power generated by a discharge of the energy storage asset 41 to the power line 44. Non-limiting examples of energy generating assets include photovoltaic cells, fuel cells, gas turbines, diesel generators, flywheels, electric vehicles, and wind turbines. As depicted in the non-limiting example of FIG. 4, the controller 42, the energy storage asset 41, and the energy generating asset 43 may be located behind a power meter 45. For example, all of the controller 42, the energy storage asset 41, and the energy generating asset 33 may be located at one or more facilities of the energy consumer.

In the non-limiting example of FIG. 4, the controller 42 facilitates the communication between the energy storage asset and the energy generating asset. In other examples, the energy consuming asset may communicate with the energy storage asset via one or more other components including the controller 42.

An apparatus according to the principles of FIG. 2 may be implemented relative to the system of FIG. 4 to generate an operating schedule for the controller 42. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 4.

In a non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market. In this example, the apparatus includes at least one communication interface, at least one memory to store processor-executable instructions and a mathematical model for the at least one energy storage asset, and at least one processing unit. The mathematical model facilitates determination of the operating schedule for the controller based at least in part on an operation characteristic of the at least one energy storage asset, an expected energy-generating schedule of the energy generating asset in communication with the energy storage asset, and a forecast wholesale electricity price associated with the wholesale electricity market. The at least one processing unit can be configured to determine the operating schedule for the controller of the at least one energy storage asset using the mathematical model, and control the at least one communication interface to transmit to the energy customer the operating schedule for the controller of the at least one energy storage asset and/or controls the at least one memory so as to store the determined operating schedule for the controller.

In this example, the at least one processing unit can be configured to determine the operating schedule for the controller of the at least one energy storage asset using the mathematical model by minimizing a net energy-related cost over the time period T. The net-energy related cost is based at least in part on the amount of energy generation by the at least one energy generating asset, electricity generation by the at least one energy storage asset; and electricity consumption by the at least one energy storage asset. The energy-related revenue available to the energy customer is based at least in part on the minimized net energy-related cost. The net energy-related cost may be specified as a difference between an electricity supply cost and an economic demand response revenue over the time period T. The energy generating asset may be a photovoltaic cell, a fuel cell, a gas turbine, a diesel generator, a flywheel, an electric vehicle, or a wind turbine. The operation characteristic of the at least one energy storage asset may be a state of charge, a charge rate, a degree of non-linearity of charge rate a discharge rate, a degree of non-linearity of discharge rate, a round trip efficiency, or a degree of life reduction.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule. The energy-related revenue available to the energy customer over the time period T is based at least in part on a wholesale electricity market, and the wholesale electricity market includes an energy market and a regulation market. In this example, the apparatus includes at least one communication interface, at least one memory to store processor-executable instructions and a mathematical model for the at least one energy storage asset, and at least one processing unit. The mathematical model facilitates a determination of the operating schedule for the controller based at least in part on an operation characteristic of the at least one energy storage asset, an expected energy-generating schedule of an energy generating asset in communication with the energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the amount of energy generation by the at least one energy generating asset, duration of energy storage asset participation in the regulation market, electricity generation by the at least one energy storage asset and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller.

In this example, the available output of the controller may be a charge rate of the at least one energy storage asset or a discharge rate of the at least one energy storage asset. The net energy-related cost is specified as a difference between an electricity supply cost and an economic demand response revenue over the time period T. The operation characteristic of the at least one energy storage asset may be a state of charge, a charge rate, a degree of non-linearity of charge rate a discharge rate, a degree of non-linearity of discharge rate, a round trip efficiency, and a degree of life reduction.

Figure 5:
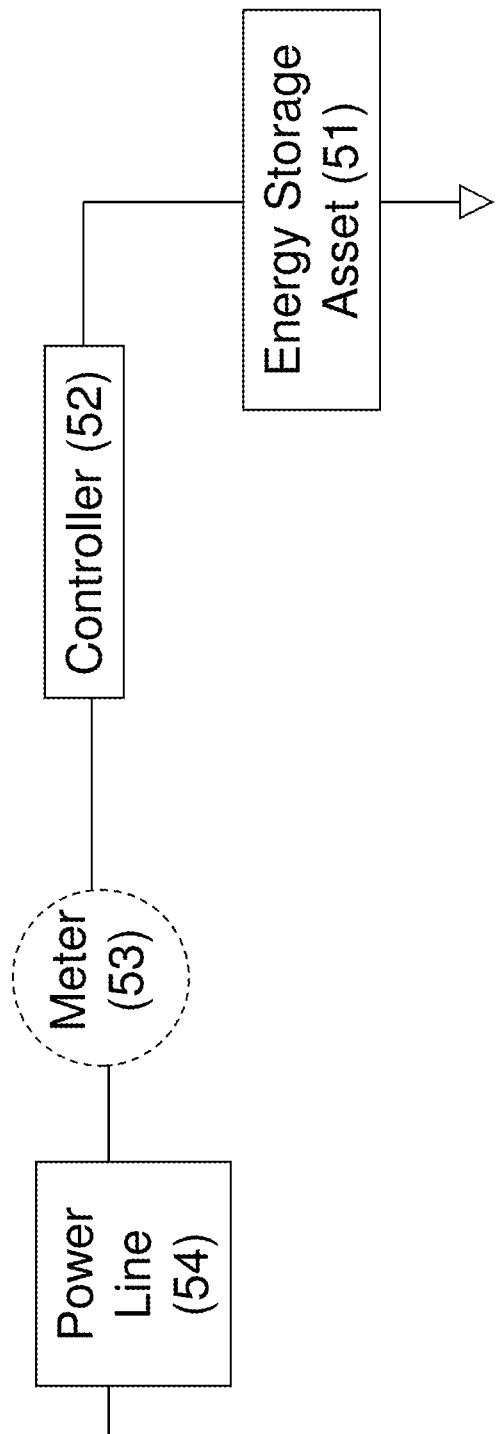
FIG. 5 shows an example system that includes an energy storage asset and a controller, according to a principle described herein.

The apparatuses and methods described herein are also applicable to a system as depicted in the example of FIG. 5. In this example, the apparatus includes an energy storage asset 51, and a controller 52 in communication with the energy storage asset 51 and in communication with a power line 54. The controller 52 facilitates charging of the energy storage asset 31 using the electricity supplied by power line 54. The controller 52 also facilitates feeding power generated by a discharge of the energy storage asset 51 to the power line 54. Non-limiting examples of energy generating assets include photovoltaic cells, fuel cells, gas turbines, diesel generators, flywheels, electric vehicles, and wind turbines. As depicted in the non-limiting example of FIG. 5, the controller 52, and the energy storage asset 51 may be located behind a power meter 53. For example, the controller 52 and the energy storage asset 51 may be located at one or more facilities of the energy consumer.

In the non-limiting example of FIG. 5, the controller 52 facilitates the communication between the energy storage asset and the energy generating asset. In other examples, the energy consuming asset may communicate with the energy storage asset via one or more other components including the controller 52.

An apparatus according to the principles of FIG. 2 may be implemented relative to the system of FIG. 5 to generate an operating schedule for the controller 52. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 5.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market, and wherein the wholesale electricity market includes an energy market and a regulation market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on an operation characteristic of the at least one energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the duration of energy storage asset participation in the regulation market, electricity generation by the at least one energy storage asset, and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller.

In this example, the available output of the controller is a charge rate of the at least one energy storage asset or a discharge rate of the at least one energy storage asset. The net energy-related cost may be specified as a difference between an electricity supply cost and an economic demand response revenue over the time period T. The operation characteristic of the at least one energy storage asset is a state of charge, a charge rate, a degree of non-linearity of charge rate a discharge rate, a degree of non-linearity of discharge rate, a round trip efficiency, or a degree of life reduction.

Energy Asset Modeling

To facilitate the mathematical optimization process for generating a suggested operating schedule for one or more energy assets according to various examples of the principles herein, a mathematical model representing an energy customer's energy asset(s) is formulated and employed to simulate an "energy profile" for the asset(s). In one aspect, the model is essentially specified by one or more mathematical functions that at least in part represent physical attributes of the energy asset(s) themselves as they relate to electricity use and/or electricity generation. Depending on the energy asset(s) operated by the energy customer, the mathematical function(s) defining an asset model may represent a single energy asset or an aggregation of multiple energy assets operated by the customer. For purposes of the discussion herein, the term "asset model," unless otherwise qualified, is used generally to denote a model representing either a single energy asset or an aggregation of multiple energy assets.

To illustrate the general concept of an asset model, a model is first considered for one or more energy assets that not only may be turned "on" or "off," but that may be controlled at various "operating set points." For example, consider the case of a "building asset," e.g., one or more buildings including a heating, ventilation and air conditioning (HVAC) system for temperature control, for which the customer may choose different temperature set points at different times (e.g., thermostat settings); accordingly, in this example, the temperature set points constitute "operating set points" of the building asset. In this example, the magnitude of the operating set point may vary as a function of time t, in a continuous or step-wise manner (e.g., Temp(t)=72 degrees F. for 9 PM<t<9 AM; Temp(t)=68 degrees F. for 9 AM<t<9 PM). In other examples of energy assets that merely may be turned "on" or "off," the magnitude of the operating set point may be binary (i.e., on or off), but the respective on and off states may vary as a function of time t (e.g., over a given time period T).

Based on the notion of time-varying operating set points for energy assets, the term "operating schedule" as used herein refers to an operating set point of one or more energy assets as a function of time, and is denoted by the notation SP(t):

SP(t)≡operating schedule for one or more energy assets.

Figure 6:
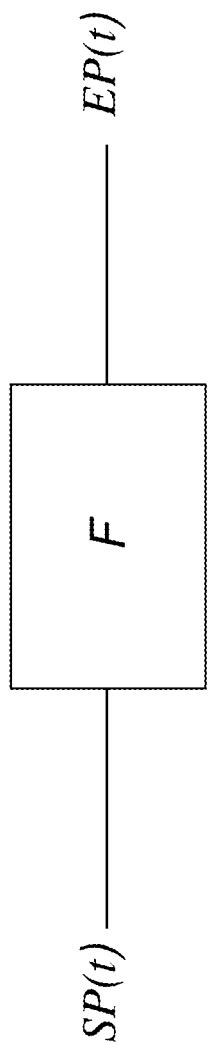
FIG. 6 illustrates an example block diagram representing an asset model according to a principle described herein.

The amount of energy used (and/or generated) by a particular asset or group of assets in a given time period T is referred to herein as an "energy profile." In various implementations discussed herein, the energy profile of one or more assets often depends at least in part on a given operating schedule SP(t) for the asset(s) during the time period T. For a fixed-load asset, the energy profile may not depend on a given operating schedule SP(t). Accordingly, an energy asset model specifies one or more mathematical functions for calculating an energy profile (i.e., electricity use and/or electricity generation as a function of time) for the asset(s), based on a proposed operating schedule for the asset(s) applied as an input to the model. The one or more functions constituting the asset model are denoted herein generally as F (and for simplicity the term "function" when referring to F may be used in the singular), and the model may be conceptually represented using mathematical notation as:

$$F(SP(t))=EP(t), \qquad \text{Eq. 1}$$

where the operating schedule SP(t) is an argument of the function F, and the energy profile of the modeled asset(s) as a function of time is denoted as EP(t). In a non-limiting example, EP(t) has units of MWh. FIG. 6 illustrates a simple block diagram representing the asset model given by Eq. 1.

In various examples, the function(s) F defining a particular asset model may be relatively simple or arbitrarily complex functions of the argument SP(t) (e.g., the function(s) may involve one or more constants, have multiple terms with respective coefficients, include terms of different orders, include differential equations, etc.) to reflect how the asset(s) consume or generate energy in response to the operating schedule SP(t). In general, the particular form of a given function F, and/or the coefficients for different terms, may be based at least in part on one or more physical attributes of the asset(s), and/or the environment in which the asset(s) is/are operated, which may impact the energy profile of the asset(s) pursuant to the operating schedule. More specifically, depending on the type of energy asset(s) being modeled, the mathematical model may be formulated to accept other inputs (in addition to the operating schedule SP(t)), and/or to accommodate variable parameters of a given function F (e.g., via time-dependent coefficients of different terms of the function), to facilitate calculation of the energy profile EP(t) based on a proposed operating schedule SP(t).

For example, in the case of the building asset discussed above, and/or other assets for which thermodynamic considerations are pertinent, various internal factors that may impact the asset's energy profile in general (e.g., building occupancy; a presence of equipment such as computers and other instrumentation that may affect heating or cooling in an environment; thermal inertia due to insulation, building materials, windows; etc.) may be considered in the formulation of the form of the function F itself, and/or coefficients for different terms of the function F. In some examples discussed in further detail below, the function F may be dynamically adjusted based on observing actual energy usage over time by the asset(s) pursuant to control via a particular operating schedule (i.e., coefficients of function terms initially may be estimated, and subsequently adjusted over time based on real-time feedback from controlled assets).

Figure 7:
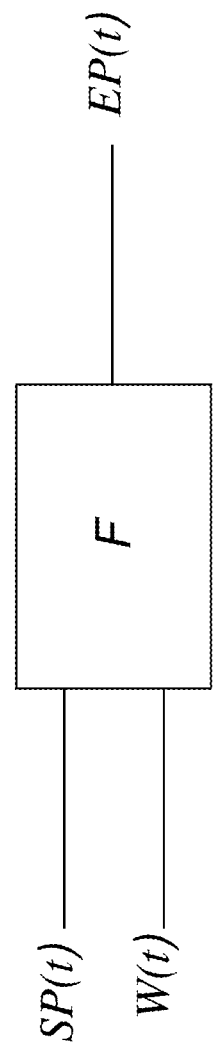
FIG. 7 illustrates an example block diagram representing another asset model according to a principle described herein.

Similarly, the mathematical model for the asset(s) may be configured to consider as an input to the model actual or forecast ambient environmental conditions (e.g., temperature, humidity, ambient light/cloud cover, etc.) as a function of time, collectively denoted as "weather information" W(t), which may impact the energy profile of one or more assets. In this case, the model may be conceptually represented as:

$$F(SP(t),W(t))=EP(t), \qquad \text{Eq. 2}$$

where both the operating schedule SP(t) and the weather information W(t) are arguments of the function F. FIG. 7 illustrates a simple block diagram representing the asset model given by Eq. 2. It should be appreciated that, while weather information W(t) is noted above as providing another possible input to the model in addition to the operating schedule SP(t), in other examples one or more other inputs to the model may be provided and considered as arguments to the function F (and accordingly taken into consideration in the function) for purposes of calculating an energy profile EP(t) for the asset(s).

Figure 8:
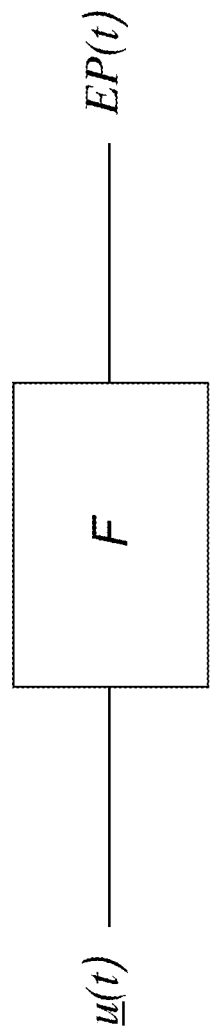
FIG. 8 illustrates an example block diagram representing another asset model according to a principle described herein.

In another example herein, the mathematical model for a system that includes a controllable asset, such as an energy storage asset and an associated controller, may be configured to consider as an input to the model the control vector for the controller as a function of time, denoted as $\underline{u}(t)$, which may impact the energy profile. In this case, the model may be conceptually represented as:

$$F(\underline{u}(t))=EP(t), \qquad \text{Eq. 3}$$

where both the control vector of the controller is an argument of the function F. FIG. 8 illustrates a simple block diagram representing the asset model given by Eq. 3. It should be appreciated that, while the control vector u(t) is noted above as providing input to the model, in other examples, one or more other inputs to the model may be provided and considered as arguments to the function F (and accordingly taken into consideration in the function) for purposes of calculating an energy profile EP(t) for the asset(s).

Figure 9:
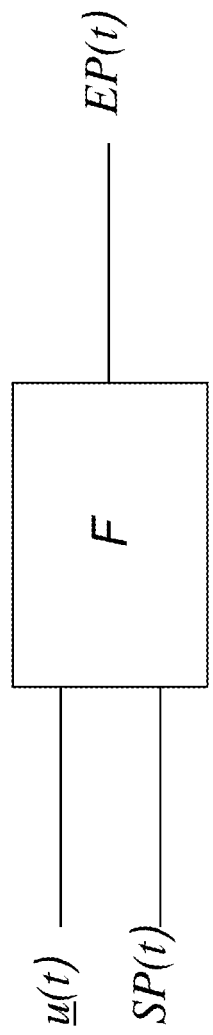
FIG. 9 illustrates an example block diagram representing another asset model according to a principle described herein.

In yet another example herein, the mathematical model for a system that includes an energy consuming asset, such as but not limited to a building, and a controllable asset, such as but not limited to an energy storage asset and an associated controller, may be configured to consider as an input to the model the control vector for the controller as a function of time, denoted as $\underline{u}(t)$, and temperature dependent operating set points for the energy consuming asset (its operating schedule). In this case, the model may be conceptually represented as:

$$F(\underline{u}(t),SP(t))=EP(t), \qquad \text{Eq. 4}$$

where both the control vector of the controller is an argument of the function F. FIG. 9 illustrates a simple block diagram representing the asset model given by Eq. 4. The control vector for a controller, $\underline{u}(t)=C_t+D_t$, may be expressed as:

$$C_t=u_{1,t}*C/D_{max}$$

$$D_t=u_{2,t}*C/D_{max} \qquad \text{Eq. 5}$$

with the constraints that $u_{1,t}*u_{2,t}=0$ and $0 \leq u_{1,t}, u_{2,t} \leq 1$, where represents $C/D_{max}$ the maximum charge rate or discharge rate capacity of the controller in communication with the energy storage asset.

Figure 10:
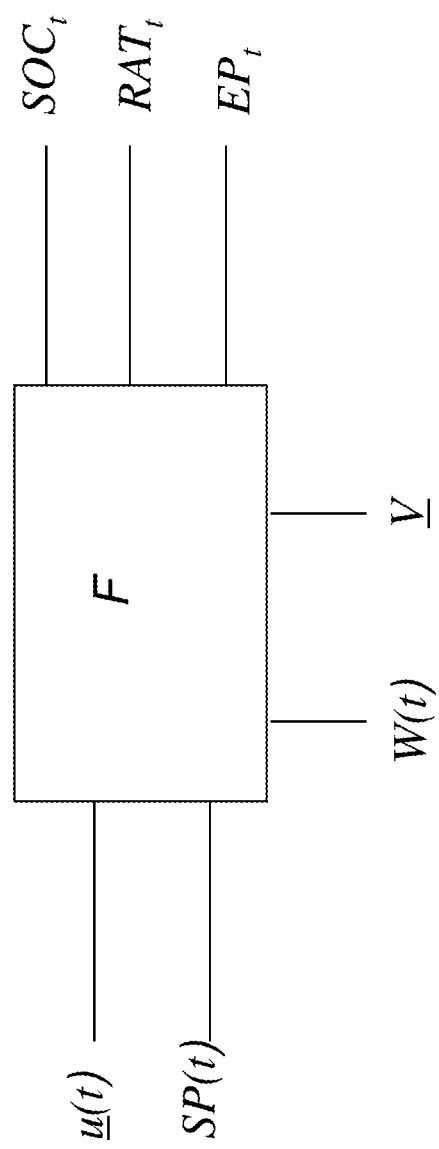
FIG. 10 illustrates an example block diagram representing another asset model according to a principle described herein.

In yet another example herein, the mathematical model for a system that includes an energy consuming asset, such as but not limited to a building, and a controllable asset, such as but not limited to an energy storage asset and an associated controller, may be configured to consider as an input to the model the control vector for the controller as a function of time, denoted as $\underline{u}(t)$, and temperature dependent operating set points for the energy consuming asset (its operating schedule). FIG. 10 illustrates a simple block diagram representing the asset model for such as system according to the principles herein. In this case, the model may have outputs of the state of charge ($SOC_t$) of the energy storage asset as a function of time t, the return-a-temperature ($RAT_t$) as a function of time t (for, e.g., a HVAC or other similar equipment), and the energy profile of the energy consuming asset (e.g., the building). Other inputs to the system can be weather information (W(t)) and/or feedback from other energy assets in the system ($\underline{V}$). This model can be used, e.g., for co-optimization of an energy storage asset and an energy consuming asset for the energy market.

In an example according to a principle herein, once an appropriate asset model is established for a given energy asset or group of energy assets, different candidate operating schedules may be applied to the model to simulate how the energy profile EP(t) of the asset(s) is affected as a function of time, over a given time period T, by the different operating schedules.

An example technique for facilitating determination of optimal operating schedule for energy cost reduction and/or revenue generation from wholesale electricity markets according to various examples disclosed herein is as follows. In this example, the system includes an energy consuming asset, a controller of the energy storage asset, and a controllable energy consuming asset. A plurality of first candidate operating schedules is selected for the controller, and a plurality of second candidate operating schedules is selected for the energy consuming asset. Each second candidate operating schedule for the energy consuming asset is different from the BAU operating schedule for the energy consuming asset. The plurality of first and second candidate operating schedules are successively applied to the mathematical model to generate corresponding plurality of simulated energy profiles for the energy storage asset and the energy consuming asset. A plurality of projected net energy-related costs to the energy customer are computed, where each projected net energy-related cost is computed based at least in part on the representative CBL energy profile and the simulated energy profiles corresponding to the respective first and second candidate operating schedules and the forecast wholesale electricity price. Respective ones of the first and second candidate operating schedules corresponding to one simulated energy profile of the plurality of simulated energy profiles that results in a minimum net energy-related cost of the plurality of net energy-related costs calculated are selected as an optimal first operating schedule and an optimal second operating schedule. That is, namely, this technique can be implemented to simulate how energy assets consume/generate electricity based on different candidate operating schedules for the asset(s), and to select a particular operating schedule that facilitates a particular economic goal of the energy customer.

In another example, the operating schedules for the energy storage asset and energy consuming asset can be calculated in tandem based on minimizing the net energy-related costs (NEC), as discussed in greater detail below.

Operating Schedules and Constraints

In considering various operating schedules SP(t) that may be applied to the asset model so as to simulate a corresponding energy profile EP(t), in some instances SP(t) may not be varied freely. Such limitations on candidate operating schedules may be due at least in part to physical limitations of the asset(s) being modeled, and/or limitations on operation of the asset(s) dictated by the energy customer itself. For example, in some instances the customer may want to constrain the range in which the magnitude of SP(t) may be varied at any given time, and/or the customer may wish to designate particular periods of time (e.g., within the given time period T of interest) during which particular values of SP(t) cannot be changed (or only changed in a limited manner).

For purposes of illustration, again consider a building asset with an HVAC system. The customer may specify that, in considering candidate operating schedules SP(t) for the building asset, temperature set points (i.e., the magnitude of SP(t) in this example) must remain in a range of from between 65 to 75 degrees F. in any proposed operating schedule; furthermore, the customer may dictate that during a certain time frame, the temperature set point may not exceed 70 degrees F. In general, magnitude and/or timing limitations placed on a candidate operating schedule SP(t) for one or more modeled assets are referred to herein as "constraints" on the operating schedule.

The concept of candidate operating schedules for one or more modeled energy assets subject to one or more "constraints" is denoted herein as:

SP(t)$_{Constraints}$=operating schedule for one or more energy assets subject to constraints In an example, the system includes an energy storage asset, and constraint may be placed on the allowed state of charge (SOC) of the energy storage asset. For example, the constraint may be placed that the SOC does should not be allowed to fall below a minimal SOC value (i.e., not too depleted) and/or that the SOC does should not be allowed to go above a maximal SOC (i.e., not overly-charged).

Business-As-Usual (BAU) Conditions and Customer Baseline (CBL) Energy Profiles

Once an appropriate asset model is established for a given energy asset or group of energy assets, a particular operating schedule of interest in some examples is referred to herein as a "typical" or "business-as-usual" (BAU) operating schedule (also referred to herein as "BAU conditions"), denoted as SP(t)$_{BAU}$. In particular, "BAU conditions" refer to an operating schedule that an energy customer would typically adopt for its energy asset(s), absent the incentive to reduce energy costs and/or earn energy-related revenue from wholesale electricity markets. Again turning to the example of a building asset for purposes of illustration, absent any incentive to change its behavior, during a summer season in which cooling is desired an energy customer may typically set the thermostat (i.e., temperature set points) for the building asset at 72 degrees F. from 9 PM to 9 AM, and at 68 degrees F. from 9 AM to 9 PM; this can be represented conceptually using the notation adopted herein as:

$$SP(t)_{BAU} = \begin{Bmatrix} 72, & 9 \text{ PM} < t < 9 \text{ AM} \\ 68, & 9 \text{ AM} < t < 9 \text{ PM} \end{Bmatrix}.$$

When a typical operating schedule SP(t)$_{BAU}$ is applied to the asset model, the particular energy profile generated by the model is a special case referred to herein as a simulated "customer baseline" (CBL) energy profile, denoted as CBL (t). Using the example relationship given in Eq. 2 above (which includes consideration of weather information), the special case of a CBL energy profile may be conceptually represented mathematically as:

$$F(SP(t)_{BAU}, W(t)) = CBL(t), \qquad \text{Eq. 6}$$

where the typical operating schedule SP(t)$_{BAU}$ is an argument of the function F (in this example together with the weather information W(t)), and the CBL energy profile of the modeled asset(s) as a function of time is denoted as CBL(t).

Although consideration of weather information W(t) is included in the example above, it should be appreciated that the simulation of a customer baseline (CBL) energy profile in other examples may not consider weather information (as such information may not be relevant to the energy profile of the asset(s) in question). It should also be appreciated that while the simulation of a CBL energy profile may be useful for mathematical optimization techniques employed in some examples to facilitate energy cost reduction and/or revenue generation from particular wholesale electricity markets (e.g., economic demand response "energy markets"), simulation of a CBL energy profile may not be applicable or necessary in other examples to facilitate energy cost reduction and/or revenue generation from wholesale electricity markets.

Objective Cost Functions and Optimal Control

For purposes of the present disclosure, an "objective cost function" specifies all energy-related costs and energy-related revenues associated with operating one or more modeled energy assets of an energy customer so as to achieve a particular economic goal (an economic "objective"). In one aspect, an objective cost function incorporates the function(s) F representing the mathematical model for one or more energy assets, and specifies an energy customer's "net energy-related cost" (e.g., in dollars) associated with operating the modeled asset(s) over a given time period T. The energy customer's net energy-related cost as given by the objective cost function is denoted herein as NEC$:

NEC$≡net energy-related cost to operate one or more energy assets.

As discussed in greater detail below, objective cost functions providing a net energy-related cost NEC$ according to different examples may have a variety of respective cost and revenue terms, based at least in part on the types of asset(s) being operated and the particular revenue-generation objective(s) (e.g., the particular wholesale electricity market(s) from which revenue is being sought).

For example, in some examples, the energy-related costs included in the objective cost function may include "actual" energy-related costs (e.g., retail electricity costs, wholesale electricity costs representing revenue earned by the energy customer, etc.). In some examples, the energy-related costs included in the objective cost function additionally or alternatively may include "indirect" energy-related costs, such as convenience/comfort costs associated with the energy customer's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets). Similarly, an objective cost function may include one or more terms specifying energy-related revenues corresponding to one or more wholesale electricity markets (e.g., "energy markets," "synchronized reserve," "regulation").

To provide a preliminary illustration of concepts germane to an object cost function specifying a net energy-related cost NEC$, an example relating to economic demand response revenue from the wholesale electricity "energy markets" is first considered. To this end, retail electricity prices (i.e., what the energy customer pays a "utility" for electricity usage) and wholesale electricity-related product prices available to the energy customer respectively are denoted as:

Retail$(t)=price of electricity from a retail electricity provider ("utility"); and Wholesale$(t)=price of electricity-related product on applicable wholesale electricity market, where the retail electricity price Retail$(t) and the wholesale electricity-related product price Wholesale$(t) may vary independently of each other as a function of time. In an example, the units of the retail electricity price Retail$(t) and the wholesale electricity-related product price Wholesale$(t) are $/MWh.

The wholesale price Wholesale$(t) can be dictated by (e.g., based at least in part on) the "locational marginal price" (LMP) as a function of time, as noted above (see Background section). However, depending on a given wholesale electricity market and/or a particular electricity-related product in question, it should be appreciated that the wholesale price Wholesale$(t) may be based on other and/or additional factors. Also, practically speaking, wholesale prices are not continuous functions of time; rather, as discussed above, wholesale prices based on the LMP may be calculated periodically at specified nodes of the grid (e.g., every 5 minutes, every half-hour, every hour) depending on the particular market in which the energy customer is participating. Accordingly, it should be appreciated that Wholesale$(t) typically is a discrete function of time, with t having some periodicity (e.g., 5 minutes, 30 minutes, 60 minutes).

Given the notation above for retail and wholesale prices, the energy customer's modeled retail electricity costs (or "supply costs"), for operating one or more modeled electricity-consuming assets pursuant to a particular operating schedule SP(t) applied to an asset model, is denoted herein as Supply$(t), given by:

$$\text{Supply\$}(t) = EP(t) * \text{Retail\$}(t), \qquad \text{Eq. 7}$$

wherein EP(t) is the energy profile of the modeled asset(s) (e.g., given by any of Eqs. 1-4 above).

For the energy storage asset, the energy customer's "supply costs" for charging the asset can be denoted herein as Supply$(t)$_{ES}$, given by:

$$\text{Supply\$}(t)_{ES} = EP(t) * \text{Retail\$}(t), \qquad \text{Eq. 8}$$

wherein EP(t) is the energy profile of the modeled energy storage asset(s). Since the energy profile for an energy storage asset can be represented based on a charge rate ($C_t$) for a time step (t<T) over the amount of time of charging ($\Delta t$), the supply costs can be expressed as:

$$\text{Supply\$}(t)_{ES} = C_t * \Delta t * \text{Retail\$}(t). \qquad \text{Eq. 9}$$

The charge rate ($C_t$) may be the maximum charge rate of the energy storage asset, or a charge rate less than the maximum charge rate. For example, in different examples herein, the output of the controller may modify the charge rate of the energy storage asset to values that are less than the maximum charge rate.

If the system includes an energy storage asset and an energy generating asset, the total supply costs can be expressed, in a non-limiting example, as the energy storage asset (Supply$(t)$_{ES}$) reduced by a cost amount based on the amount of energy provided by the energy generating asset ($EG_k$). In an example, the total supply costs can be expressed as:

$$\text{Supply\$}(t)_{total} = (C_k - EG_k) * \Delta t * \text{Retail\$}(t). \qquad \text{Eq. 10}$$

Supply costs may also apply to the system by virtue of the reduction in life of the energy storage asset. An energy storage asset may have a limited life depending on its rating of expected charge/discharge cycles. A portion of the costs associated with ultimately replacing an energy storage asset at the end of its lifetime may be included in the supply costs based on the number of charge/discharge cycles it is expected to undergo when implemented in an energy market and/or a regulation market as described herein. The lifetime reduction supply costs may also depend on the number of kWh is used in each charge or discharge cycle, and/or for what length of time the energy storage asset is used in a market (energy, regulation, etc.). For example, the contribution to the supply costs based on the replacement cost (Replacement$) may be computed according to the expression:

$$\text{Supply\$}(t)_{LIFE} = \text{Replacement\$}/n \qquad \text{Eq. 11}$$

where n represents an effective number of charge/discharge cycles. The effective number of charge/discharge cycles can depend on the number of cycles the asset is expected to undergo when implemented in an energy market and/or a regulation market, the number of kWh is used in each charge or discharge cycle, and/or for what length of time the energy storage asset is used in a given market. This lifetime supply cost would be additive to any of the expressions for supply costs described herein for a system that includes an energy storage asset.

With respect to economic demand response revenue from the wholesale electricity energy markets, in the present example it is presumed that the energy customer is amenable to operating its energy asset(s) pursuant to a candidate operating schedule that is different than its "typical operating schedule" or BAU conditions (i.e., SP(t)$_{BAU}$), such that the energy profile EP(t) of the asset(s) will be on average lower than the customer baseline CBL(t) (see Eq. 6 and related description above). Altering the energy profile of the asset(s) with respect to the customer baseline, pursuant to a change in behavior represented by a candidate operating schedule different than BAU conditions, provides the source of opportunity for generating economic demand response revenue from the wholesale electricity energy markets. Accordingly, a wholesale electricity energy market "demand response revenue," denoted herein as DR$(t)$_{EM}$, is given generally by:

$$\text{DR\$}(t)_{EM} = \max\{0, [(CBL(t) - EP(t)) * \text{Wholesale\$}(t)]\}. \qquad \text{Eq. 12}$$

For an energy storage asset in an energy market, a demand response revenue may be denoted herein as DR$(t)$_{ES}$, is given generally by:

$$\text{DR\$}(t)_{ES} = (0 - (-(D_t)) * \Delta t * \text{Wholesale\$}(t). \qquad \text{Eq. 13}$$

As described herein, a system that includes an energy storage asset can participate in both an energy market (at a price of Wholesale$(t)) and in a regulation market (at a price of regulation$(t)). In this example, the demand response revenue may be computed herein as DR$(t)$_{ES}$, denoted by:

$$\text{DR\$}(t)_{ES} = (\epsilon D_t) * \Delta t * \text{Wholesale\$}(t) + (\gamma D_t) * \Delta t * \text{regulation\$}(t) \qquad \text{Eq. 14}$$

where $D_t$ denotes the discharge rate of the energy storage asset at a time step. Where the system participates in the energy market and the regulation market at different points in time during overall time period T, both multipliers of the discharge rate, $\epsilon$ and $\gamma$, may be equal to 1. In different examples herein, the output of the controller may modify the discharge rate of the energy storage asset to values that are less than the maximum discharge rate. Using the principles of virtual partitioning described herein, by apportioning an output of the controller in communication with the energy storage asset, a portion of the discharge rate may be directed to the regulation market and another portion directed to the energy market during a given time step. As a non-limiting example, the operating schedule determined as described herein may cause the controller to discharge the energy storage asset at a discharge rate of $\epsilon D_t$ to the energy market, while concurrently respond to the regulation market at a discharge rate of $\gamma D_t$ along shorter timescales (such as but not limited to at 2-second intervals or minute-by-minute time intervals). Here, the constraint on the values may be $\epsilon + \gamma \leq 1$ if $D_t$ represents the maximum discharge rate of the energy storage asset.

In a non-limiting example, where the regulation price is not based on the discharge rate, but rather depends only on the time period of commitment of the energy storage asset to the regulation market, the demand response revenue may be computed as:

$$DR\$(t)_{ES}=(\epsilon D_t)*\Delta t*\text{Wholesale}\$(t)+\text{regulation}\$(t)*\Delta t \quad \text{Eq. 15}$$

In another example, the demand response revenue for a system that includes an energy storage asset and an energy generating asset participating in an energy market may be computed as:

$$DR\$(t)_{ES+EG}=(D_t)*\Delta t*\text{Wholesale}\$(t)+(E_{EG})*\text{Wholesale}\$(t) \quad \text{Eq. 16}$$

where $D_t$ denotes the discharge rate of the energy storage asset at a time step and $E_{EG}$ denotes the energy provided by the energy generating asset.

According to the principles described herein, a demand response may also be generated for a system that includes an energy storage asset and an energy generating asset participating in both an energy market and a regulation market.

Based on the equations for supply costs and demand response above, an example of an objective cost function to provide a net energy-related cost NEC$ over a given time period T for operating the modeled asset(s), considering both retail electricity supply costs and demand response revenue can be computed based on the expression:

$$NEC\$ = \sum_{t}^{T} (\text{Supply}\$(t) - DR\$(t)). \quad \text{Eq. 17}$$

In one example, an objective cost function as exemplified by Eq. 17 may be provided to an optimizer (a particularly-programmed processor, also referred to as a "solver"; such as processor unit 13 of FIG. 2) that implements a mathematical optimization process to determine a suggested operating schedule for the energy asset(s) over the time period T that minimizes the net energy-related cost NEC$. Accordingly, the optimizer solves for:

$$\text{Min}\left[\sum_{t}^{T} (\text{Supply}\$(t) - DR\$(t))\right] \quad \text{Eq. 18}$$

By substituting the pertinent equations for supply costs and demand response (which depends on the energy assets in a given system) back into Eq. 18, the various informational inputs provided to the optimizer may be readily ascertained.

As a non-limiting example, for a system that is participating in the energy market, the various informational inputs provided to the optimizer may be readily ascertained as follows:

$$\text{Min}\left[\sum_{t}^{T} \{(EP(t)*\text{Retail}\$(t)) - (\max\{0, [(CBL(t)-EP(t))*\text{Wholesale}\$(t)]\})\}\right], \quad \text{Eq. 19}$$

where from Eq. 2

$$EP(t)=F(SP(t)|_{Constraints}, W(t)),$$

and from Eq. 6

$$CBL(t)=F(SP(t)_{BAU}, W(t)),$$

where again it is presumed for purposes of illustration that weather information W(t) is relevant in the present example. From the foregoing, it may be seen that one or more of the following inputs may be provided to the optimizer in various examples:

F—one or more functions defining the mathematical model for the energy asset(s);

SP(t)$_{BAU}$—BAU or "typical" operating schedule for the energy asset(s);

Constraints—any timing and/or magnitude constraints placed on candidate operating schedules for the energy asset(s);

W(t)—weather information as a function of time (if appropriate given the type of energy asset(s) being operated);

u(t)—control vector for the controller in communication with the energy storage asset;

Retail$(t)—retail price of electricity as a function of time;

Wholesale$(t)—wholesale price of electricity-related product as a function of time;

Regulation$(t)—regulation price in regulation market as a function of time; and

NEC$—the objective cost function describing the energy customer's net energy-related cost associated with operating the modeled energy asset(s).

Based on the foregoing inputs, the optimizer solves Eq. 19 by finding an "optimal" operating schedule for the energy asset(s), denoted herein as SP(t)$_{opt}$, that minimizes the net energy-related cost NEC$ to the energy customer:

SP(t)$_{opt}$≡"optimal" or suggested operating schedule for one or more energy assets In various implementations described herein, the optimizer may receive one or more inputs, including but not limited to, the weather information W(t), the retail electricity price Retail$(t), and the wholesale price of the electricity-related product Wholesale$(t) (and the regulation price (regulation$(t))) as forecasted values provided from a third-party source, for the time period T over which the optimization is being performed.

While a given optimizer in a particular implementation may employ various proprietary techniques to solve for the minimization of an objective cost function according to various examples of the principles herein, conceptually the optimization process may be generally understood as follows. In various implementations discussed herein, the optimizer generates the operating schedule using the model of the system through an optimal control procedure. In the various example implementations, the optimizer determines an optimal operating schedule over the defined time period (T) by optimizing an objective cost function. For example, the optimizer can be implemented to determine the operating schedule that generates the energy-related revenue by minimizing a function representing the net energy-related costs of the system over the time period (T). The net energy-related costs can be computed based on the supply costs and the demand response revenue as described herein, including in Eqts. 1-19 above. The optimizer optimizes the objective cost function over the entire defined time period (T) to generate the operating schedule. The generated operating schedule can include suggestions, for different specific time intervals within the overall time period T, for when the controller can be used to implement the energy storage asset in the energy market, in the regulation market, or in both the energy market and regulation market (through dynamic partitioning).

In a non-limiting example of an implementation of the optimizer, some number N of candidate operating schedules $SP(t)|_{Constraints}$ or the modeled asset(s) (together with weather information W(t), if appropriate based on a given objective function) can be successively applied to the asset model given by the function(s) F to generate simulated energy profiles EP(t) corresponding to the candidate operating schedules (see Eqs. 1-4). A net energy-related cost NEC$ given by the objective cost function is calculated for each such simulated energy profile EP(t) (see Eq. 17), and the candidate operating schedule that minimizes the objective cost function (i.e., the "optimal" operating schedule $SP(t)_{opt}$ that minimizes the net energy-related cost NEC$) is selected as the suggested operating schedule to be provided to the energy customer.

As noted earlier, the example above in connection with the objective cost function of Eq. 17 is based on actual energy-related costs (e.g., retail electricity cost) Supply$(t). In other examples, the energy-related costs included in a given objective cost function additionally or alternatively may include "indirect" energy-related costs, such as "convenience/comfort" costs associated with the energy customer's adoption of a suggested operating schedule $SP(t)_{opt}$ different than its typical operating schedule $SP(t)_{BAU}$. In one aspect of such examples, a convenience/comfort cost represents an "indirect" cost in that it does not necessarily relate to actual energy-related expenditures, but rather attributes some cost (e.g., in dollars) relating to a change in the customer's behavior with respect to operating its asset(s), based on the incentive of possible energy-related revenue from the wholesale electricity markets.

Accordingly, in some examples, an alternative objective cost function similar to that shown in Eq. 17 may be given as:

$$NEC\$ = \sum_{t}^{T} (Comfort\$(t) + Supply\$(t) - DR\$(t)), \quad \text{Eq. 20}$$

where Comfort$(t) represents a convenience/comfort cost associated with a change in the energy customer's behavior with respect to operating its asset(s).

A convenience/comfort cost Comfort$(t) may be defined in any of a variety of manners according to different examples. For example, in one implementation, a convenience/comfort cost may be based at least in part on a difference (e.g., a "mathematical distance") between a given candidate operating schedule and the typical operating schedule (BAU conditions) for the modeled asset(s)—e.g., the greater the difference between the candidate operating schedule and the typical operating schedule, the higher the convenience/comfort cost (there may be more inconvenience/discomfort attributed to adopting a "larger" change in behavior). This may be conceptually represented by:

$$Comfort\$(t)=G[|SP(t)|_{Constraints}-SP(t)_{BAU}|], \quad \text{Eq. 21}$$

where G specifies some function of the absolute value of the "difference" between a candidate operating schedule (e.g., in a given iteration of the optimization implemented by the optimizer) and the typical operating schedule.

To provide an example of how Eqs. 20 and 21 may be employed in an optimization process to determine a suggested operating schedule $SP(t)_{opt}$ for an energy customer according to one example, again consider a building asset operated by the energy customer, for which a given operating schedule SP(t) is constituted by a temperature set point as a function of time. If $T(t)_{BAU}$ represents the temperature set points constituting a typical operating schedule, and $T(t)|_{Constraints}$ represents different temperature set points constituting a candidate operating schedule that may be adopted to facilitate energy-cost reduction and/or revenue generation, the convenience/comfort cost Comfort$(t) in this example may be defined as a "temperature set point deviation" $T_{dev}(t)$, according to:

$$Comfort\$(t) \equiv T_{dev}(t) = A(|T(t)|_{Constraints} - T(t)_{BAU}|), \quad \text{Eq. 22}$$

where A is a constant that converts temperature units to cost units (e.g., degrees F. to dollars). Eq. 22 specifies that there is a greater "indirect" cost associated with candidate operating schedules having temperature set points that deviate more significantly from the typical temperature set points (albeit within the constraints provided by the energy customer). In this manner, as part of the optimization process, potential revenue from the wholesale electricity markets may be "tempered" to some extent by a perceived cost, included in the objective cost function (see Eq. 20), that is associated with the inconvenience/discomfort of deviating significantly from the typical operating schedule.

In the example above, although the multiplier A in Eq. 22 is discussed as a conversion constant, it should be appreciated that in other examples A may be an arbitrary function having as an argument the absolute value of the difference between a candidate operating schedule and the typical operating schedule as a function of time. More generally, it should be appreciated that a convenience/comfort cost Comfort$(t) is not limited to the "temperature-related" example provided above in connection with a building asset, and that other formulations of a convenience/comfort cost as part of an objective function are possible according to various examples of the principles herein.

In yet other examples of objective cost functions, different cost and revenue terms of a given objective cost function may include corresponding "weighting factors" (e.g., specified by the energy customer), so as to ascribe a relative importance to the energy customer of the respective terms of the objective cost function in arriving at a suggested operating schedule $SP(t)_{opt}$. For example, in some instances, an energy customer may want to emphasize the importance of increasing prospective demand response revenue DR$(t) vis a vis decreasing supply costs Supply$(t) in solving the optimization problem to arrive at a suggested operating schedule; similarly, in other instances, an energy customer may want to emphasize convenience/comfort costs Comfort$(t) vis a vis increasing prospective demand response revenue DR$(t) in solving the optimization problem to arrive at a suggested operating schedule. The ability of an energy customer to tailor a given objective cost function according to weighting factors for respective terms of the objective cost function provides an "elasticity" to the optimization process. Using the objective cost function given in Eq. 20 above as an example, in one example such weighting factors may be included in the specification of an objective cost function as respective term multipliers:

$$NEC\$ = \sum_{t}^{T} [(\alpha * Comfort\$(t)) + (\beta * Supply\$(t)) - (\gamma * DR\$(t))], \quad \text{Eq. 23}$$

where α, β, and γ constitute the weighting factors, and (α+β+γ=1).

Figure 11:
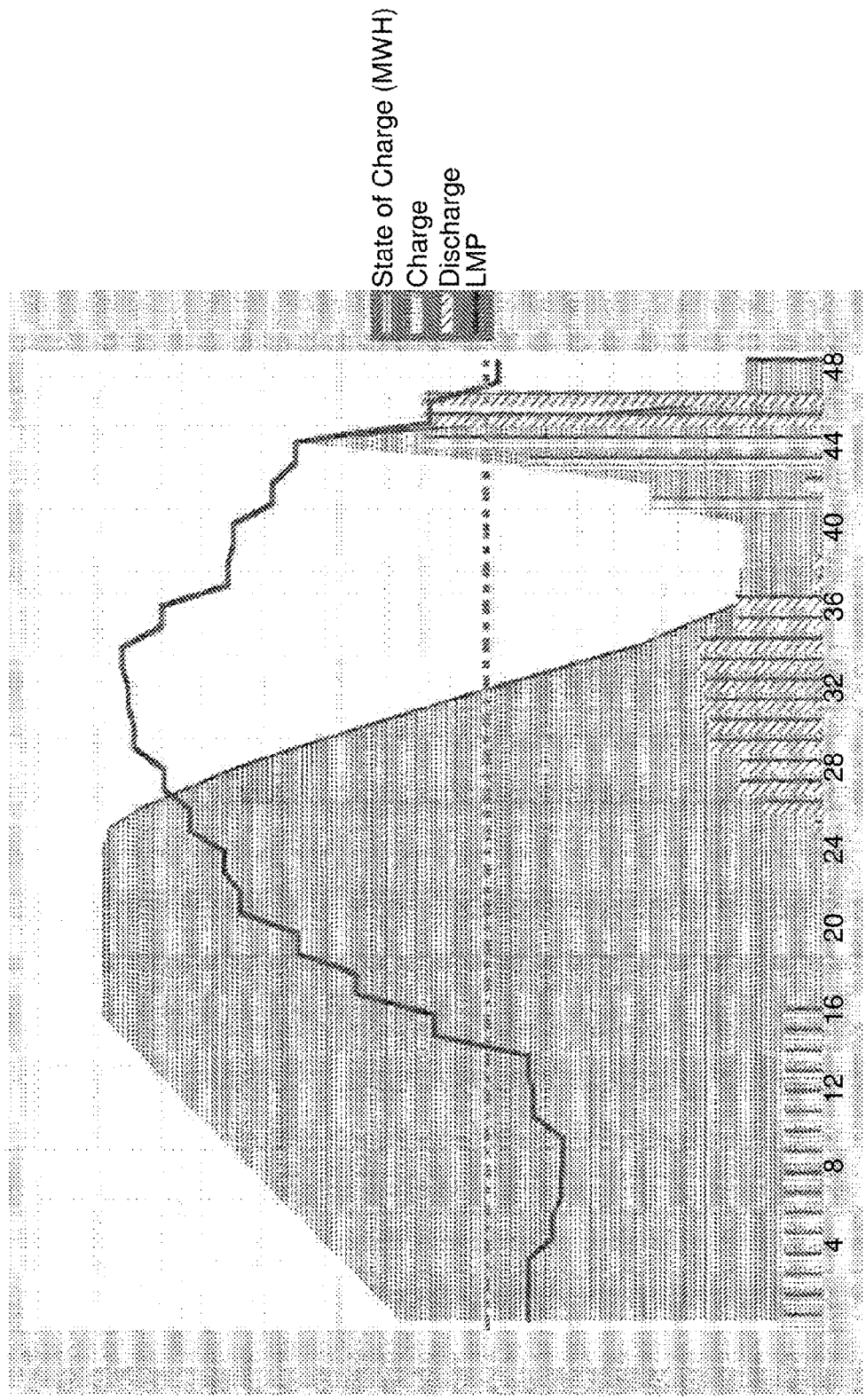
FIG. 11 shows an example of an implementation based on an operating schedule, according to a principle described herein.

FIG. 11 shows a non-limiting example of a implementation of an energy storage asset based on an operating schedule generated through applying an optimization, through optimal control, and using a net-energy related cost function based on a model of the system state function. The system includes the energy storage asset and a controller. The plot shows the projected LMP prices over the period of the optimization (T=24 hours, divided into 48 half-hour time intervals), the state of charge of the energy storage asset, the periods of charging and periods of discharging of the energy storage asset (where the height of the bar represents the amount/degree of the charging or discharging). In response to the operating schedule, the initial period of charging the energy storage asset occurs during a period of low LMP prices. The optimization based on the optimal control determines that the time intervals for charge and discharging during the period when LMP prices are higher is optimal for providing overall energy-related revenue to the customer over the entire time period T.

In an example implementation, the operating schedule can be generated through applying an optimization using a net-energy related cost function based only on the energy market. The result of the optimization can be used to provide recommendation for time intervals for the energy customer to participate in the regulation market. For example, based on the results of the optimization in FIG. 11, the operating schedule may determine that any excess charge/discharge capacity of the controller of the energy storage system may be committed to the regulation market on an hour-by-hour basis. For example, based on the results of FIG. 11, it can be determined that the any excess charge/discharge capacity of the controller may be committed to the regulation market during the first 15 time intervals. The optimization may make such a determination depending on whether the forecast regulation price in the regulation market in this time interval offers opportunity for energy-related revenue during this time interval or if considered in the context of the global optimization over time period T. In an example, such a determination may be made depending on whether the SOC of the energy storage asset is feasible for its use in the regulation market. For example, it may be preferable for the energy storage asset to be near around a 50% SOC for it to be applicable to the regulation market. In addition, if it is decided to commit the energy storage asset to the regulation market for a time interval, e.g., for one or more 1-hour time intervals, the optimization described herein may be re-performed based on the new input state of the system. Such new inputs can include the state of charge of the energy storage asset after its commitment to the regulation market ends. In another non-limiting example, the optimization may evaluate different SOC initial inputs to assess whether "recovery" from the regulation market is feasible for later participation in the energy market.

In an example, a predetermined threshold value of wholesale electricity price can be set at which it is decided that the excess charge/discharge capacity of the controller will be committed to the regulation market. Based on the results of the optimization in FIG. 11, a predetermined threshold value of the LMP price, indicated by the dashed horizontal line, may be set. In addition, it may be determined that the first time interval of charging the energy storage asset occurs during the time period that T coincides with the time interval during which the forecast wholesale electricity price falls below the predetermined threshold value. It may also be determined in the operating schedule that a second time interval of discharging the energy storage asset occurs coincides with a time interval during which the forecast wholesale electricity price exceed the predetermined threshold value (such as during intervals 26 to 36 in FIG. 11).

While the discussion above of exemplary objective cost functions and optimization of same to generate suggested operating schedules for energy assets has been based at least in part on economic demand response revenue from wholesale electricity energy markets (and in some particular examples involving building assets), it should be appreciated that the disclosure is not limited in this respect; namely, according to other examples, objective cost functions may be formulated and optimized to achieve a wide variety of energy-related objectives associated with different types of energy assets and revenue generation opportunities from wholesale electricity markets. For example, computation based on revenue from the regulation market has also been described herein above, and optimization based on the wholesale price and the regulation price are described herein below. In other examples, the principles herein can be applied to other markets, such as the spinning reserve market.

Generating an Operating Schedule for Deriving Energy-Related Revenue

As discussed above, the output of an optimization process to minimize an energy customer's net energy-related cost NEC$ (e.g., as specified by an objective cost function) is typically provided as a suggested operating schedule $SP(t)_{opt}$ for one or more energy assets. Generally speaking, the suggested operating schedule $SP(t)_{opt}$ may comprise one or more set point values as a function of time that take into consideration all of the energy customer's modeled and controllable energy assets.

For example, in some instances involving multiple individually modeled and controllable energy assets, the suggested operating schedule $SP(t)_{opt}$ may comprise multiple time-varying control signals respectively provided to corresponding controllers for the different energy assets. In other cases, the energy customer may have an energy management system (EMS) that oversees control of multiple energy assets, and the suggested operating schedule $SP(t)_{opt}$ may comprise a single control signal provided to the energy customer's EMS, which EMS in turn processes/interprets the single control signal representing the suggested operating schedule $SP(t)_{opt}$ to control respective energy assets.

In examples in which the energy customer normally operates its energy asset(s) according to a typical operating schedule $SP(t)_{BAU}$ (absent any economic incentive to change its energy-related behavior), the suggested operating schedule $SP(t)_{opt}$ may be conveyed to the energy customer in the form of one or more "bias signals," denoted herein by Bias(t). In particular, one or more bias signals Bias(t) may represent a difference between the suggested operating schedule and the typical operating schedule as a function of time, according to:

$$\text{Bias}(t) = SP(t)_{opt} - SP(t)_{BAU}. \qquad \text{Eq. 24}$$

Dynamic Virtualization

Dynamic virtualization is an integrated solution for energy generation and storage involving energy assets, such as batteries and solar generators. This uses a version of examples with virtual partitioning of an energy storage device. Dynamic virtualization can be used to co-optimize energy storage assets and solar generation across different energy markets or other uses. These markets or uses may include (1) electric energy provided over the grid to the energy market, and (2) the ancillary services market (which may include regulation, which is focused on regulation of power frequency and voltage on the grid) or (3) use of the storage device to maintain power quality at the owners' facilities.

Dynamic virtualization uses examples of systems with the virtual partitioning of the battery or other type of energy storage asset into virtual separate batteries, each virtual energy storage asset being allocated to separate markets or functions, such as participating in the energy market, and the ancillary services (regulation) market or use to maintain power quality at the premise. The virtual partition of the batteries is not physical, but is instead an allocation of energy storage asset capacity to various markets or uses. This virtual partition by allocation is dynamic in that it can be constantly changed in response to changing price points and performance requirements during the day.

There are rapid swings in load on the spot electric energy market. In order to maintain electrical balance on the grid and regulate consistent power and voltage on the grid over short periods of time, for example, over periods of four seconds, fifteen seconds, or one minute, the grid operator sends out signals to change generation to match the load changes. Batteries are particularly well suited to respond to these short response time signals.

With examples of the principles herein, energy storage assets such as batteries can be applied to swing between the markets for energy and ancillary services for regulation of the grid or for the maintenance of power quality at the energy storage asset owner's facility. In the past, batteries were not purchased and installed for the purpose of providing regulation services, because batteries tend to be too expensive for this purpose alone. Most regulation services now come from gas powered generators providing about 1-10 megawatts, and these energy assets take time to turn on and off. Industrial batteries, however, are instant on and off and usually provide power in the 1 megawatt range—and can respond to grid operator signals in milliseconds.

In the past, energy storage and energy storage asset facilities were usually purchased with the intent to provide backup power for the owners, in case the electric power grid goes down or temporarily provides inadequate power. However, once the battery or other type of energy storage assets are installed to satisfy backup capacity for the owner, they may also to some extent be active in the regulation market to regulate the power and voltage on the grid, and in the energy market, to sell power into the grid in response to real-time pricing changes (or to cut the user's demand on the grid). For example, energy storage assets may discharge to the grid during high LMP price hours.

Energy storage assets may include batteries, ice units, compressed air, or other technologies to store energy on site by users and generators of power. Batteries may be of any type, including lithium ion, lead acid, flow batteries, dry cell batteries, or otherwise.

Solar generators of power may include solar panels, solar cells, any other photovoltaic power generator, or any means for generating power from sunlight. This may also include generation of electricity from steam or similar use of liquid to gas phase generation from sunlight, to generate electricity.

The energy market involves generating power, distributing power into the grid, and drawing power out of the grid, each at a price. This is measured in terms of megawatt hours that are the amount of power delivered. Energy is delivered for sustained periods of time, such as for 15 minutes or more.

The capacity market is measured in terms of megawatts of capacity. In this market, a seller makes their facilities available to generate electricity when needed and holds them in reserve for that purpose, but may never actually distribute energy into the grid rather than just be on-call. This, in effect, pays the seller to be available and impacts the reliability of the grid.

The ancillary market includes regulation of frequency and voltage in the grid, and the provision of an operating reserve. The regulation of the voltage in the grid involves discharging energy into the grid or absorbing energy from the grid in small increments, frequently, for short periods of time, and very rapidly.

Smart grid services increasingly rely on new technologies such as renewable energy and large-scale storage resources. Unfortunately, the life-cycle costs associated with such resources, when taken individually, are still high compared with more traditional forms of energy production. In addition, the desired proliferation of distributed and renewable resources on the power grid introduces new threats to its reliable operation, as they are subject to unpredictable drops in output, such as when the wind stops blowing. Consequently, both economic and reliability issues introduce substantial obstacles to a high penetration of those technologies in the power grid.

By themselves, storage resources such as electrical batteries are presently high cost options. Likewise, photovoltaic generation and wind turbines are comparatively quite expensive and their intermittency creates new strains on the power grid.

However, when optimally managed by various examples disclosed herein to provide timely support to the power grid, the net cost of electrical storage can be substantially reduced, as the result of payments by the grid operator (ISO/RTO) provides for facilities that can be called on to provide such support. Also, combining energy storage with intermittent generation makes technologies such as wind and solar more predictable on the grid, and hence, more valuable.

Examples, including dynamic virtualization, can dramatically improve the economics of renewable generation and storage technologies, by co-optimizing their operation to participate in the various energy and ancillary services (including regulation) markets and thus maximize their economic benefits.

Examples focus on the economics of batteries and energy storage and, by providing energy resource optimization and a gateway to the wholesale markets, can help facility managers deploy a comprehensive energy storage solution that can cost-effectively meet an organization's business objectives.

More broadly, when optimally coupling energy storage with renewable generation, various examples redefine the economics of such resources, while providing firm, dispatchable virtual generation that supports the reliability objectives of the power grid. Thus, by integrating distributed resources into virtual generation via system operator dispatch, examples can help enable the acceleration of renewable energy generation technologies such as solar and wind.

Systems Including Energy Storage Assets

Large-scale storage is widely seen as a necessary piece of the smart grid and a key component of America's electricity future. This recognition is driven by the following factors: (1) the growing adoption of intermittent renewable power sources; (2) state and nationwide budget shortfalls, leading local governments to seek cost-effective solutions for maintaining America's aging infrastructure; and (3) the widespread belief that electric vehicles ("EVs") will materially grow their market share over the next 5 to 15 years.

In this context, stakeholders have been looking for ways to accelerate the development and implementation of grid-level storage. Effective battery and other energy storage asset solutions can take unpredictable energy resources and turn them into reliable power, while matching electricity supply to demand; they play a crucial role in fostering microgrids and distributed generation, viable alternatives to expanding the U.S.'s power infrastructure; and they can address the new and unique concerns created by EVs, such as helping to maintain grid stability and giving utilities and grids more control over energy dispatch.

A key concern with batteries has long been their high upfront cost and long payback periods. Various examples address this by providing battery-owners a robust gateway to the wholesale electricity markets, thus unlocking new streams of revenues that increase their return on investment. This may also apply to other types of energy storage assets.

Various examples provide processor-executable instructions (including software solutions) that optimizes participation in wholesale markets by providing energy storage asset owners with dynamic virtualization, a service that continuously re-partitions the energy storage asset for different markets and uses, chiefly real-time energy, and regulation, and power quality control, in an optimized manner, based on pricing and weather data, retail electricity rates, and characteristics of the energy storage asset and its host site.

For large retailers and supermarkets, backup generation is a necessary but often expensive proposition. The nation's largest big box chains have taken a variety of approaches to minimizing the costs of providing substitute power in the case of an emergency or brownout; but for many stores, their only choice to date has been inefficient and costly diesel generators.

Examples with dynamic virtualization optimally manage a energy storage asset's state of charge based on the revenue producing opportunities in the wholesale market, as well as the organization's business objectives, such as providing backup power to critical loads for a given period of time. Thus, when paired with these examples, the energy storage asset becomes an energy resource that will concurrently: (1) participate in the energy markets by providing a way to shift the net load of a facility from high- to low-price periods; (2) participate in the frequency regulation market by responding to real-time signals from the grid operator; (3) participate in other wholesale markets, such as energy and synchronized reserve; and (4) provide reactive/voltage support to the microgrid/distribution grid.

Examples enable the energy storage asset to maximize revenues from the various wholesale markets, while maintaining its ability to achieve its main objective of providing a reliability service to the organization. To achieve this, examples herein describe virtualization of the energy storage asset and creating dynamic "energy storage asset partitions," in a manner similar to the way computing resources are virtualized. Through its optimization capability, an example determines in hourly increments which portion of the controller output (including its capacity), and hence the energy storage asset capacity (including its SOC), can be allocated to the energy and regulation markets respectively, while maintaining sufficient reserve to meet the forecasted backup requirements. The optimal control (to perform the optimization described herein) can take into account the forecasted and real-time hourly prices for each of the markets, along with the time and weather dependent backup requirements of the facility. When combined with other resources such as renewable generation, backup generation or demand response, the examples described herein can extract the maximum value of all such resources while meeting the organization's reliability, comfort, and sustainability objectives.

Following is a description of the different markets, including energy markets and regulation markets, to illustrate how each market can affect the operation of an energy storage asset.

Regulation Market

In a non-limiting example, capacity of the energy storage asset may be committed to the regulation market to maintain the frequency and/or voltage on the power line. For example, system operators seek to maintain the system frequency at very near to a nominal frequency of around 60 Hz in the U.S. or around 50 Hz in some other countries (including countries in the European Union). If the frequency is too high, there is too much power being generated in relation to load. A system operator would send a signal to participants in the regulation market to increase their load, or ask for generation to be reduced, to keep the system in balance. If the frequency is too low, then there is too much load in the system, and the system operator would send a signal asking for generation to be increased or the load reduced. A grid operator may use a real-time communication signal to call for either a positive correction (referred to in the industry as "regulation up") or negative correction (referred to as regulation down"). If load exceeds generation, the frequency and voltage tend to drop. The ISO/RTO system operator would relay a signal requesting regulation up. If, however, generation exceeds load, the frequency tends to increase. The ISO/RTO system operator would relay a signal requesting regulation down (including asking for reduced generation).

The regulation market may seek commitment of a system on an hourly basis. However, the ISO/RTO system operator may relay regulation signals for regulation up and/or regulation down at much shorter timescales. For example, during the commitment period, the adjustments of regulation may take place minute-by-minute, on the order of a minute or a few minutes, or on the order of a few seconds (e.g., at 2-second or 4-second intervals). To participate in the regulation market, a resource may receive and may need to respond to a regulation signal generated by the grid operator approximately every 2 seconds. (In some territories, this rule may be relaxed somewhat for batteries.) The energy storage asset responds to this signal with a percentage of its maximum resource capability that is bid into the regulation market. Examples receive and respond to this signal and distribute it among the various resources participating in the regulation market within a given price zone, based on the results produced by an optimizer.

If the ISO/RTO system operator sizes the regulation signals to adequately balance the signal in the long run, the charge of the energy storage asset may merely fluctuate around its initial state of charge when it started to provide regulation. That is, the proportion of the available state of charge of the energy storage asset that is committed for use to provide regulation may be delivered at variable charge rates or discharge rates. Adequately balanced regulation signals should neither completely deplete nor fill the energy storage asset.

In a non-limiting example, the regulation price may be set at average values of around $30-$45/MW per hour, with hourly rates fluctuating around this average value. Some regulation markets may pay simply for the commitment of an available capacity of the energy storage asset during a time period, such as for an hour, with a separate payment for the total amount of energy ultimately provided. Thus, payment at the regulation price may be made for the period of commitment, even if the system is not called upon to provide regulation during the commitment period.

There may also be additional payment from the energy market for energy generated, based on the wholesale electricity market price (the LMP).

Operating characteristics of the energy storage asset include power (or its instantaneous delivery capability in kW) and the energy stored in the energy storage asset (or the amount of power it can generate over one hour, or kWh). In a non-limiting example, a battery rated at 1.5 MW power and 1.0 MWh energy storage capacity will be able to provide 1.5 MW power for a total period of 40 minutes (60×1/1.5). Thus, if the owner bids 1.5 MW into the regulation market for a given hour, a 50% discharge signal over 2 seconds could decrease the battery's charge level by 0.8 kWh (1.5 MW×1/1800 hrs).

As part of a certification for participating in the regulation market, the ISO/RTO system operator may verify that the energy storage asset is capable of responding to the regulation bid into the market. The ISO/RTO system operator may require that the energy storage asset be able to be charged/discharged at its full enrolled amount, when receiving a +/−100% regulation signal within a duration of 10 minutes. In the 1.5 MW example above, the battery charge would be increased/decreased by +/−250 kWh (1.5 MW×1/6 hr).

For example, assuming that the energy storage asset starts with an initial state of charge of 50% at time t=0. Ideally, the regulation signal is "net zero," meaning that the quantity of charged/discharged energy averages to zero over a given 24-hour period. In reality, the state of charge of the energy storage asset may at times drift to the limits of the energy storage asset's recommended state of charge. If the state of charge exceeds some adjustable maximum or minimum values, various examples include compensating by exiting the regulation market for the next hour and bringing the energy storage asset back to its initial set-point.

In an example, the operating schedule that is generated according to an implementation of an apparatus herein specifies intervals of time when the energy storage asset may be committed to the regulation market. During these time periods, the operating schedule may additionally indicate the points during these intervals of time where energy may be bought to charge the energy storage asset if its state of charge falls below a desirable limit, or where excess energy may be sold if the state of charge is too high. This discharge can contribute to a short-term demand response action in the real-time energy market.

Energy Market

To participate in the energy market, the energy storage asset should to be able to provide the "as bid" energy into the real-time market for the next hour. Various examples compute the optimal charge or discharge signal in anticipation of or in response to the economic signals, while maintaining minimum and maximum constraints on the state of charge of the energy storage asset. When combined with other controllable resources, such as renewable generation or advanced lighting and HVAC systems, examples extract the maximum economic value of each resource, given external factors and constraints. For example, examples can use an energy storage resource to compensate for the intermittency of renewable generation, and can include demand response actions to help maintain the balance.

Figure 12:
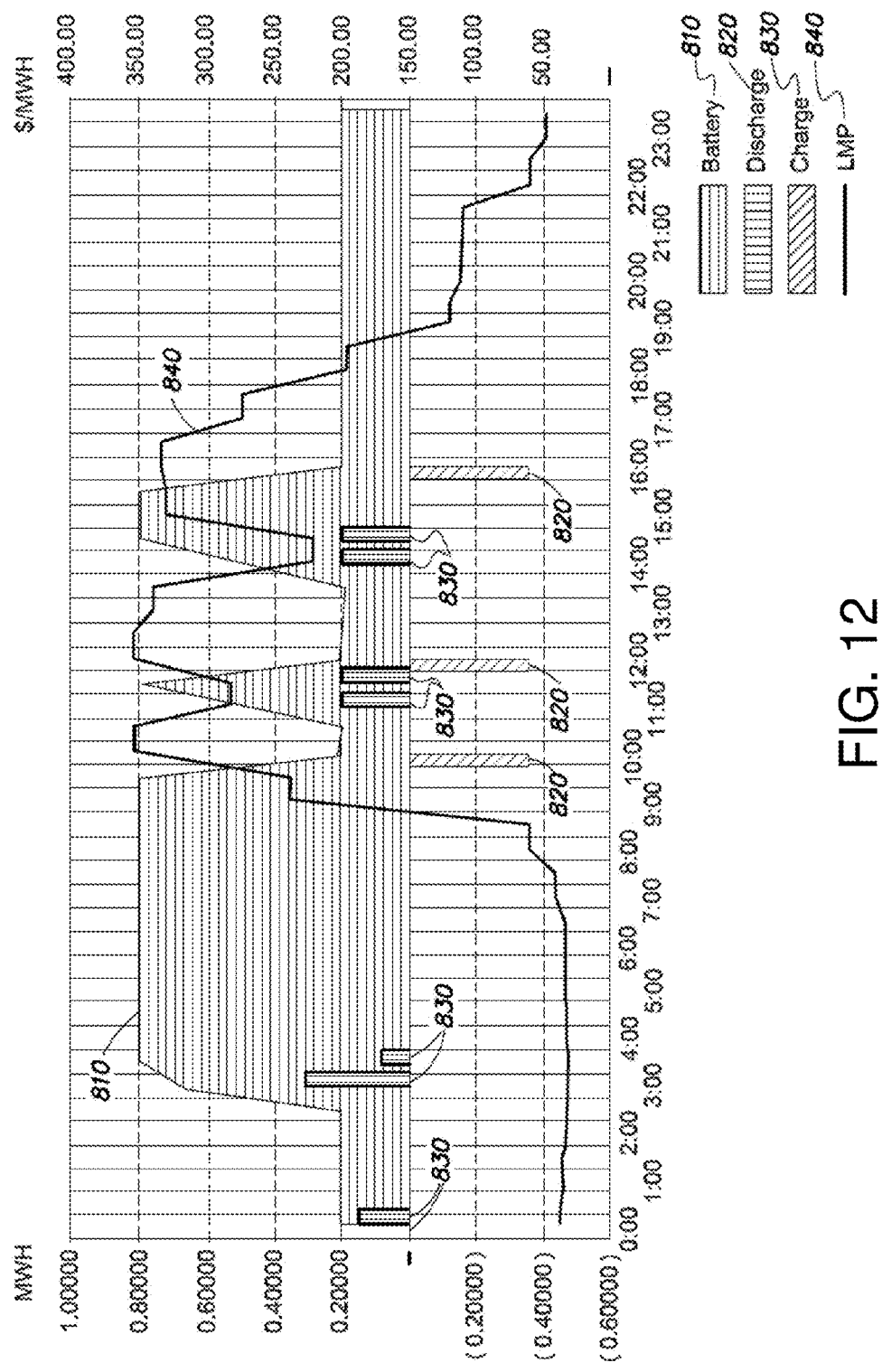
FIG. 12 shows an example energy storage asset optimization according to a principle described herein.

FIG. 12 shows an example energy storage asset optimization in response to economic signals and performance needs. The horizontal axis is time over a 24 hour cycle. The left vertical axis is megawatt hours. The right vertical axis shows price in dollars per megawatt hours. The volume under the line battery 810 shows the stored capacity in the battery. The three lines below the horizontal axis shows the discharge 820 from the battery. The seven vertical lines 830 above the horizontal axis shows charging to the battery 830. The line 840 shows the LMP energy price throughout the 24-hour cycle to which indicated energy assets are responding. In this example, examples determine the optimized hourly charge and discharge schedule of a 1.5 MW/1.0 MWh battery in response to an LMP price signal. The optimization is further constrained to maintain a 200 kWh minimum capacity for backup purposes, and a maximum capacity of 800 kWh to maintain charge/discharge cycle efficiency.

Spinning Reserve Market

To participate in the spinning reserve market, the energy storage asset should to be able to commit resources to provide power during unplanned outages of base load generators. Spinning reserve is generation capability that can provide power to the grid immediately when called upon by the ISO/RTO and reach full capacity within 10 minutes. The energy storage asset needs to be electrically synchronized with the grid, e.g., through the controller, to participate in this market. Revenue in the spinning reserve market is for capacity rather than energy. It requires quick response but makes low total energy demand. Requests in the spinning reserve market may be made around 20-50 times per year.

Revenue for the spinning reserve market may be determined based on the ability of an energy storage asset to provide power during an unplanned event, such as a generator failure. Revenue may also be derived based on the amount of energy (MWh) that is generated during active participation in the spinning reserve market, such as based on the electricity wholesale price.

Co-Optimization Across Multiple Markets

As described above, the economic signal can be a driver for the average charge status of the energy storage asset. It responds to price signals that are averaged on an hourly basis. The regulation signal can be seen as having a "bias" effect over the average charge, in response to the regulation commands. Examples co-optimize the energy storage asset charge by first economically optimizing the charge status of the energy storage asset, then allocating the balance of the available power to the regulation market, on an hourly basis.

By adding user-adjustable upper and lower constraints to the optimized energy storage asset charge, examples take into account reliability objectives (e.g. backup) and charge/discharge cycle efficiency. Other constraints can be added, based on the type of energy storage asset technology used, to maximize charge/discharge round trip efficiency, and optimize energy storage asset life versus energy storage asset replacement costs.

In addition to co-optimizing a storage resource at a given location, examples have the capability to perform a global optimization across multiple customers within the same price zone, and disaggregate the regulation and economic signals among the various customers. In particular, this gives customers that do not have the minimum energy storage asset capacity required the ability to participate in the regulation market.

Co-Optimization with Other Distributed Resources

With various examples, distributed resources can earn maximum economic benefit through co-optimization. Co-optimization of various resources on one site results in accelerated payback for all assets, and this, in turn, accelerates the market-wide penetration of these resources.

Figure 13:
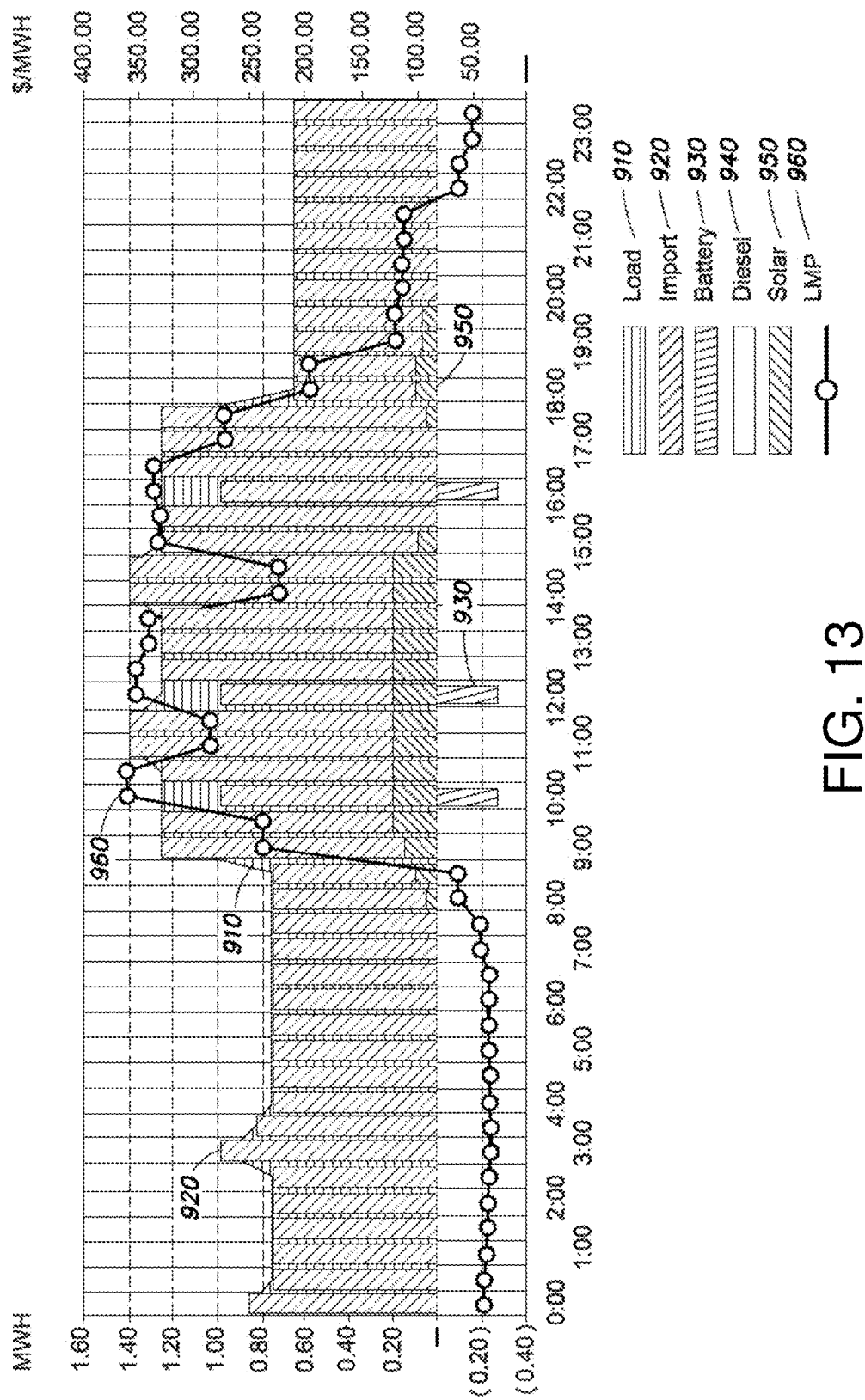
FIG. 13 shows an example generation schedule for an energy storage asset-energy generating asset co-optimization according to a principle described herein.

FIG. 13 shows an example generation schedule for battery-photovoltaic co-optimization. FIG. 13 shows an example where the same battery used in the previous example in FIG. 12 is combined with 0.5 MW of PV (solar-photovoltaic) generation. The horizontal axis shows the time in the 24-hour cycle. The left vertical axis shows megawatt hours. The right vertical axis shows price in dollars per megawatt hours. The load 910 is the electric load on the facilities. The import of power 920 shows the power imported into the facilities from the grid. The battery 930 shows the three bars below the horizontal axis for the power discharge from the batteries at specific times. The diesel 940 is not shown because diesel generation is not used in this co-optimization because of its relative price. The solar 950 shows the power used by the system and/or stored in the batteries from the solar generator or photovoltaic generator at various times. The LMP line 960 shows the fluctuating price for electricity during the 24-hour cycle.

Example Energy Storage Assets

Various examples are technology agnostic and can optimize any storage installation. However, certain forms of storage, such as compressed air and ice storage, are currently not recognized as applicable resources for some regulation markets.

Aided by significant private investment, grid-scale batteries have significantly reduced in cost over the past decade. Different technologies appear to have converged around a similar price: with batteries offered at roughly $1-2 per Watt, and $1-2 per Watt-hour, before Balance of Plant ("BoP") costs. (Watts [W, kW, MW] are a measure of power, i.e., the charge and discharge rate of an energy storage asset. Watt-hours [Wh, kWh, MWh] are a measure of energy, i.e., the storage capacity of an energy storage asset.) At these prices, energy storage asset owners and lessees can use examples to achieve a positive return over the installed life while meeting their sites' backup needs.

Below is a brief overview of each different types of energy storage assets:

Lithium-Ion Battery

This "power battery" is well-suited for regulation with high efficiency and hybrid opportunities. However, it has a high cost and little data exists to corroborate lifespan claims Quoted prices include $2 million for a 1 MW/1 MWh unit, and $1.5 million for a 1 MW/250 kWh unit.

Lithium-Ion (Li-Ion) batteries are receiving great attention because they are the preferred battery for electric vehicles. Presently, Li-Ion batteries are among the most expensive of the storage options available. This may change, as many companies are pouring resources into new Li-Ion variants; however, some suggest that the chemical characteristics of Li-Ion cells make it difficult to significantly reduce their cost. Additionally, Li-Ion is a new technology so that no company has empirically demonstrated Li-Ion's lifespan. Companies have tried to allay these concerns through "accelerated testing" that charge/discharge the battery more rapidly, but this does not provide full insight into how well Li-Ion batteries perform over time.

Li-Ion batteries are very dense and therefore very small compared to other technologies. One manufacturer's 1 MW/1 MWh unit, for example, has dimensions of 8'×20'. In comparison, a quoted lead-acid unit with similar specs has dimensions of 40'×70'.

Lithium-Ion's hybrid opportunities are discussed in the flow battery section.

Lead-Acid Battery

This battery is the lowest-cost option with long lifespan and proven technology. However, it is physically large with high maintenance and limited depth of discharge.

Quoted prices include $896,000 for a 1 MW/2 MWh unit, and $512,000 for a 1 MW/500 kWh unit.

Lead-Acid batteries, which have the same chemistry as a car battery, are proven for long-lasting grid applications. One manufacturer's 1 MW/1.4 MWh unit lasted for 12 years, from 1996-2008, as both a provider of voltage support and a backup power source, before the battery cells were replaced. The original power electronics of that installation still function, and the unit is running with a new set of lead-acid cells.

A downside of lead-acid batteries is that they are very heavy and very large. This is why they are not being considered as much for EVs, and this poses other logistical challenges for metropolitan installations. Lead-acid batteries are also considered to be high maintenance. They need to be kept within a narrow temperature range, and therefore require their own building (for industrial power uses), as well as periodic upkeep. Also, lead-acid batteries are typically oversized because exceeding the lower bounds of their state of charge can damage the cells. They are best for regulation or voltage support, and as backup if sized explicitly for that purpose.

Flow Batteries

These batteries can be fully charged and discharged without damage to the battery. Also, "hybridization" is possible. However, this "energy battery" limits regulation market opportunities and has low round-trip efficiency.

Quoted prices include $1.15 million for a 1 MW/1 MWh battery.

Flow batteries are energy batteries, i.e., they are best suited for backup electricity, but their chemistry limits their ability to provide high-MW regulation. The typically configured flow battery takes 4 hours to charge/discharge, and flow batteries have lower round-trip efficiencies than other types (roughly 75% in contrast to Li-Ion's 90%). With flow batteries, a tank is filled with electrolyte fluid that flows through solid cell stacks located at the top of the unit. The liquid solution never degrades, but the cells need to be replaced every 5 or 6 years. The cost of cell replacement is 10-15% of the total unit.

The electrochemical characteristics prohibit them from power-dense applications, unless they are oversized and paired with a large inverter, or "hybridized" with another battery technology. Hybridization can be provided by some suppliers in conjunction with a well-established power electronics provider. One manufacturer has created a system that allows its "energy" batteries to be paired with "power" batteries, like lithium-ion, connected through a single inverter. A leading lithium-ion battery manufacturer recently announced a plan to provide a similar Li-Ion/flow battery unit for grid-scale applications.

Dry Cell Technology

This power battery is good for the regulation market. However, it has very small recommended depth of charge/discharge and is expensive.

Quoted prices include $1.5 million for a 1.5 MW/1 MWh battery, plus 30% extra for BoP ("Balance of Plant").

These batteries provide high power-to-energy ratios that make them attractive for regulation, so long as they remain within a fairly narrow range of state of charge. These batteries are not meant to fully charge or discharge and pushing their recommended operating parameters affects their lifespan. Ideal state of charge is 20-80%. Because of these constraints, these batteries would need to be oversized to provide backup. These batteries are more expensive than cheaper options such as lead-acid.

Based on their characteristics, these batteries are likely suited for projects whose primary objective is not backup power, but rather systems support. They provide high-MW regulation, can address voltage sag concerns, and can be recharged by regenerative braking. However, when their state of charge limitations are taken into account, they appear to be a costly technology, even in comparison to lithium-ion.

Ice Units

The thermal storage capacity of an ice unit can be used according to the principles herein as an energy storage asset.

Ice units can be used to modify how a building is cooled, including how energy is consumed for cooling/air conditioning. An ice unit generally consists of a thermally-insulated storage tank that attaches to a building's air-conditioning system. The unit makes ice (generally at night when supply costs tend to be lower) and uses that ice during the day to deliver cooling directly to the building's existing air conditioning system. Storage tanks can be on the order of hundreds of gallons of water (e.g., about 450 gallons) of water. The water is frozen by circulating refrigerant through copper coils within or surrounding the tank. The condensing unit then turns off, and the ice is stored until its cooling energy is needed. During the higher temperature daytime hours, the power consumption of air conditioning and demand levels on the grid, increase. The ice unit may be used to replaces the energy-demanding compressor of a building's air conditioning unit. The melting ice of the ice unit, rather than the air conditioning unit, can be piped around the building to cool it.

Compressed Air

The thermal storage capacity of compressed air can be used according to the principles herein as an energy storage asset.

Using a heat exchanger, it is possible to extract waste heat from the lubricant coolers used in types of compressors, and use the waste heat to produce hot water. Depending on its design, a heat exchanger can produce non-potable or potable water. When hot water is not required, the lubricant can be routed to the standard components for lubricant cooling. The hot water can be used in central heating or boiler systems, or any other application where hot water is required. Heat exchangers also offer an opportunity to produce hot air and hot water, and allow the operator some flexibility to vary the hot air to hot water ratio.

Controller for an Energy Storage Asset

The controllers for the energy storage assets described herein can be used to vary the input to or output from the energy storage assets. When the controller functions as a converter, it converts the AC signal to a DC signal. That DC signal may be used to charge the energy storage asset. When the controller functions as an inverter, it converts one type of voltage (direct current (DC)) into another type of voltage (alternating current (AC)). Since the electricity supplier generally supplies 110 or 220 volts AC on the grid, the conversion may typically be from 12 volts DC to 110 or 220 volts AC. In another example, the output of the controller may be different, depending on the type of load on the system. Inverters called utility intertie or grid tie may connect to energy generating assets such as solar panels or wind generator, and can feed their output directly into the inverter. The inverter output can be tied to the grid power.

In a non-limiting example, the inverter takes the DC output from the energy storage asset and runs it into a number of power switching transistors. These transistors are switched on and off to feed opposite sides of a transformer, causing the transformer to think it is getting an AC signal. Depending on the quality and complexity of the inverter, it may put out a square wave, a "quasi-sine" (sometimes called modified sine) wave, or a true sine wave. The quality of the quasi-sine wave can vary among different inverters, and also may vary somewhat with the load.

The virtual partitioning of the energy storage asset described facilitates partitioning between energy and regulation participation. The partitioning can be based on the available capacity of the controller (i.e., the inverter/converter). The SOC of the energy storage asset may be used to provide a constraint within the optimization for determining the optimal charge/discharge strategy for participation in these two different markets. As a non-limiting example, an operating schedule generated according to the principles herein can indicate the optimal charge/discharge strategy for the controller, including on an hourly basis, in response to or anticipation of projected LMPs. The balance of the inverter capacity of the controller may be made available to the regulation market at its shorter timescales (e.g., at the 2-second or minute-by-minute time intervals described above). The proportion of the controller output (and hence the energy storage asset) committed to the energy market and the remaining proportion of the energy storage asset committed to the regulation market are co-optimized based on the economic benefit derived from the two markets, and subject to the SOC constraints. The operating schedules generated based on any of the principles described herein, and in any of the example, can suggest the proportion of the controller output committed to the energy market and to the regulation market in a given time interval t (less than time period T), and for what length of time. the proportion of the controller output committed to the energy market and to the regulation market in a given time interval t (less than time period T). For example, for a controller with a 1 MWatt inverter capacity, the principles herein can be used to generate an operating schedule that suggests the proportion of the controller's 1 MWatt inverter capacity that can be committed to the energy market and to the regulation market in a given time interval t to generate the energy-related revenue.

Energy Generating Assets

Examples of energy generating asset applicable to the apparatuses and methods herein include photovoltaic cells, fuel cells, gas turbines, diesel generators, flywheels, electric vehicles and wind turbines.

Electric storage has the potential to address some of the attributes of renewable energy generation. The intermittent nature of energy generating assets, including solar generation, may present some difficulty for grid operators. For example, weather events can make energy output of energy generating assets, including photovoltaic cells or wind turbines, difficult to predict. As renewable generators make up a growing share of regional generation portfolios, grid operators may require greater real-time visibility of distributed generation and benefit from a resource's ability to control bi-directional power flow. Adding storage to distributed generation achieves new levels of responsiveness not seen with existing systems.

According to principles described herein, the operating schedule generated for a system that includes a controller, an energy storage asset and an energy generating asset can firm up intermittent renewable generation into dispatchable generation. The operating schedule can provide for renewable generation forecasting based on the forecasted weather conditions.

Dynamic virtualization can be beneficial to sites that utilize both energy storage assets and energy generating assets. For example, by integrating weather data, price forecasts, and expected site load, examples can accurately predict a solar array's output, determine how much solar generation should be captured by an energy storage asset, and dispatch the energy storage asset at the time of day that optimizes revenues derived from wholesale market participation.

By passing energy through an energy storage asset and exhibiting real-time control, power can be delivered strategically and act as a price-responsive resource in the various wholesale markets. In effect, storage allows the maturation of energy generating assets as a resource that provides discrete power-flow to the grid that is controllable, quantifiable, and dispatchable. Solar power's best known challenge is cost. Through dynamic virtualization the value of renewable generation is increased by improving the resource with electric storage.

Example Implementation

Figure 14:
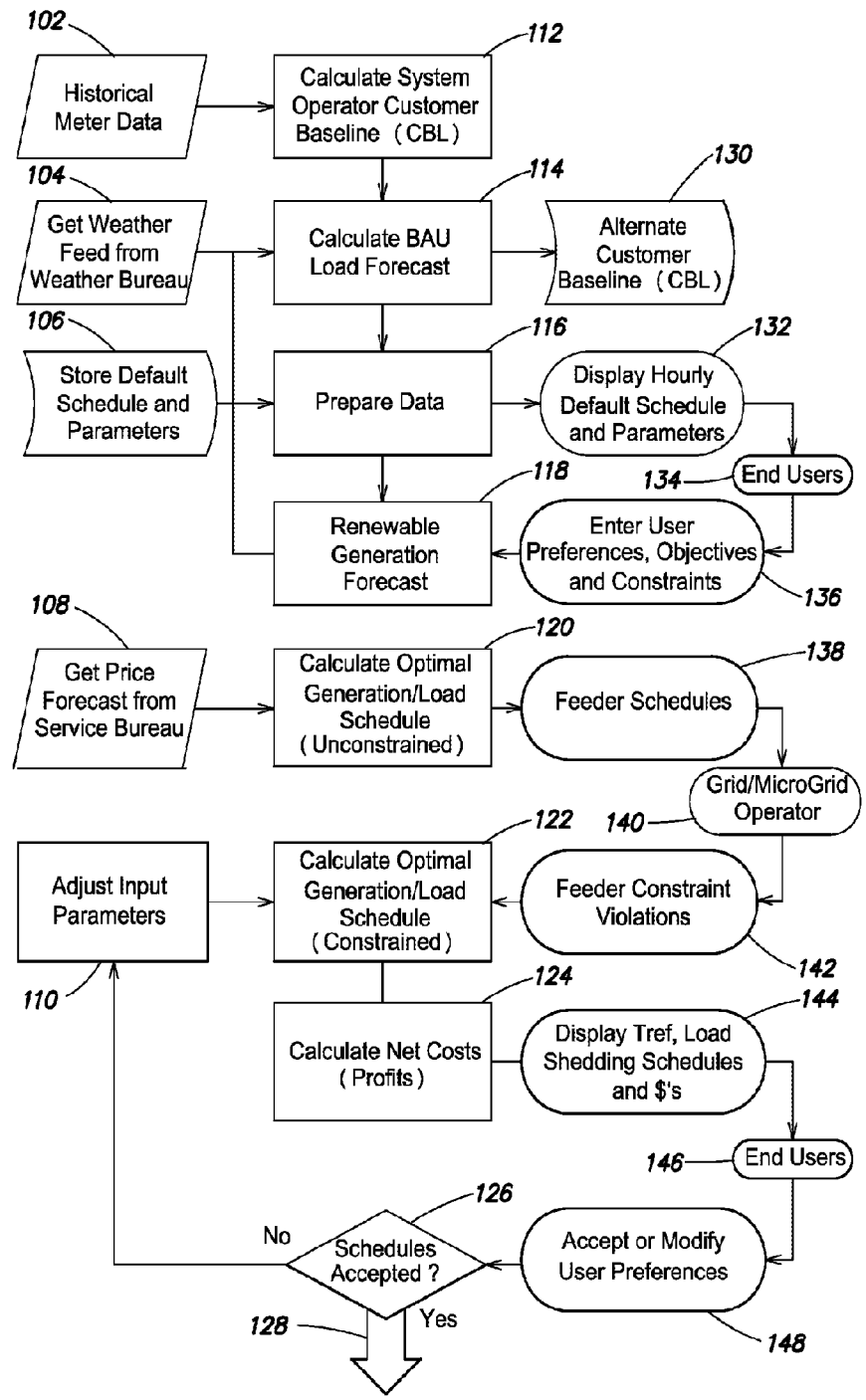
FIGS. 14 and 15 show an example flow chart of a method according to a principle described herein.

FIG. 14 illustrates a flow diagram of a method according to one example of the present disclosure. Historical data 102 from a customer's facility is inputted into the system to calculate the RTO system operator's estimate of the customer baseline (CBL) 112 usage of electrical energy. This is the historically expected customer use of electricity, if the energy optimization is not applied, or calculated by the RTO operator. This CBL calculation 112 is inputted to the system to calculate a BAU (business as usual) electrical energy forecast 114 for the facility, which forecasts the energy usage if the energy management of the present system is not used. Alternatively, an alternate customer baseline 130 may be calculated or modeled (e.g., by a user or operator of a system according to the present disclosure), in place of the RTO system operator's calculation of the customer baseline 112, to be used for the BAU load forecast 114. Additional details of CBL modeling according to one example of the present disclosure are provided further below.

The system prepares data 116 so that the system may display an hourly default schedule and parameters 132 based on the CBL. This default schedule 132 is then transmitted to the end user's of electricity at facilities 134. The end user 134 preferences, objectives and constraints 136 for their energy use are then input. These user preferences, objectives and constraints 136 together with the data 116 from the CBL and BAU load forecasts 112, 114 and the resulting data 116 are used to generate a renewable energy forecast 118. This renewable energy forecast 118 can then be recycled to calculate an updated BAU load forecast 114.

The system also obtains a weather feed from the weather bureau 104 for input into the calculation of the BAU load forecast 114.

The system also stores a default schedule and parameters 106 for the preparation of data 116, as needed.

Various examples may also obtain price forecasts from a service bureau 108 to inform the calculation of an optimal generation/load schedule (unconstrained) 120. These schedules 120 are used to develop feeder schedules 138, which are delivered to the RTO grid and facilities micro grid operators 140. The operator 140 then provides a feeder constraint or violations analysis 142 which is used by the system to calculate an optimal generation/load schedule (constrained) 122. This schedule 122 is then used to calculate net costs (profits) 124 for application by examples of the system.

These net costs and profits 124 then are used to display the TREF (reference temperature, i.e. the target temperature for the facility), load shedding schedule and prices 144. These displays are then available to the end users of the electricity and of the system 146. The end users 146 may then accept or modify the user's preferences 148. These schedules may be accepted 126 and those accepted schedules are transmitted 128 to the next step and used to calculate a day ahead virtual generation schedule 210, as shown as FIG. 15. If the schedules are not accepted 126, then the input parameters are adjusted 110, and recalculation is performed on the optimal generation/load schedules (constrained) 122, and the process is reiterated until all schedules are accepted at 126 and transmitted at 128 to calculate a day ahead virtual generation schedule 210.

Figure 15:
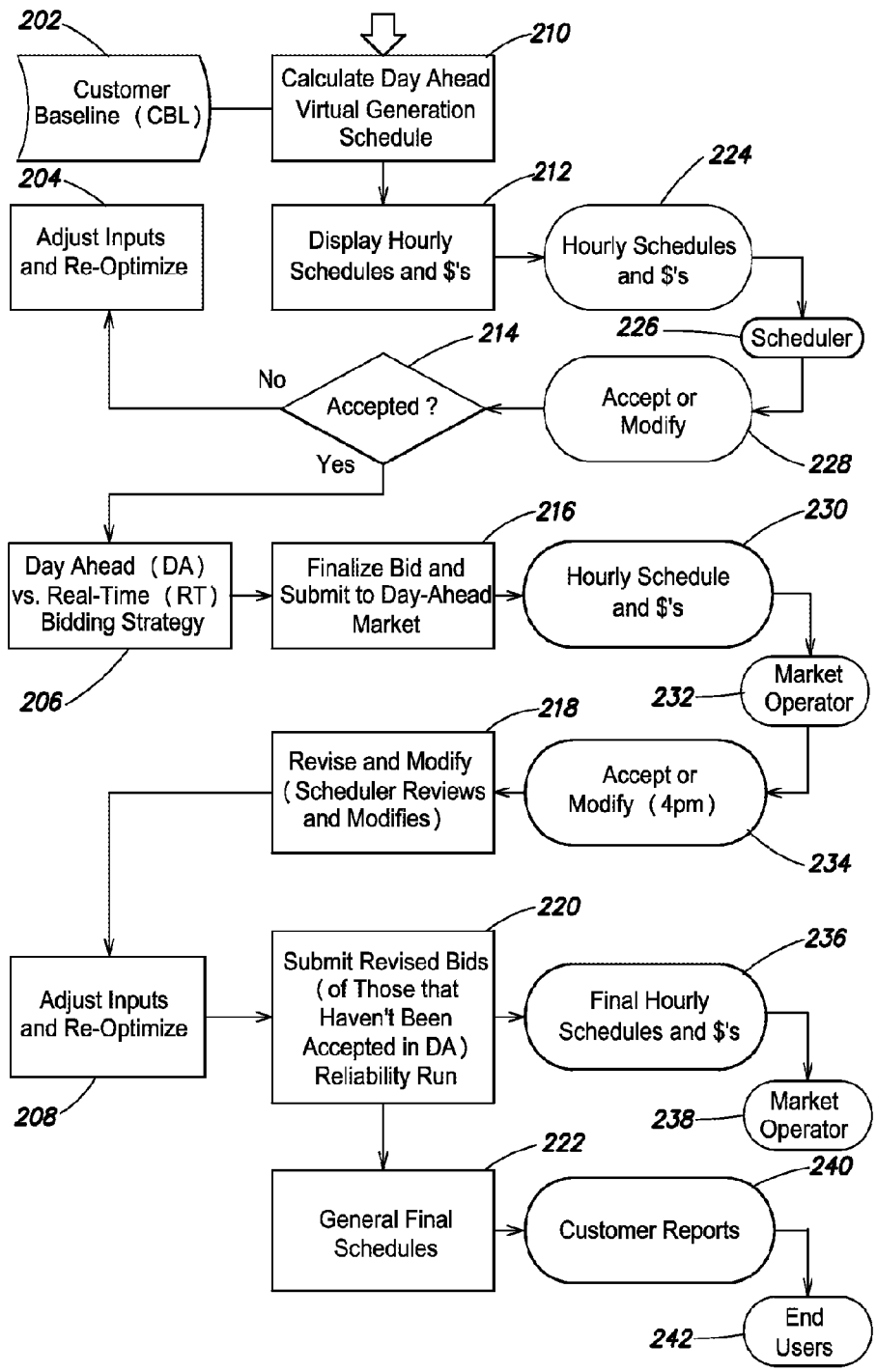

FIG. 15 shows further examples of a method. Customer baseline CBL 202 is used to calculate the day ahead virtual generation schedule 210, which also uses the accepted schedules 126. This schedule data is then used to display hourly schedules, prices, and costs for the facility 212. The schedules 212 are used to show hourly schedules, or other time period breakdowns, and prices and costs 224, which are transmitted to scheduler 226. Scheduler 226 may accept or modify these schedules and prices 228. If the prices are accepted 214, then day ahead (DA) versus real-time (RT) bidding strategy 206 is developed. If the schedules 224 are not accepted 214, then the system adjusts inputs and reoptimizes the schedule at 204, to recalculate the day ahead virtual generation schedule 210 and the process is reiterated until the schedules 224 are accepted at 214. The bidding strategy 206 results in a final bid and submission to the day ahead market 216. This generates a bid that is broken down by hourly, or other time period, schedules and prices 230, and sent to a market operator 232. The market operator 232 may accept or modify (by 4 PM) the finalized bid 216, at 234. The system may then revise or modify (scheduler reviews and modifies) 218 the accepted or modified bids. The system may adjust inputs and reoptimize the schedules in 208, if necessary. A reliability run for revised bids may be submitted 220 (those bids that have not been accepted in the day ahead). These revised bids may result in revised hourly schedules and prices 236, and then they are resubmitted to the market operator 238. This may result in generation of final schedules 222, which results in a generation of consumer reports 240 that are delivered to the end users of electricity 242.

Figure 16:
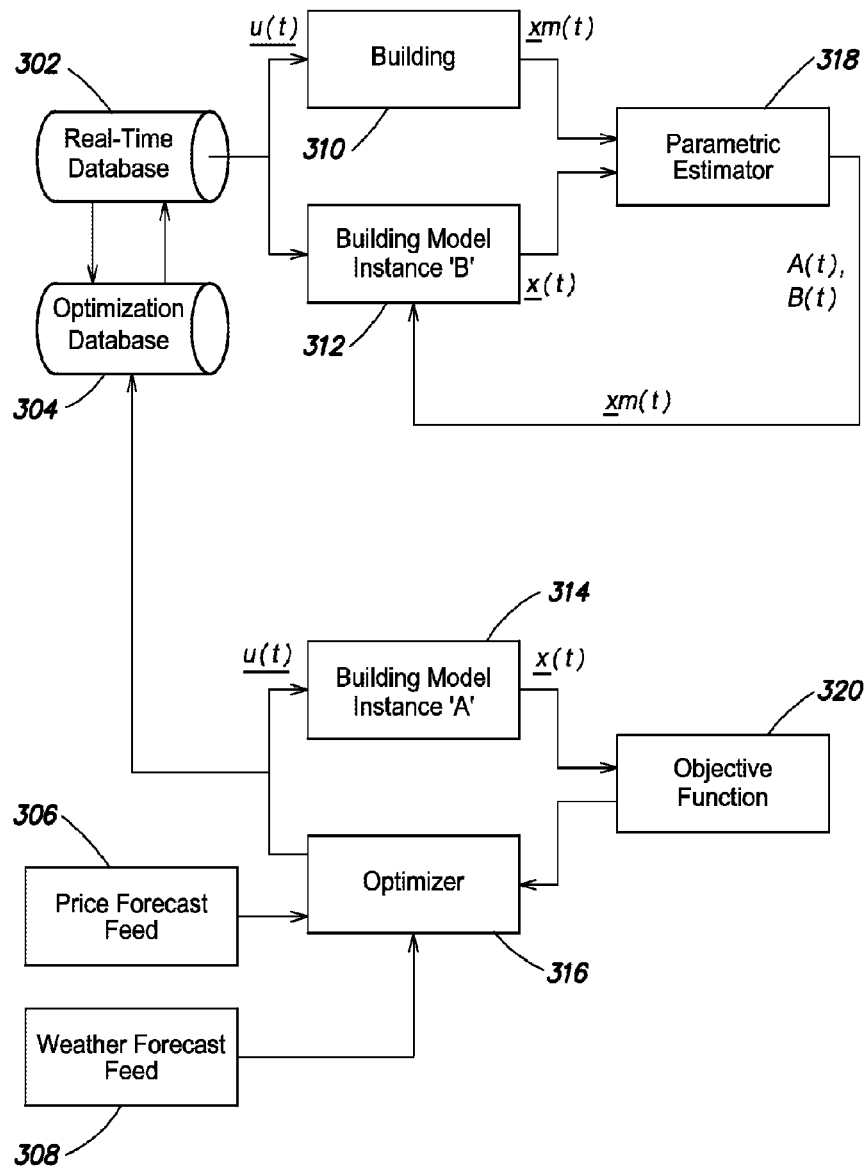
FIG. 16 shows an example block diagram relating to modeling and optimization techniques that may be employed in the implementation of FIGS. 14 and 15, according to a principle described herein.

FIG. 16 shows a general overview of an example of one possible algorithm to suggest schedules for control of various energy assets at a customer's facility using "optimal control" techniques and parametric estimation. In general, complex processes are often described by non-linear equations, which present a challenge to the most advanced optimization engines. The objective of various examples is to provide an accurate CBL model represented by linearized equations, where the coefficients of the linearized equations are adjusted in real-time from actual process measurements, using parametric estimation. This method may provide an accurate load forecast, with minimal effort necessary to deploy the solution. In addition, the model may be adapted over time to physical changes in the building, such as efficiency improvements.

A. Model of Customer Baseline Usage

One aspect of examples is the establishment of a "customer baseline". The customer baseline is the level of a facility's consumption of electric energy on a given day, without regard to any action taken in response to price. That is, the customer baseline corresponds to the customer's energy consumption resulting from business-as-usual operation of its facility. Instead of relying on historical energy consumption data, the calculation of the customer baseline is based upon a computer simulation model of a facility's energy consumption, taking into account its operating plans. Thus, the calculation is predictive rather than backward-looking.

A mathematical simulation model is developed for each facility, taking into account the facility's energy consuming equipment and its operating plans. In FIG. 16, module 314 contains the linearized simulation model (Instance 'A') of the CBL load, as generated, for example, using model builder module 502 in FIG. 18, discussed further below. The calculation of consumption for each day may reflect all of the known relevant variables, such as building materials, thermal properties of the building or buildings, building occupancy, desired temperature, ambient temperature, and operations for the day. At least the following parameters may be included: HVAC building settings and controls, identification of interruptible loads and their pre-defined response to a price signal, and desired temperatures. The software retains a record of the actual demand response action taken by an end-user.

Figure 18:
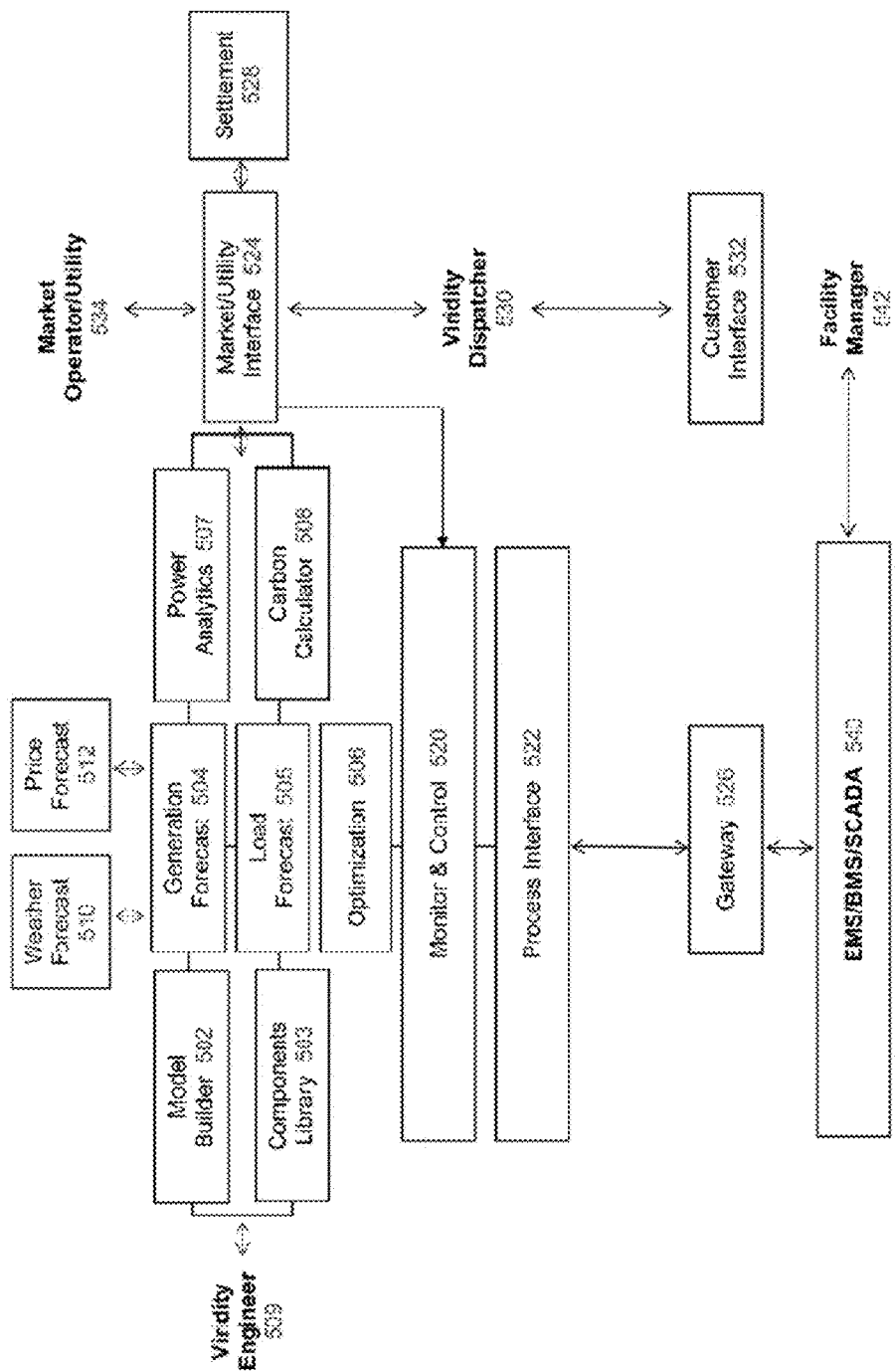
FIG. 18 shows an example system that includes various modules for implementing the concepts described in connection with FIGS. 14-16, according to a principle described herein.

The model for a facility can be composed of a group of sub-models of all the facility's energy-consuming elements, shown in components library 503, in FIG. 18 herein. The examples below refer to a building load, but the same method can be applied to any device, such as a motor or lighting fixture. Variable load as well as interruptible load equipment may be modeled specifically. Items constituting a fixed load may be measured and modeled individually.

Building thermodynamics is pertinent in the determination of electrical loads. The fundamental thermodynamic equations for this application are:

$$CpM \frac{dT}{dt} Q\_in + Q\_body - Q\_hvac - Q\_chill - Q\_vent \qquad (1)$$

Where:
CpM=Energy-temperature change ratio.
Q_in=Energy inflow due to the difference between building internal temperature and ambient temperature.
Q_body=Energy emission from people and equipment in the building.
Q_hvac=Energy inflow from the HVAC in addition to the chiller and ventilation.
Q_chill=Energy inflow from the chiller.
Q_vent=Energy inflow from the ventilation system.

$$Q\_in = UA\_build \times (T^4 - T^1) \qquad (2)$$

Where:
Q_in=Energy inflow due to the difference between building internal temperature and ambient temperature.
UA_build=Heat energy transfer rate due to temperature differences.
$T^4$=Ambient temperature outside the building.
$T^1$=Internal temperature of the building.

$$Q\_body = Num\_people \times (Q\_per\_body + (equip\_rate \times Q\_equip)) \qquad (3)$$

Where:
Q_per_body=Amount of energy emitted per hour from a person present in the building.
Num_people=Number of people present in the building.
equip_rate=Rate of personal electronic equipment per person.

Q_equip=Average amount of energy emitted by electronic equipment such as cell phones and computers.

$$Q\_hvac = \frac{u\_hvac}{k\_const} \times MaxQ\_hvac \times (T^1 - T\_cool) \qquad (4)$$

Where:
Q_hvac=Energy inflow from the HVAC in addition to the chiller and ventilation.
u_hvac=HVAC loading.
MaxQ_hvac=Maximum thermal production capacity of the HVAC.
T_cool:=Defines the threshold temperature below which the HVAC system operates in heating mode, while above which it operates in cooling mode.
$T^1$=Internal temperature of the building.
k_const=Constant parameter.

$$Q\_vent = MaxQ\_vent \times U\_vent \qquad (5)$$

Where:
Q_vent=Energy inflow from the ventilation system.
u_vent=HVAC ventilation loading.
MaxQ_vent=Maximum thermal production capacity of the HVAC ventilation.

$$Q\_chill = \frac{u\_chill}{k\_const} \times MaxQ\_chill \times (T^1 - T\_cool) + u\_dice \times Ice\_drate \times Btu\_MWh\_ConvRate \qquad (6)$$

Where:
Q_chill=Energy inflow from the chiller.
u_chill=HVAC chiller loading.
u_dice=Cooling use of stored ice.
MaxQ_chill=Maximum thermal production capacity of the HVAC chiller.
Ice_drate=Chiller's ice-consuming rate when the stored ice is to be used (discharge).
$T^1$=Internal temperature of the building.
k_const=Constant parameter.
Btu_MWh_ConvRate=Conversion coefficient of electric to heat energy.
T_cool=Defines the threshold temperature below which the HVAC system operates in heating mode, while above which it operates in cooling mode.

The thermodynamic equations are related to electrical load through the following equations.

$$MW\_hvac = \frac{MaxQ\_hvac}{Eff\_hvac \times Btu\_mWh\_ConvRate} \times u\_hvac \qquad (7)$$

Where:
MW_hvac=Average HVAC power consumption.
Eff_hvac=Efficiency coefficient of HVAC thermal energy production by electric energy.
Btu_Mwh_ConvRate=Conversion coefficient of electric to heat energy.
MaxQ_hvac=Maximum thermal production capacity of the HVAC.
u_hvac=HVAC loading.

$$\text{MW\_vent} = \frac{\text{MaxQ\_vent}}{\text{Eff\_vent} \times \text{Btu\_mWh\_ConvRate}} \qquad (8)$$

Where:
MW_vent:=Average ventilation power consumption.
MaxQ_vent=Maximum thermal production capacity of the HVAC ventilation.
Eff_vent=Efficiency coefficient of HVAC thermal energy production by electric energy.
Btu_MWh_ConvRate=Conversion coefficient of electric to heat energy.

$$\text{MW\_chill} = \frac{\text{MaxQ\_chill}}{\text{Eff\_chill} \times \text{Btu\_mWh\_ConvRate}} \times \text{u\_chill} + \text{u\_cice} \times \text{Ice\_crate} \qquad (9)$$

Where:
MW_chill=Average chiller power consumption.
MaxQ_chill=Maximum thermal production capacity of the HVAC chiller.
Eff_chill=Efficiency coefficient of the HVAC chiller.
u_cice=Ice-making operation.
Ice_crate=Chiller's ice-making rate when making ice (charge).
u_chill=HVAC chiller loading.
Btu_MWh_ConvRate=Conversion coefficient of electric to heat energy.

$$\text{Load\_hvac} = \text{MW\_hvac} + \text{MW\_vent} + \text{MW\_chill} \qquad (10)$$

Where:
Load_hvac=Total electric power to operate the HVAC system.
MW_hvac=Average HVAC power consumption.
MW_vent=Average ventilation power consumption.
MW_chill=Average chiller power consumption.

The variables Num_people and equip_rate in equation (3) are determined from occupancy data and facility or industry data concerning the number and types of electronic equipment per person. MaxQ_hvac, MaxQ_chill, and MaxQ_vent, can be determined from equipment name plate data.

The model established for an energy-consuming facility, and the sub-models for related equipment may take into account the above thermodynamic load equations.

There is a wide variety of other types of variable load and interruptible load equipment that can be accurately modeled using a similar approach. The granularity of these models will be that necessary for accurate calculation of the business as usual load of a facility as measured against the metered load. Sub-metering can be used as necessary to validate mathematical models of variable and interruptible loads.

For large scale facilities consisting of multiple buildings or elements, the total customer base line load is simply the sum of the base line loads for the individually-modeled aggregated elements.

The process for developing the model of a facility is iterative. A generic, or representative, model of the facility is first developed. Experiments are then performed on the building or buildings to determine their thermal parameters. Sub-metering is used as previously mentioned. The experimental results and load data are incorporated to modify and tune the generic model.

After the model is created, it is validated by conducing simulations of the facility using the model to calculate the electrical load. Model output is compared to actual historical metered loads. Further experimentation, data collection, and model refinement is performed until the model accurately reproduces metered data.

B. Optimization

As noted above, one of the goals of the implementation shown in FIG. 16 is the generation of one or more control signals (i.e., a "control vector") representing a suggested schedule for control of various energy assets at a customer's facility so as to improve energy usage relative to a customer base line, based on a variety of factors. According to one example, "optimal control" techniques are employed to optimize energy use based at least in part on cost of energy considerations.

1. Overview of Optimization

An optimal value of a control vector $\underline{u}$ is that which minimizes total cost and provides maximal benefit to the user. Various examples utilize system observation, faster-than-real-time numerical simulation, mixed-integer optimization, and remote hardware actuation to perform automated load demand response and create "virtual generation".

Various examples utilize advanced mathematical techniques to perform real-time optimization of load behavior for energy cost minimization. Various examples perform a process that is divided in to five steps, as outlined in FIG. 17:

1) discretization—conversion of the continuous system model to a discrete-time representation;
2) initialization of $\underline{u}$ k—like many nonlinear analyses, initialization facilitates convergence;
3) system observation—acquisition of $\underline{x}^{(m)}(t_0)$ via physical measurement and $\underline{v}^{(m)}$ external communication network;
4) cost minimization—determination of the value of $\underline{u}$ (referred to as $\underline{u}_{min}$) which results in minimal total cost, as defined by the objective function ($c_A$); and
5) system actuation—generation of control signals based on results of cost minimization, specifically $\underline{u}_{min}$.

2. Mathematical Definition of System for Optimization

Various examples utilize an ordinary differential description of the aggregate load system—derived from the laws of energy conservation and applicable laws of physics—like that shown below, employing the following variables: set of ordinary differential equations describing dynamic behavior (f), set of algebraic expressions describing static behavior (g), system state vector ($\underline{x}$), and system parameter vector ($\underline{u}$), and time (t).

$$\dot{x} = \frac{dx/dt}{f(\underline{x}, \underline{u}, t)} \qquad (11)$$

$$\underline{y} = g(\underline{x}, \underline{u}) \qquad (12)$$

A set of objective sub-functions ($c_i$) is utilized to quantify the optimality of $\underline{u}$ with respect in terms of several system characteristics—e.g. electric cost, natural gas fuel cost (for DG's), differential between actual and desired internal temperature, differential between actual and desired lighting status (on/off). Note the following definition: set of external inputs ($\underline{v}$) supplied by the local network operator.

$$\text{objective sub-function} = c_i(\underline{x}, \underline{y}, \underline{u}, \underline{v}, t) \qquad (13)$$

These objective sub-functions are user-defined, derived from the load behavior. Refer to the examples below.

$c_i$=|desired temperature−actual temperature|

$c_j$=(fuel cost per $W$)($W$ generated by $DG$)

$c_i$=(electricity cost per $W$)($W$ consumed) (14)

The main objective function (c) examines cost over a defined time interval—$t_0$ to $t_T$—and takes the form of a integral weighted sum, with each term representing an individual penalty. Weighting coefficients ($\alpha_i$) are also user-defined on the basis of desired balance between comfort, productivity, and energy cost. Refer to the expression below.

$$c(\underline{x}, \underline{y}, \underline{u}, \underline{v}, t_K) = \int_{t_0}^{t_K} \left[ \sum_{i=1}^{n} \alpha_i * c_i(\underline{x}, \underline{y}, \underline{u}, \underline{v}, t) \right] dt \quad (15)$$

Whenever possible, the system model—presented in (11) and (12)—should be linearized such that a closed-form solution exists. This may be accomplished in two ways:

1) piece-wise linearization—a more basic approach, in which the nonlinear model is estimated via first-order approximation for a set of discrete operating points; and 2) adaptive model—the coefficients of a linear model are assumed to be functions of time, estimated periodically from real-time system observation and application of Kalman Filters.

3. Discrete Simulation

Methods in accordance with various examples require discretization of the continuous system dynamic model/objective function via trapezoidal rule, or similar scheme. This facilitates the conversion of continuous differential expressions (f) to discrete difference expressions ($f_\Delta$). Refer to (16) through (19).

$$t_{[K]} = k(\Delta t) \quad (16)$$

$$\underbrace{\overline{f(t)} = \overline{f(\underline{x}, \underline{u}, t)}}_{\text{note that } f(t) \text{ abbreviated representation of } f(\underline{x},\underline{u},t)} \quad (17)$$

$$\underline{x}(t) = \int_{t_0}^{t} [f(\underline{x}, \underline{u}, t) dt] + \underline{x}(t_{[0]}) \approx \quad (18)$$

$$\dots \approx \frac{1}{2} \sum_{k=1}^{(t/\Delta t)} \underbrace{[f(t_{[k]}) + f(t_{[k+1]})] \Delta t}_{f(\underline{x},\underline{u},t_{[k]}) + f(\underline{x},\underline{u},t_{[k-1]})} + \underline{x}(t_{[0]})$$

$$0 = f_\Delta(\underline{x}, \underline{u}, \Delta t, t) = \dots = \begin{pmatrix} \underline{x}(t_{[1]}) - \left[\frac{1}{2}[f(t_{[1]}) + f(t_{[0]})]\Delta t + \underline{x}(t_{[0]})\right] \\ \underline{x}(t_{[2]}) - \left[\frac{1}{2}[f(t_{[2]}) + f(t_{[1]})]\Delta t + \underline{x}(t_{[1]})\right] \\ \underline{x}(t_{[3]}) - \left[\frac{1}{2}[f(t_{[3]}) + f(t_{[2]})]\Delta t + \underline{x}(t_{[2]})\right] \\ \vdots \end{pmatrix} \quad (19)$$

It also facilitates discretization of the objective function (c). Refer to (20) and (21).

$$\underbrace{\overline{c_i(t) = c_i(\underline{x}, \underline{y}, \underline{u}, \underline{v}, t)}}_{\text{note that } c_i(t) \text{ abbreviated representation of } c_i(\underline{x},\underline{y},\underline{u},\underline{v},t)} \quad (20)$$

$$c(\underline{x}, \underline{y}, \underline{u}, \underline{v}, t) = \quad (21)$$

$$\int_{t_0}^{t} \left[\sum_{i=1}^{n} \alpha_i * c_i(t)\right] dt \approx \dots \approx \underbrace{\frac{1}{2} \sum_{k=1}^{(t/\Delta t)} \left[\sum_{i=1}^{n} \alpha_i * [c_i(t_{[k]}) + c_i(t_{[k-1]})]\right] \Delta t}_{c_\Delta(\underline{x},\underline{y},\underline{u},\underline{v},t,\Delta t)}$$

However, it should be noted that these approximations might only hold true for small discrete time steps ($\Delta t \approx 0$).

4. Initialization

The first step of a process in accordance with various examples, is initialization of the vector to be optimized ($\underline{u}$). This initial condition is represented as $\underline{u}^{(0)}$, or the $0^{th}$ iteration of $\underline{u}$. Note that proper initialization is a requirement of most nonlinear system analysis methods.

A second step—generally performed in parallel with the first—is observation of the current system state ($\underline{x}(t_0)$) as well as collection of any other relevant data ($\underline{v}$).

5. Optimization/Cost Minimization

In an implicit approach, the discrete system model ($f_\Delta$) and objective function ($c_\Delta$) are solved as a single entity, allowing the user to minimize cost and simulate the load response simultaneously. The weighting coefficients $\beta_1$ and $\beta_2$ may be utilized to place emphasis on simulation accuracy over cost minimization. Refer to (22).

$$\min \begin{Bmatrix} \beta_1 * \underbrace{f_\Delta(\underline{x}, \underline{u}, \Delta t, t_k)}_{\text{for dynamic simulation}} \\ \beta_2 * \underbrace{c_\Delta(\underline{x}, \underline{y}, \underline{u}, \underline{v}, t, \Delta t)}_{\text{for cost minimization}} \end{Bmatrix} \quad (22)$$

Various examples, however, utilize an explicit approach in which simulation and cost minimization occur consecutively—significantly reducing the number of expressions to be optimized. Refer to (23).

$$\underbrace{c_\Delta(\underline{x}, \underline{y}, \underline{u}_{min}, \underline{v}, t, \Delta t) = \min\{c_\Delta(\underline{x}, \underline{y}, \underline{u}, \underline{v}, t, \Delta t)\}}_{\text{note that } \underline{u}_{min} \text{ is optimal value of } \underline{u}, \text{ that which minimizes the obj. function}} \quad (23)$$

Note that the optimal value of $\underline{u}$, that which yields a minimal value of $c/c_\Delta$ is denoted by the variable $\underline{u}_{min}$.

Generally, the objective function ($c/c_\Delta$) is nonlinear and, as such, a closed-form solution for $\underline{u}_{min}$ does not exist. To find $\underline{u}_{min}$, a nonlinear optimization method can be employed. One example is the gradient search, an iterative method utilizing first-order approximation of system behavior to iteratively calculate a local minimum. Refer to the update expression presented in (24).

$$\underline{u}^{(m+1)} \approx -c_\Delta(\underline{u}^{(m)}) \left[\frac{dc_\Delta(\underline{u}^{(m)})}{d\underline{u}}\right]^{-1} + \underline{u}^{(m)} \quad (24)$$

Note that the gradient method is based on a Taylor Series Expansion of the objective function, as shown in (25).

$$c_\Delta(\underline{u}_{min}) \approx \underbrace{c_\Delta(\underline{u}^{(i)})}_{\text{operating point}} + \underbrace{\frac{dc_\Delta(\underline{u}^{(i)})}{d\underline{u}}(\underline{u}_{min} - \underline{u}^{(i)})}_{1^{st} \text{ order term}} \approx 0 \quad (25)$$

The explicit approach to cost minimization is performed, essentially, in four steps:

1) faster than real-time simulation—for each iteration (m), it is necessary in various examples to examine, via simulation, how the load system will respond to a set of parameters $\underline{u}^{(m)}$;

2) cost evaluation/decision—for each iteration (m), it is necessary in various examples to calculate total cost ($c_\Delta$);

3) fast optimization—for each iteration, it is necessary in various examples to update the set of system input ($\underline{u}^{(m+1)}$) for minimal cost ($c_\Delta$); and 4) decision—if the incremental change between $\underline{u}^{(m+1)}$ and $\underline{u}^{(m)}$ is small, then assume that a local minimum is found—otherwise, repeat loop with simulation.

In many instances, the load composition may warrant use of a mixed-integer $\underline{u}$, in which at least one control parameter takes on integer values only. One example is the actuation of lighting-type loads, for which only two statuses exist—off (0) and on (1).

6. Kalman Filtering

The presence of noise in system observations is defined in (26).

$$\underset{\underset{\underline{z} = \underline{x} + \underline{\varepsilon}}{\text{state plus noise}}}{\text{observation equals}} \tag{26}$$

To account for this noise, various examples utilize a Kalman filter in their method. It is an efficient recursive filter utilized to estimate the state of a linear dynamic system from a series of noisy measurements. In contrast to batch estimation techniques, it is a time-invariant process.

The state of the filter is represented by two variables:

$\hat{\underline{x}}_{k|k}$: the a posteriori state estimate at time-step k given the observations up to and including time-step k; and $P_{k|k}$: the a posteriori error covariance matrix—measure of the estimated accuracy of $\hat{\underline{x}}_{k|k}$.

The Kalman filter operates in two phases:

1) Predict—the state estimate from the previous time-step is updated to estimate the current time-step. This predicted state estimate is known as the a priori state estimate because, although it is an estimate of the state at the current time-step, it does not include observation information from the current time-step. Refer to (27). The following variables are referenced below: predicted state ($\hat{\underline{x}}_{k|k-1}$), predicted estimate covariance ($P_{k|k-1}$), $$\hat{\underline{x}}_{k|k-1} = \underline{F}_k(\hat{\underline{x}}_{k-1|k-1}) + \underline{B}_{k-1}(\underline{u}_{k-1})$$

$$\underline{P}_{k|k-1} = \underline{F}_k(\underline{P}_{k-1|k-1})\underline{F}_k^T + \underline{Q}_{k-1} \tag{27}$$

2) Update—the current a priori prediction is combined with current observation information to refine the state estimate—referred to as the a posteriori state estimate. Refer to (28). The following variables are referenced below: innovation or measurement residual ($\tilde{\underline{y}}_k$), innovation (or residual) covariance ($\underline{S}_k$), optimal Kalman gain ($\underline{K}_k$), updated state estimate ($\hat{\underline{x}}_{k|k}$), updated estimate covariance ($\underline{P}_{k|k}$).

$$\tilde{\underline{y}}_k = \underline{z}_k - \underline{H}_k\hat{\underline{x}}_{k|k-1}$$

$$\underline{S}_k = \underline{H}_k\underline{P}_{k|k-1}\underline{H}_k^T + \underline{R}_k$$

$$\underline{K}_k = \underline{P}_{k|k-1}\underline{H}_k^T\underline{S}_k^{-1}$$

$$\hat{\underline{x}}_{k|k} = \hat{\underline{x}}_{k|k-1} + \underline{K}_k\tilde{\underline{y}}_k$$

$$\underline{P}_{k|k} = (I - \underline{K}_k\underline{H}_k)\underline{P}_{k|k-1} \tag{28}$$

Now, if the model is accurate, then the following invariant are preserved and all estimates have a mean error of zero.

$$E[\underline{x}_k - \hat{\underline{x}}_{k|k}] = E[\underline{x}_k - \hat{\underline{x}}_{k|k-1}] = 0$$

$$E[\tilde{\underline{y}}_k] = 0 \tag{29}$$

7. Virtual Generation

An aspect of various examples is that they give a user the ability to define the desired load behavior as an objective function (c) and implement it in a remote and automated fashion, without the need for manual observation, decision making, or actuation.

A simple objective function, composed of only two weighted penalties, is presented in (30). The first is associated with comfort, quantified by a difference between the desired ($T_{des}$) and actual ($T_{act}$) internal temperature. The second is associated with energy cost, quantified by the product of electric cost ($c_W$) and consumption ($W_{con}$). The user expresses his or her desired balance between comfort and energy cost as a set of weighting coefficients ($\alpha_1$, $\alpha_2$).

$$c(\underline{x}, \underline{y}, \underline{u}, \underline{v}, t_K) = \tag{30}$$

$$\dots = \int_{t_0}^{t_K} \left[ \alpha_1 \overbrace{|T_{act}(t) - T_{des}(t)|}^{\substack{\text{penalty associated with} \\ \text{difference between desired} \\ \text{and actual temp.}}} + \alpha_2 \overbrace{[c_W(t) * con(t)]}^{\substack{\text{penalty associated} \\ \text{with energy cost}}} \right] dt$$

Three sample cases are examined:

1) strict regulation of $T_{act}$—in the case of $\alpha_1 > \alpha_2$, the optimization algorithm places emphasis on comfort over energy conservation, resulting in $T_{act} \approx T_{des}$.

2) strict regulation of $W_{con}$—in the case of $\alpha_1 < \alpha_2$, the optimization algorithm places emphasis on energy conservation over comfort, resulting in $W_{con} \approx 0$.

3) even balance—in the case of $\alpha_1 \approx \alpha_2$, the optimization algorithm places equal emphasis on comfort and energy conservation, resulting in semi-regulation of both $T_{act}$ and $W_{con}$.

The example demonstrates that, under certain circumstances and with proper configuration, examples may be utilized to regulate load power consumption and, in turn, emulate virtual generation. Note that a virtual generator is a set of components—e.g. load, energy storage, renewables—configured to mimic traditional supplies and participate, as such, in economic dispatch.

C. System Implementation

Figure 17:
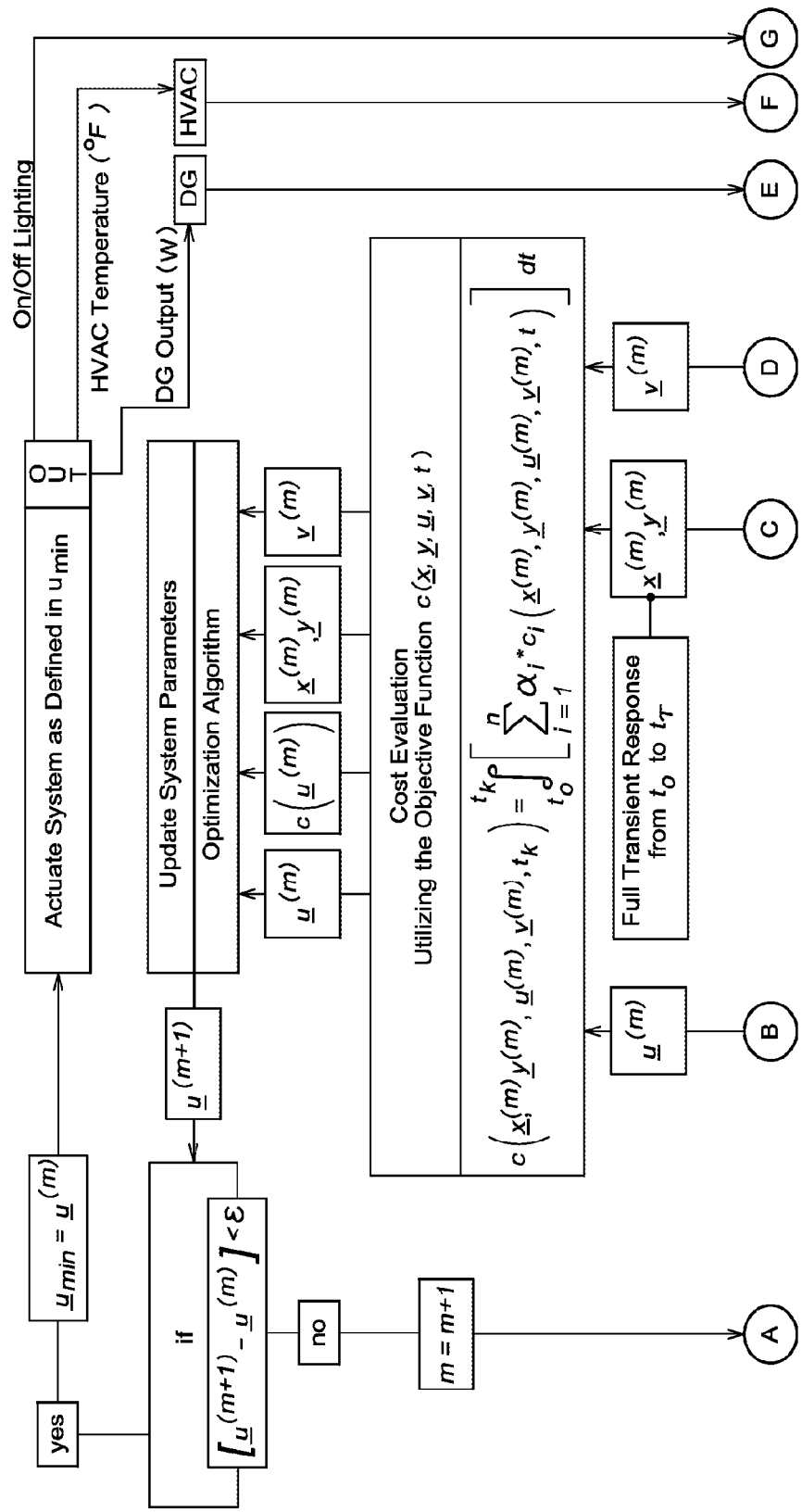
FIG. 17 shows example details of an optimization technique, according to a principle described herein.
Figure 17:
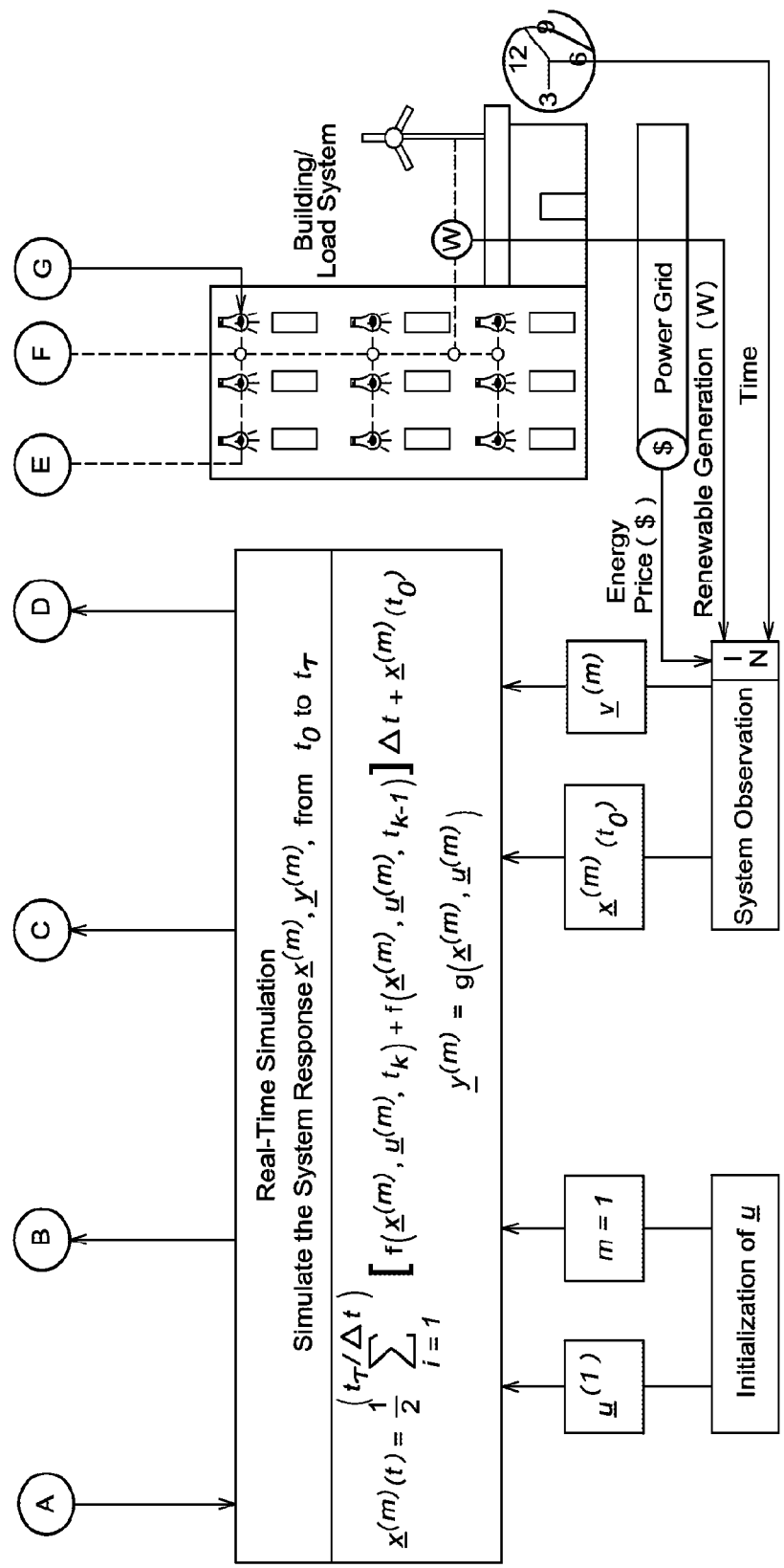

Given the mathematical construct outlined above and illustrated in FIG. 17, and with reference again to FIG. 16, the optimization engine (Module 316) will iterate on the control vector u(t) which represents control variables (e.g., temperature control), and Module 314 will compute the corresponding state vector x(t), which represents process variables (e.g., temperature, humidity) over time, taking into account various inputs such as weather forecast parameters (Module 308) and Price Forecast Feed 306. The optimization engine (Module 316) iterates on the control vector u(t) until the objective function (Module 320) is optimized over the defined time period (e.g., next 24 hours). The objective function combines several user adjustable components that include such factors as comfort, economic benefit, and environmental objectives, along with various time dependent constraints on both state and control variables. Economic benefits are derived from known time dependent economic parameters, including the wholesale price forecast (Module 306). The solution is stored in the Optimization Database (Module 304), which contains various optimization scenarios or cases that can be simulated and compared by the end user. Once a case is selected, the user will then commit the specific scenario to the Real-Time Database (Module 302).

The selected control vector u(t) may then be used by the Building Management System to control the corresponding physical resources as a function of time. The same control vector is submitted in parallel to the Module 312, which contains an identical version of the Building Model (Instance 'B'). The output of Module 312, the simulated state of the building x(t), is compared against the measured state xm(t), which is produced by the Building Management System 310. The difference is fed to the Parametric Estimator (Module 318) which calculates, by doing parametric estimation (e.g., using Kalman filters), the model coefficients A(t) and B(t) that minimize the difference between the simulated state and the observed state of the building. These coefficients are updated periodically to ensure that the linearized model used for the optimization (Module 314) forecasts accurately the time dependent simulated behavior of the building in the vicinity of the current measured state.

FIG. 18 describes examples of system modules for various examples of a system. Each module may be a software module executed on hardware. The modules are in electronic communication with each other as shown in FIG. 18 to operate in the system.

Model builder module 502 models a particular client facility such as a building or office campus. The energy resources modeled may include the building, the lights, HVAC, motors, electricity generation capacity, generators, and solar generators, for example. The model builder module 502 and other technical elements 502 through 542 shown in FIG. 18 may variously run as software on PCs or other appropriate computer facilities.

The components library 503 may be a library of software components to model particular genres of facilities or energy resources, such as buildings, HVAC, motors, energy storage devices, batteries, solar generators, and solar panels, which components 503 may be calibrated with specific parameters for specific clients.

The generation forecast module 504 receives weather forecast information from the weather forecast module 510, and receives electricity price forecasts and related price forecasts, from the price forecast module 512. The generation forecast module 504 then generates for the customer a forecast of the customer's electricity generation, for example from solar generators, solar panels, or diesel generation.

The load forecast module 505 generates a forecast of load for a specific facility, that is a forecast of the electricity demand used by the customer's facility, broken down for time periods over the day, for example, in half hour increments.

The optimization module 506 produces optimum options for the individual customer, presenting tradeoffs for optimizing different parameters, such as the total cost of electricity versus comfort from the maintained temperature. For example, there is a tradeoff in the summer months between the cool temperature generated within a facility by HVAC and the energy costs to generate the same. In a dynamic virtualization example described herein, the optimization module 506 may produce a plan for controlling the operation of at least one of the facility's energy assets to reduce the electricity provider's overall charge to the facility for electric energy, or to provide a revenue source to the facility, the plan being produced on the basis of the model, and variations in the price of electric energy during a day. The controlled assets are optimized in the plan across a number of energy markets, selected from the group comprising electric power, capacity, ancillary services, and regulation. Any energy storage assets are optimized in the plan by dynamic virtualization across the markets for power, capacity, ancillary services and regulation.

The power analytics module 507 analyses a micro electric grid (e.g. for a campus or a large building for a customer), and maintains acceptable power quality within the forecasts and optimizations, for example maintaining required voltage and amps within acceptable tolerances.

The carbon calculator module 508 calculates how much the system options presented by optimization module 506 may each reduce the carbon footprint of the client system.

The engineer 509 communicates with the various modules of the system 502 through 508 to develop the forecasts and other output on a daily basis, perhaps disaggregated by hourly or lesser time periods.

The modules 502, 503, 504, 505, 506, 507 and 508 communicate with each other in the system and with the engineer 509 in the optimization mode of the system to develop and analyze optimization options for the target client facility.

The weather forecast module 510 provides data which is purchased from outside vendors and the data is imported to the generation forecast module 504.

The price forecast module 512 also provides data bought from outside vendors to import price forecast data to the generation forecast module 504.

The monitor and control module 520 monitors the client's facilities to determine if the customer actually operates facilities in the manner of the chosen option and also communicates with the grid operator 524. The monitor and control module 520 also can be used to remotely control the client's facility 540, if authorized, and if in electronic communication with the client's facility 540.

The process interface module 522 is similar to a communication API in electronic communication between the monitor and control module 520 and the gateway 526.

Gateway 526 is a gateway in electronic communication with the EMS/BMS SCADA module 540. The energy management system ("EMS"), and the building management system ("BMS"), and the supervisory control and data acquisition ("SCADA") system are legacy systems installed in the customer's facilities that communicate through the gateway 526 to their process interface module 522 and to the modules 502 through 508 of the system. The EMS/BMS SCADA module 540 communicates through the gateway 526 to the process interface 522 through a variety of possible communication links including, e.g., the Internet, which links may include a virtual private network ("VPN").

The facility manager 542 communicates with and controls the EMS/BMS SCADA module 540 through communication through his computer system.

The market/utility interface module 524 communicates with the carbon calculator 508 and the other system modules and the monitoring and control module 520. Furthermore the market/utility interface 524 communicates with the market operating/utility 534 and the dispatcher 530. The dispatcher 530 communicates with the customer interface module 532. The customer interface module 532 permits the dispatcher 530 to communicate with the customer facility manager 542.

The facilities manager 542 offers to produce power at a price, or to control load to an extent. If this is accepted by the market operator/utility 534 at a particular price, then the facility 540 consequently performs accordingly.

The market/utility interface 524 is similar to an API that communicates between the system modules 502 through 508, and the market operator/utility 534, and the settlement module 528. The market/utility interface 524 communicates to the grid operator 534 that the dispatcher 530 makes an offer to the operator 534 on behalf of the facility manager 542 to produce electricity at a price and a time and a quantity, or to reduce consumption from the CBL (consumer base line) in a certain amount at a certain time. The operator 534 may then accept that offer. This information is then transmitted to the settlement module 528 to monitor specific performance by the facility 540 to produce electricity or reduce consumption from the CBL as agreed, and to arrange billing and payment accordingly between the market operator 534 and the facility manager 542.

The monitor and control module 520, the process interface module 522, the gateway 526, the market/utility interface 524, the settlement module 528, and the customer interface 532 are part of the real-time mode operation of the system. In the real-time mode, these modules monitor and control what the facility is actually doing, and also inform the facility manager 542 and the dispatcher 530 of sudden changes in prices that may lead to an alteration of the optimization schedule.

The weather forecast module 510 and the price forecast module 512 are owned and operated by third parties. The EMS/BMS/SCADA module 540 is owned and operated by the customer. The optimization mode modules 502-508 and the modules 520 and 522 are owned and operated by a company that may be different from the customer and different from the market operator.

Figure 19:
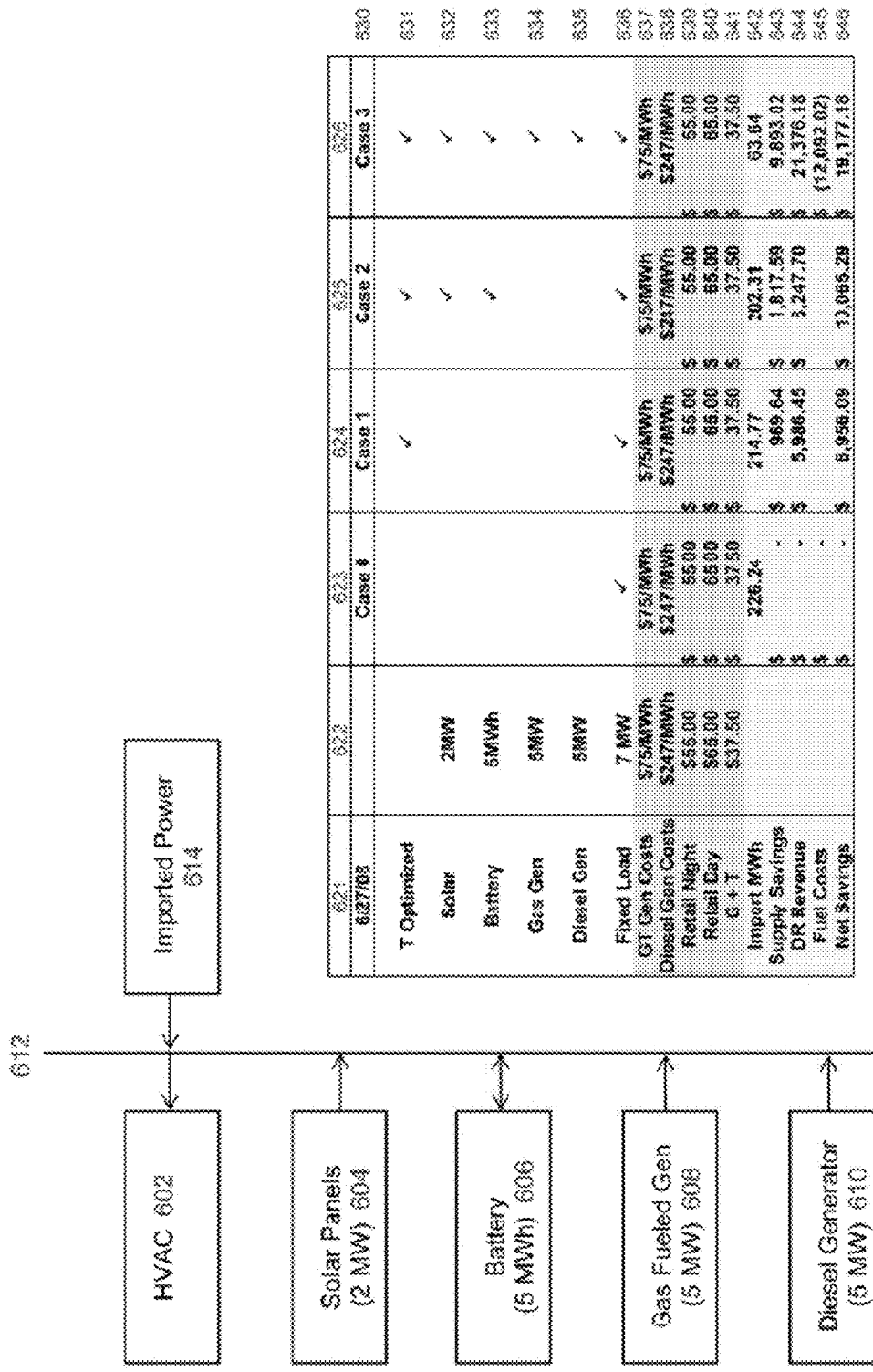
FIG. 19 shows an example optimization, according to a principle described herein.

The engineer 509, weather forecast module 510, price forecast module 512, market/utility interface 524, settlement module 528, dispatcher 530, customer interface 532, facility manager 542, EMS/BMS/SCADA 540, and gateway 526, may communicate with the system 502, 503, 504, 505, 506, 507, 508, 520, 522 and with each other through the Internet, wirelessly, by leased lines, POTS, VPN, or other telecom links FIG. 19 shows an example of optimization mode output for various examples. Electricity energy consumption and production features of a customer's facilities are shown, such as HVAC 602, solar panels (2 megawatts) 604, battery (5 megawatts hours) 606, gas fueled generator (5 megawatts) 608, and diesel generator (5 megawatts) 610. These resources 602 through 610 integrate over the power grid 612 with the larger RTO power grid which is a source of imported power 614. Here the term "imported power" means electric power from the RTO brought into the customer's facility over the power grid 612.

Various optimization options, produced by the optimization module 506 in FIG. 18, are shown in FIG. 19 in columns 621, 622, 623, 624, 625 and 626, and rows 630 through 646. Column 621 shows various row titles including the date row 630, temperature optimization in row 631, various power production and consumption facilities in rows 632 through 636, being respectively solar, battery, gas generation, diesel generation, and fixed load (fixed power consumption or fixed demand).

Row 637 shows gas generation cost for the customer, and row 638 shows diesel generation costs for the customer. Line 639 shows the retail night cost of electricity from the customer's supplier, and line 640 shows the retail day cost of electricity from the supplier. Line 641 shows the generation and transmission costs reflected in retail rates.

Line 642 shows the megawatt hours of imported electricity from the grid to the facility under different optimization scenarios. Line 643 shows the supply cost savings. Line 644 shows the demand response (reduced demand) revenue, i.e. the revenue paid to the facility operator by the RTO for the facility generator's reduction in the facility's energy usage below the CBL. Line 645 shows the fuel costs applicable and line 646 shows the net savings for the cases illustrated in the optimization examples.

Column 622 shows various units and prices for the respective items in column 621. MW abbreviates megawatts. MWh abbreviates megawatt hours.

Line 630 through 636, in column 622, shows the production capacity of the respective facilities. Lines 637 through 641 of column 622 shows the prices of the various factors named in column 621.

The checkmarks in lines 631 through 636 in cases 0 through 3 in columns 623 through 626 indicate what options are active in the indicated optimization case. Lines 637 through 646 in columns 623 through 626 show the various indicated prices and costs of the various features and options selected in the various cases. Line 646 shows the financial benefit of each option.

For example, in column 626 in optimization case 3 produced by examples, temperature is optimized, and all five of the energy resources including a solar, battery, gas generation, diesel generation and fixed load are implicated. The applicable prices are indicated in lines 637 through 641. The result in 642 is importing 63.64 megawatt hours of electricity from the grid (rather than the 226.64 MWH in Case 0), with a supply savings of $9,893.02 in line 643, with demand reduction reimbursement from the grid to the facility in line 644 of $21,376.18, with a fuel cost to the facility in line 645 of $12,092.02, for a net savings to the customer in case 3 of $19,177.18 shown in line 646. Of the four cases shown in this FIG. 19, the highest net savings in line 646 is with case 3, which is thereby indicated as the most optimizing case.

Figure 20:
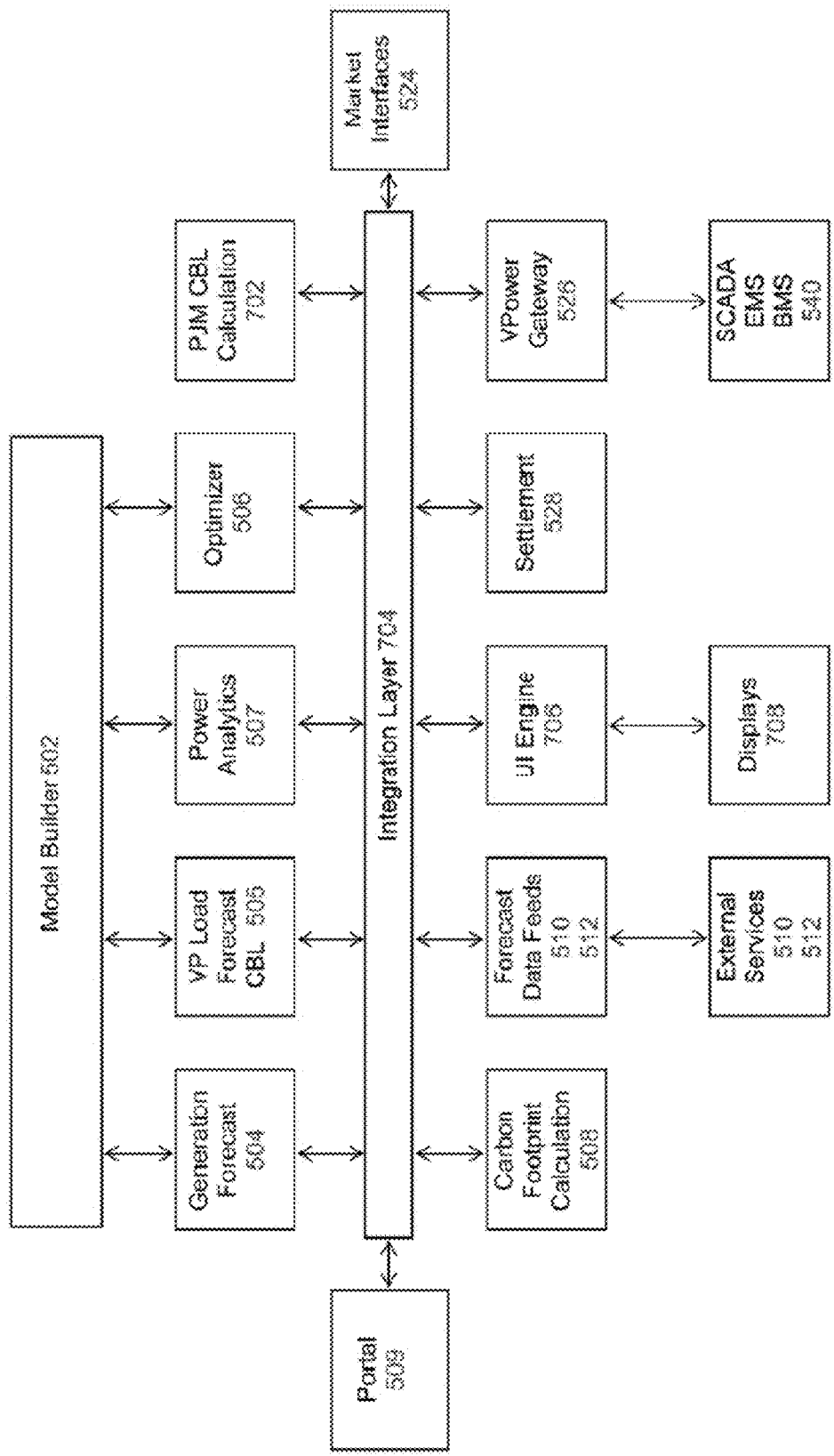
FIG. 20 shows an example system architecture, according to a principle described herein.

FIG. 20 shows a system architecture for examples that support and implement the modules shown in FIG. 18 to produce the optimization example shown in FIG. 19. Appropriate computer and communications hardware and software is used in an integration layer 704 to permit integrated communication between the portal 509, generation forecast module 504, the VP (VPower) load forecast CBL 505 (the load forecast of the "customer base load"), the power analytics module 507, the optimizing module 506, the model builder 502, the market interface 524, the gateway 526, the settlement module 528, the forecast data feeds 510, 512 from the external services 510, 512, and the carbon footprint calculator 508. (The same element numbers are used in FIG. 20 and FIG. 18, where the same elements are referred to in both Figures.)

Furthermore, the integration layer 704 allows integrated communication between these components and the PJM CBL calculator 702, the user interface engine 706, the displays 708, and the SCADA, EMS, BMS, 540. CBL abbreviates "customer base load" for electric power and is discussed further herein. The PJM CBL calculator 702 is a CBL calculator provided by a specific RTO in the Northeast, that being PJM.

The VP load forecast CBL 505 is referred to in FIG. 18 as the load forecast module 505. This is an alternative forecast of the CBL by an example of the present disclosure. The PJM CBL calculator 702 may be used initially to forecast the CBL. However, it may be that the alternative VP load forecast CBL 505 provides a superior algorithm and may eventually replace use of the PJM CBL calculator 702 to forecast the CBL. The system as indicated in FIG. 20 may use either or both alternative CBL calculations 505, 702, to support the settlement module 528.

Figure 21:
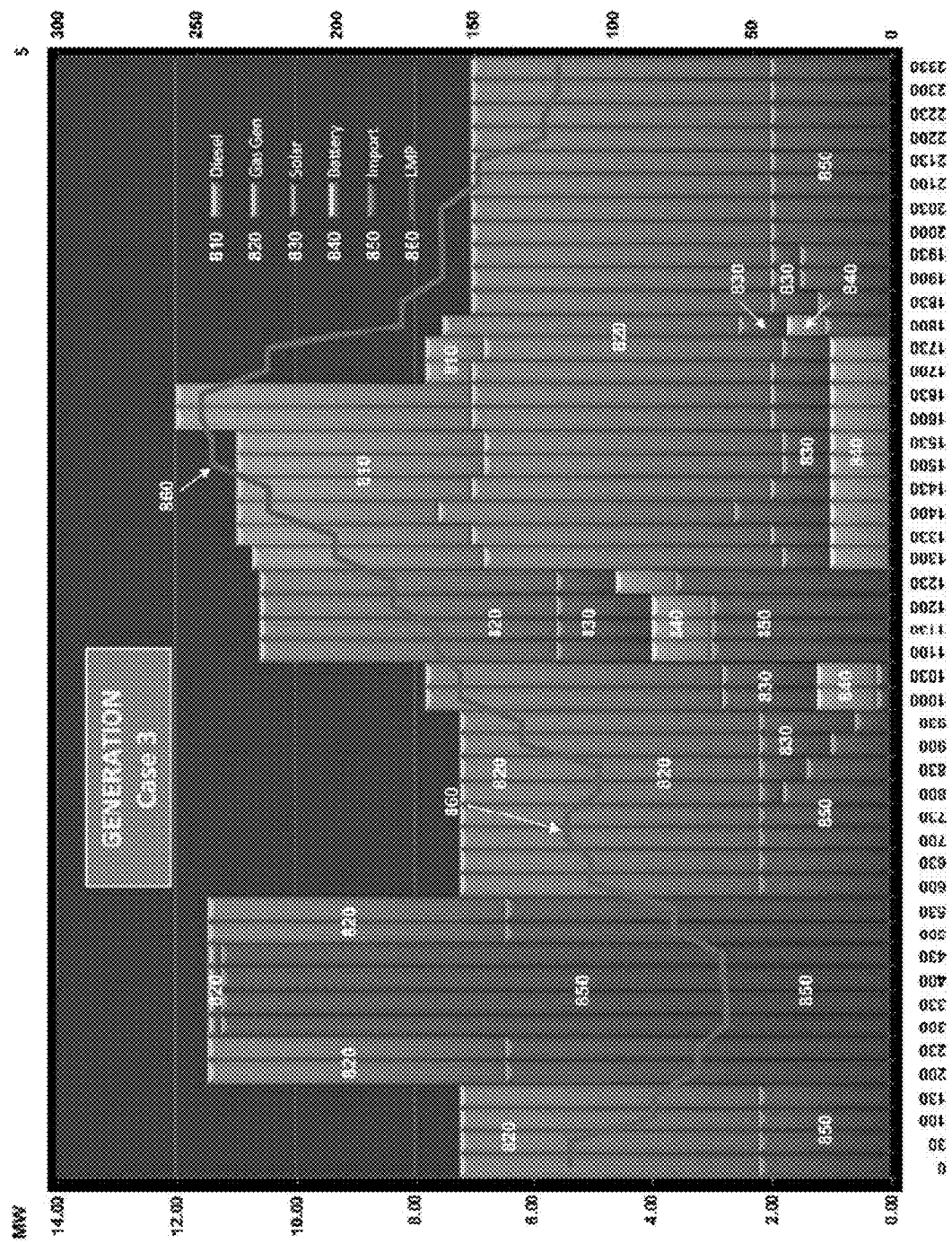
FIG. 21 shows example power use and price information for various electric energy resources in an optimization case example over a 24-hour cycle as generated according to a principle described herein.

The portal 509 is used by an engineer of 509 as indicated in FIG. 21 to access the example.

The UI engine 706 may develop, project and support the user interfaces 708 used by the engineer 509, the dispatcher 530, the facility manager 542, and by the market operator utility 534. The UI engine 706 projects the displays 708 used by the various users.

FIG. 21 is a chart describing the operation of one possible optimization option that may be calculated by system modules of FIG. 18 through the optimization examples in case 3 in FIG. 19 shown in column 626, using the system architecture of FIG. 20.

The horizontal axis shows time over a 24-hour cycle in 30-minute intervals. The vertical axis on the left-hand scale shows megawatts, the vertical axis on the right-hand scale shows cost in dollars. The different vertical bars show the production of electricity by a facility in option 3 at various times during the day, produced by diesel generation 810, gas generation 820, solar generation 830, power battery discharge 840, imported electricity from the RTO power grid 850, and the locational marginal price (LMP) throughout the day is shown in the line 860. Hence, we can see that under this optimization scenario, for example electricity imported from the grid 850 is maximized during the hours around 3:30 a.m. when the LMP is the lowest, and the electricity imported from the grid 850 is reduced to zero during the hours around 15:00 hours when the LMP is highest.

Also, it appears that the facility may be pre-cooled during the time around 3:30 hours when the LMP is lowest, by a substantial use of imported electricity.

Also, is appears that total use of electricity is peaked again in the hours around 15:00 hours when the demand for cooling is highest in the afternoon. But at this time, imported power 850 is reduced to zero because the LMP 860 is most expensive. This is accomplished by using diesel generation 810, gas generation 820, solar generation 830 (which is possible because the sun is out), and discharging the batteries 840. The batteries have been charged during the night around 3:30 hours when the LMP is lowest, to be discharged in the afternoon when the LMP is highest.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy disks, compact disks, optical disks, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for determining an operating schedule of a controller of at least one energy storage asset operated by an energy customer of an electricity supplier, so as to generate energy related revenue, over a time period T, associated with operation of the at least one energy storage asset according to the operating schedule, wherein the energy-related revenue available to the energy customer over the time period T is based at least in part on a wholesale electricity market, the apparatus comprising:
   at least one communication interface;
   at least one memory to store processor-executable instructions and a mathematical model for the at least one energy storage asset, wherein the mathematical model facilitates a determination of the operating schedule for the controller of the at least one energy storage asset based at least in part on a first operation characteristic of the at least one energy storage asset, a second operation characteristic of at least one energy consuming asset in communication with the at least one energy storage asset, and a forecast wholesale electricity price associated with the wholesale electricity market; and
   at least one processing unit, communicatively coupled to the at least one communication interface and the at least one memory, wherein upon execution of the processor-executable instructions, the at least one processing unit:
      A) determines the operating schedule for the controller of the at least one energy storage asset using the mathematical model; and
      B) controls the at least one communication interface to transmit to the energy customer the operating schedule for the controller of the at least one energy storage asset determined in A), and/or controls the at least one memory so as to store the determined operating schedule for the controller
   wherein:
   the wholesale electricity market includes an energy market and a regulation market; and
   the operating schedule for the controller of the at least one energy storage asset specifies, during a time interval within the time period T, a first portion of an available state of charge (SOC) of the energy storage asset for use in the energy market and a second portion of the available SOC of the energy storage asset for use in the regulation market.

2. The apparatus of claim 1, wherein the controller facilitates the communication between the at least one energy consuming asset and the at least one energy storage asset.

3. The apparatus of claim 1, wherein the first operation characteristic of the at least one energy storage asset is at least one of a state of charge, a charge rate, a degree of non-linearity of charge rate a discharge rate, a degree of non-linearity of discharge rate, a round trip efficiency, and a degree of life reduction.

4. The apparatus of claim 1, wherein the second operation characteristic of the at least one energy consuming asset is a load use schedule of the at least one energy consuming asset.

5. The apparatus of claim 4, wherein the second operation characteristic of the at least one energy consuming asset is an energy consumption profile as a function of time of the at least one energy consuming asset.

6. The apparatus of claim 4, wherein the at least one energy consuming asset is a controllable energy consuming asset, and wherein the second operation characteristic of the at least one controllable energy consuming asset is a set point.

7. The apparatus of claim 1, wherein, upon execution of the processor-executable instructions, the at least one processing unit determines the operating schedule for the controller of the at least one energy storage asset using the mathematical model in A) by minimizing a net energy-related cost over the time period T, wherein:
the net-energy related cost is based at least in part on:
electricity generation by the at least one energy storage asset;
first electricity consumption by the at least one energy storage asset; and
second electricity consumption by the at least one energy consuming asset; and
the energy-related revenue available to the energy customer is based at least in part on the minimized net energy-related cost.

8. The apparatus of claim 7, wherein the net energy-related cost is specified as a difference between an electricity supply cost and an economic demand response revenue over the time period T.

9. The apparatus of claim 8, wherein:
the at least one energy consuming asset includes at least one controllable energy consuming asset;
the operating schedule for the controller of the at least one energy storage asset constitutes a first operating schedule; and
in A), the at least one processing unit determines both the first operating schedule for the controller of the at least one energy storage asset and a second operating schedule for the at least one controllable energy consuming asset, based at least in part on minimizing the net energy related cost, over the time period T, associated with the electricity generation by the at least one energy storage asset, the first electricity consumption by the at least one energy storage asset, and the second electricity consumption by the at least one controllable energy consuming asset.

10. The apparatus of claim 1, wherein the operating schedule for the controller of the at least one energy storage asset specifies a time interval within the time period T for use of the energy storage asset to power the energy consuming asset when the forecast wholesale electricity price exceeds a predetermined threshold value.

11. The apparatus of claim 1, wherein the mathematical model facilitates determination of the operating schedule for the controller of the at least one energy storage asset further based at least in part on an expected energy-generating schedule of an energy generating asset in communication with the energy storage asset and the energy consuming asset.

12. The apparatus of claim 11, wherein the energy generating asset is at least one photovoltaic cell, at least one fuel cell, at least one gas turbine, at least one diesel generator, at least one flywheel, at least one electric vehicle, or at least one wind turbine.

13. The apparatus of claim 1, wherein the energy storage asset is at least one battery, at least one ice unit, or compressed air.

14. The apparatus of claim 12, wherein the energy storage asset is at least one battery, and wherein the at least one battery is lithium ion battery, lead acid battery, a flow battery, or a dry cell battery.

15. An apparatus for determining an operating schedule of a controller of at least one energy storage asset operated by an energy customer of an electricity supplier, so as to generate energy related revenue, over a time period T, associated with operation of the at least one energy storage asset according to the operating schedule, wherein the energy-related revenue available to the energy customer over the time period T is based at least in part on a wholesale electricity market, the apparatus comprising:
at least one communication interface;
at least one memory to store processor-executable instructions and a mathematical model for the at least one energy storage asset, wherein the mathematical model facilitates a determination of the operating schedule for the controller of the at least one energy storage asset based at least in part on a first operation characteristic of the at least one energy storage asset, a second operation characteristic of at least one energy consuming asset in communication with the at least one energy storage asset, and a forecast wholesale electricity price associated with the wholesale electricity market; and
at least one processing unit, communicatively coupled to the at least one communication interface and the at least one memory, wherein upon execution of the processor-executable instructions, the at least one processing unit:
A) determines the operating schedule for the controller of the at least one energy storage asset using the mathematical model; and
B) controls the at least one communication interface to transmit to the energy customer the operating schedule for the controller of the at least one energy storage asset determined in A), and/or controls the at least one memory so as to store the determined operating schedule for the controller,
wherein the first operation characteristic of the at least one energy storage asset is a charge rate and/or a discharge rate of the at least one energy storage asset, and wherein the operating schedule for the controller of the at least one energy storage asset comprises a suggested first time interval during the time period T of charging the at least one energy storage asset at a charge rate, and a suggested second time interval during the time period T of discharging the at least one energy storage asset at a discharge rate.

16. The apparatus of claim 15, wherein the first time interval of charging the at least one energy storage asset during the time period T coincides with a corresponding time interval during which the forecast wholesale electricity price falls below a predetermined threshold value.

17. The apparatus of claim 15, wherein the second time interval of discharging the at least one energy storage asset during the time period T coincides with a corresponding time interval during which the forecast wholesale electricity price exceeds a predetermined threshold value.

18. An apparatus for determining an operating schedule of a controller of at least one energy storage asset operated by an energy customer of an electricity supplier, so as to generate energy related revenue, over a time period T, associated with operation of the at least one energy storage asset according to the operating schedule, wherein the energy-related revenue available to the energy customer over the time period T is based at least in part on a wholesale electricity market, the apparatus comprising:
at least one communication interface;
at least one memory to store processor-executable instructions and a mathematical model for the at least one energy storage asset, wherein the mathematical model facilitates a determination of the operating schedule for the controller of the at least one energy storage asset based at least in part on a first operation characteristic of the at least one energy storage asset, a second operation characteristic of at least one energy consuming asset in communication with the at least one energy storage asset, and a forecast wholesale electricity price associated with the wholesale electricity market; and at least one processing unit, communicatively coupled to the at least one communication interface and the at least one memory, wherein upon execution of the processor-executable instructions, the at least one processing unit:
A) determines the operating schedule for the controller of the at least one energy storage asset using the mathematical model; and
B) controls the at least one communication interface to transmit to the energy customer the operating schedule for the controller of the at least one energy storage asset determined in A), and/or controls the at least one memory so as to store the determined operating schedule for the controller, wherein, upon execution of the processor-executable instructions, the at least one processing unit determines the operating schedule for the controller of the at least one energy storage asset using the mathematical model in A) by minimizing a net energy-related cost over the time period T, wherein:

the net-energy related cost is based at least in part on:
electricity generation by the at least one energy storage asset;
first electricity consumption by the at least one energy storage asset; and
second electricity consumption by the at least one energy consuming asset; and the energy-related revenue available to the energy customer is based at least in part on the minimized net energy-related cost, wherein the net energy-related cost is specified as a difference between an electricity supply cost and an economic demand response revenue over the time period T, wherein in A), the at least one processing unit:
determines the operating schedule for the controller of the at least one energy storage asset using the mathematical model and a representative customer baseline (CBL) energy profile for the at least one energy consuming asset, over the time period T, wherein the representative CBL energy profile represents a typical operation of the at least one energy consuming asset by the energy customer.

19. The apparatus of claim 18, wherein the representative CBL is an energy consumption profile as a function of time for the at least one energy consuming asset.

20. The apparatus of claim 18, wherein the economic demand response revenue over the time period T is determined based on the forecast wholesale electricity price, the electricity generation by the at least one energy storage asset, the first electricity consumption by the at least one energy storage asset, and the representative CBL energy profile for the at least one energy consuming asset.

21. An apparatus for determining an operating schedule of a controller of at least one energy storage asset operated by an energy customer of an electricity supplier, so as to generate energy related revenue, over a time period T, associated with operation of the at least one energy storage asset according to the operating schedule, wherein the energy-related revenue available to the energy customer over the time period T is based at least in part on a wholesale electricity market, the apparatus comprising:
at least one communication interface;
at least one memory to store processor-executable instructions and a mathematical model for the at least one energy storage asset, wherein the mathematical model facilitates a determination of the operating schedule for the controller of the at least one energy storage asset based at least in part on a first operation characteristic of the at least one energy storage asset, a second operation characteristic of at least one energy consuming asset in communication with the at least one energy storage asset, and a forecast wholesale electricity price associated with the wholesale electricity market; and at least one processing unit, communicatively coupled to the at least one communication interface and the at least one memory, wherein upon execution of the processor-executable instructions, the at least one processing unit:
A) determines the operating schedule for the controller of the at least one energy storage asset using the mathematical model; and
B) controls the at least one communication interface to transmit to the energy customer the operating schedule for the controller of the at least one energy storage asset determined in A), and/or controls the at least one memory so as to store the determined operating schedule for the controller, wherein, upon execution of the processor-executable instructions, the at least one processing unit determines the operating schedule for the controller of the at least one energy storage asset using the mathematical model in A) by minimizing a net energy-related cost over the time period T, wherein:

the net-energy related cost is based at least in part on:
electricity generation by the at least one energy storage asset;
first electricity consumption by the at least one energy storage asset; and
second electricity consumption by the at least one energy consuming asset; and the energy-related revenue available to the energy customer is based at least in part on the minimized net energy-related cost, wherein the net energy-related cost is specified as a difference between an electricity supply cost and an economic demand response revenue over the time period T, wherein:
the at least one energy consuming asset includes at least one controllable energy consuming asset;
the operating schedule for the controller of the at least one energy storage asset constitutes a first operating schedule; and
in A), the at least one processing unit determines both the first operating schedule for the controller of the at least one energy storage asset and a second operating schedule for the at least one controllable energy consuming asset, based at least in part on minimizing the net energy related cost, over the time period T, associated with the electricity generation by the at least one energy storage asset, the first electricity consumption by the at least one energy storage asset, and the second electricity consumption by the at least one controllable energy consuming asset, wherein in A), the at least one processing unit:
determines the first operating schedule for the controller of the at least one energy storage asset and the second operating schedule for the at least one controllable energy consuming asset using the mathematical model and a representative customer baseline (CBL) energy profile for the at least one controllable energy consuming asset, over the time period T, wherein the representative CBL energy profile represents a typical operation of the at least one controllable energy consuming asset by the energy customer as specified by a business-as-usual (BAU) operating schedule for the at least one controllable energy consuming asset.

22. The apparatus of claim 21, wherein the economic demand response revenue over the time period T is determined based on the forecast wholesale electricity price, the electricity generation by the at least one energy storage asset, the first electricity consumption by the at least one energy storage asset, and a difference between the second electricity consumption by the at least one controllable energy consuming asset and the representative CBL energy profile for the at least one controllable energy consuming asset.

23. The apparatus of claim 22, wherein in A), the at least one processing unit:
A1) selects a plurality of first candidate operating schedules for the controller of the at least one energy storage asset, and selects a plurality of second candidate operating schedules for the at least one controllable energy consuming asset, wherein each second candidate operating schedule is different from the BAU operating schedule for the at least one controllable energy consuming asset;
A2) successively applies the plurality of first candidate operating schedules and the plurality of second candidate operating schedules to the mathematical model to generate a corresponding plurality of simulated energy profiles for the at least one energy storage asset and the at least one controllable energy consuming asset;
A3) calculates a plurality of projected net energy-related costs to the energy customer, wherein each projected net energy-related cost is computed based at least in part on the representative CBL energy profile and the simulated energy profiles corresponding to the respective first and second candidate operating schedules, and the forecast wholesale electricity price; and
A4) selects, as an optimal first operating schedule and an optimal second operating schedule, respective ones of the first and second candidate operating schedules corresponding to one simulated energy profile of the plurality of simulated energy profiles that results in a minimum net energy-related cost of the plurality of net energy-related costs calculated in A3).

24. The apparatus of claim 22, wherein in B) the at least one processing unit:
controls the at least one communication interface to transmit to the energy customer the first operating schedule for the controller of the at least one energy storage asset and the second operating schedule for the at least one controllable energy consuming asset deteimined in A), and/or controls the at least one memory so as to store the determined first operating schedule for the controller and the second operating schedule for the at least one controllable energy consuming asset.

25. The apparatus of claim 22, wherein:
the at least one controllable energy consuming asset includes at least one building having a variable internal temperature controlled by a heating, ventilation and air conditioning (HV AC) system;
the second operating schedule for the at least one controllable energy consuming asset specifies a candidate temperature set point for the HV AC system as a function of time; and
the BAU operating schedule for the at least one controllable energy consuming asset is specified by a business-as-usual (BAU) temperature set point for the HVAC system as a function of time.

26. The apparatus of claim 22, wherein in A), the at least one processing unit:
determines the first operating schedule for the controller of the at least one energy storage asset and the second operating schedule for the at least one controllable energy consuming asset using the mathematical model and a comfort cost attributed to a change in the energy customer's behavior in adopting the second operating schedule for the at least one controllable energy consuming asset instead of the BAU operating schedule.

27. The apparatus of claim 26, wherein the comfort cost is specified as a cost function based at least in part on at least one difference between the second operating schedule for the at least one controllable energy consuming asset and the BAU operating schedule.

28. An apparatus for determining an operating schedule of a controller of at least one energy storage asset operated by an energy customer of an electricity supplier, so as to generate energy related revenue, over a time period T, associated with operation of the at least one energy storage asset according to the operating schedule, wherein the energy-related revenue available to the energy customer over the time period T is based at least in part on a wholesale electricity market, the apparatus comprising:
at least one communication interface;
at least one memory to store processor-executable instructions and a mathematical model for the at least one energy storage asset, wherein the mathematical model facilitates a determination of the operating schedule for the controller of the at least one energy storage asset based at least in part on a first operation characteristic of the at least one energy storage asset, a second operation characteristic of at least one energy consuming asset in communication with the at least one energy storage asset, and a forecast wholesale electricity price associated with the wholesale electricity market; and
at least one processing unit, communicatively coupled to the at least one communication interface and the at least one memory, wherein upon execution of the processor-executable instructions, the at least one processing unit:
A) determines the operating schedule for the controller of the at least one energy storage asset using the mathematical model; and
B) controls the at least one communication interface to transmit to the energy customer the operating schedule for the controller of the at least one energy storage asset determined in A), and/or controls the at least one memory so as to store the determined operating schedule for the controller,
wherein:
the wholesale electricity market includes an energy market and a regulation market;
the forecast wholesale electricity price is for the energy market; and
the operating schedule for the controller of the at least one energy storage asset specifies a time interval within the time period T for use of the energy storage asset in the regulation market when the forecast wholesale electricity price for the energy market is below a predetermined threshold value.

* * * * *